(12) United States Patent
Holman et al.

(10) Patent No.: US 7,532,127 B2
(45) Date of Patent: May 12, 2009

(54) MOTION AND POSITION MEASURING FOR BURIED OBJECT DETECTION

(75) Inventors: Glen A. Holman, Orlando, FL (US);
Herbert Duvoisin, Orlando, FL (US);
Gregory W. Stilwell, Orlando, FL (US);
Jason A. Clark, Orlando, FL (US); Tim L. Davis, Winter Park, FL (US); C. Andrew Helm, Oviedo, FL (US)

(73) Assignee: L-3 Communications CyTerra Corporation, Orlando, FL (US)

( * ) Notice: Subject to any disclaimer, the term of this patent is extended or adjusted under 35 U.S.C. 154(b) by 66 days.

(21) Appl. No.: 11/253,811

(22) Filed: Oct. 20, 2005

(65) Prior Publication Data

US 2006/0091888 A1 May 4, 2006

Related U.S. Application Data

(60) Provisional application No. 60/619,932, filed on Oct. 20, 2004.

(51) Int. Cl.
*G08B 21/00* (2006.01)
(52) U.S. Cl. .............. 340/686.1; 340/551; 340/561; 340/691.6; 324/233; 324/329

(58) Field of Classification Search ............. 340/686.1, 340/551, 561, 691.6; 324/233, 329
See application file for complete search history.

(56) References Cited

U.S. PATENT DOCUMENTS

| 4,334,192 | A | * | 6/1982 | Podhrasky | 324/329 |
| 4,890,064 | A | * | 12/1989 | Candy | 324/329 |
| 5,055,793 | A | * | 10/1991 | Mulcahey | 324/326 |
| 5,148,151 | A | * | 9/1992 | Podhrasky | 324/329 |
| 6,097,190 | A | * | 8/2000 | Foerster | 324/329 |
| 6,911,823 | B2 | * | 6/2005 | Rowan | 324/326 |
| 7,009,399 | B2 | * | 3/2006 | Olsson et al. | 324/326 |

* cited by examiner

*Primary Examiner*—Davetta W Goins
(74) *Attorney, Agent, or Firm*—Fish & Richardson P.C.

(57) ABSTRACT

A hand-held, wand-type buried object detector includes a motion and position sensor that provides data about the sensor head of the buried object detector. An inertial measuring device including three accelerometers and three gyroscopes is one example of a motion and position sensor. The buried object detector includes a processor/communicator device that is capable of processing the data from the motion and position sensor and communicating feedback, based on the processing results, to the operator about the operation of the buried object detector. In one example, a personal digital assistant may be configured for use as a processor/communicator device of a buried object detector.

33 Claims, 45 Drawing Sheets

(Reference Swing)

(Cupping Swing)

(Dome-Effect Swing)

(Too-Fast Swing)

(Too-Slow Swing)

(Inconsistent Swing)

(Sensor-Head-Tilt Swing)

(Excessive-Arc Swing)

(Too-Short Swing)

(Operator-Swing Data)

MOTION AND POSITION MEASURING FOR BURIED OBJECT DETECTION

CROSS REFERENCE TO RELATED APPLICATIONS

This application claims the benefit of U.S. Provisional Application No. 60/619,932, filed Oct. 20, 2004 and titled MOTION AND POSITION MEASURING FOR BURIED OBJECT DETECTION, which is incorporated by reference in its entirety.

TECHNICAL FIELD

This application relates to a buried object detection system.

BACKGROUND

Handheld wand-type scanning systems may be used to locate buried objects. Examples include metal detectors (MD) for coin and jewelry detection, ground penetrating radars (GPR) for finding buried pipes, and mine detectors for detecting buried land mines. In general, a handheld scanning system is operated by swinging a sensor head of the scanning system over an area in which buried objects are to be detected.

SUMMARY

In one general aspect, a buried object detection system includes a sensor head, a sensor head status sensor, and one or more processors. The sensor head includes a sensor configured to detect electromagnetic signals. The sensor head status sensor is configured to generate status data related to the sensor head. The one or more processors are configured to detect a buried object based on the electromagnetic signals and to determine a position or a motion of the sensor head based on the status data.

Implementations may include one or more of the following features. For example, one or more of the processors may be configured to process the status data to determine whether the sensor head is being moved correctly by an operator of the buried object detection system. One or more of the processors may be configured to process the status data to identify an operator-swing, and compare the operator-swing to a swing template to determine whether the sensor head is being moved correctly by an operator of the buried object detection system. The swing template may represent a reference swing or a type of swing error.

The sensor head status sensor may be, or may include, a six degree-of-freedom inertial measuring unit having three accelerometers and three gyroscopes.

The buried object detection system also may include a communicator device configured to provide a communication to the operator regarding the operation of the buried object detection system. A communication may be an audible message, an audible tone, a textual message, or a graphical representation. One or more of the processors may be configured to process the status data to identify an operator-swing, compare the operator-swing to a reference swing, and when the operator-swing does not correspond to the reference swing, compare the operator-swing to one or more swing error patterns until a matching pattern is identified. The communicator device may be configured to provide a communication to the operator when the operator-swing does not correspond to the reference swing. A personal digital assistant may include one or more of the processors and the communicator device.

A detector processor may be configured to detect the buried object based on electromagnetic signals, and a motion and position processor may be configured to determine the position or the motion of the sensor head based on the status. The sensor head status sensor may be configured to be removable from, and re-attachable to, the buried object detection system, as may the motion and sensor processor. A parameter used to detect a buried object may be adjusted based on a determined position or motion of the sensor head.

In another general aspect, status data related to a sensor head of a buried object detector is generated, and the status data is processed to determine a position or a motion of the sensor head. Implementations may include one or more of the features noted above.

In yet another general aspect, a kit includes a personal digital assistant and a sensor head status sensor. The sensor head status sensor is configured to be attached to a sensor head of a buried object detector and to generate status data related to the sensor head. The personal digital assistant is configured to receive and process the status data to determine a position or a motion of the sensor head.

Implementations may include one or more of the features noted above and one or more of the following features. For example, the kit may include hardware for attaching the personal digital assistant to the buried object detector.

The details of one or more of the implementations are set forth in the accompanying drawings and description below. Other features will be apparent from the description and drawings, and from the claims.

DESCRIPTION OF DRAWINGS

Like reference symbols in the various drawings indicate like elements.

DETAILED DESCRIPTION

Figure 1:
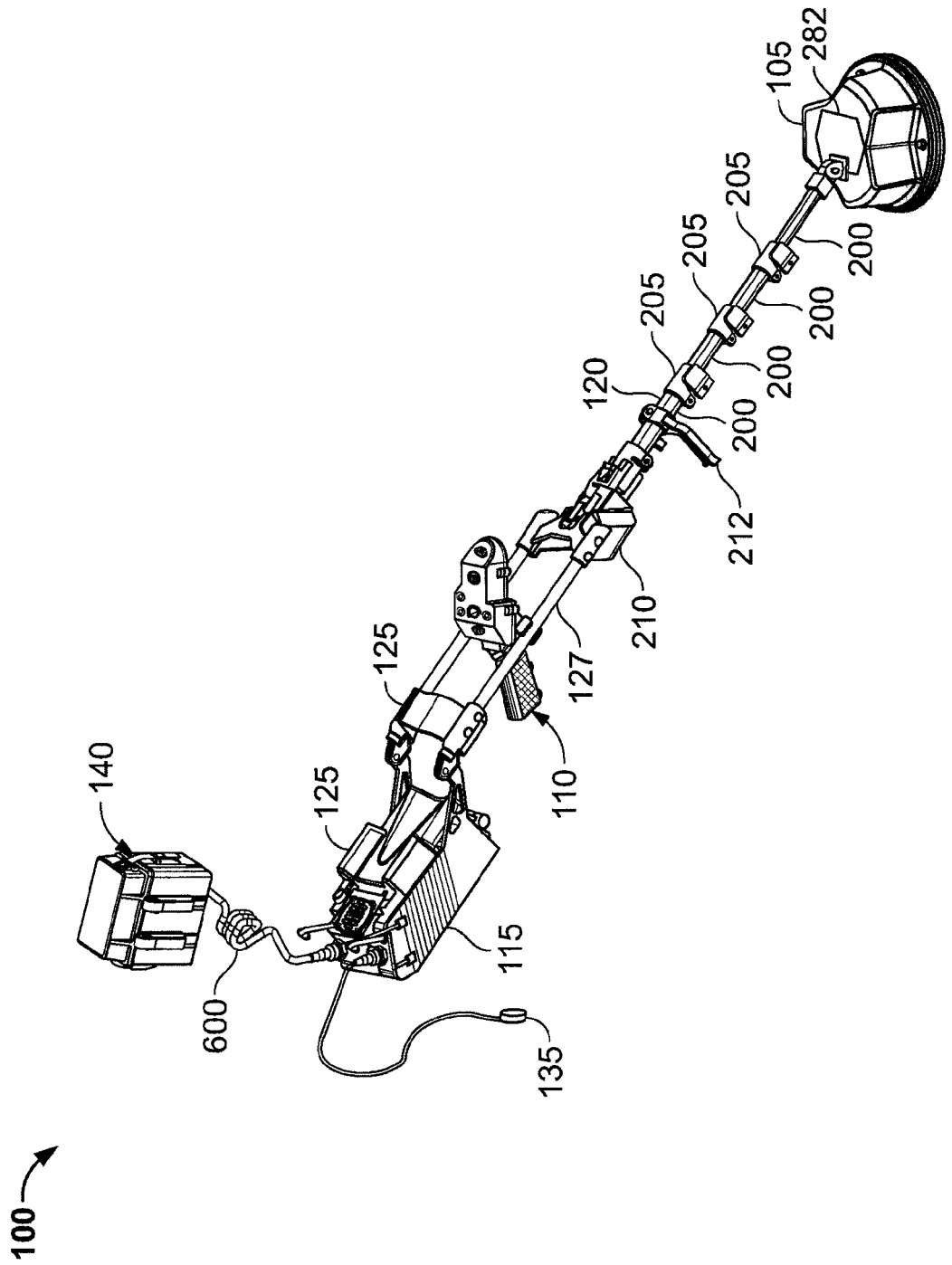
FIG. 1 is a perspective view of a mine detection system.

The process of properly swinging a handheld wand-type scanning system may be complex and challenging, particularly when an operator is learning how to operate such a system. The use of a motion and position measuring module to communicate wand-head status information to the operator may help an operator learn to use the scanning system or otherwise help to improve operation of a handheld wand-type scanning system. A scanning system also may be referred to as a buried object detection system.

An example of a motion and position measuring module includes a module based on a motion and position sensor (such as a combination of an accelerometer and a gyroscope) and a processor/communicator device capable of processing the data from the motion and position sensor and communicating feedback, based on the processing results, to the operator about the operation of the scanning system. An example of a processor/communicator device is a personal digital assistant (PDA). The motion and position measuring module may be used to provide audio and/or visual information to the operator in substantially real time. For example, audio messages such as "too fast," "too slow," "too high," or "spot missed" may be used to alert the operator to errors in swing efficacy for correction and training. Audio tones also may be used to convey feedback concerning swing efficacy. For example, a high-pitched, sustained tone may indicate "too high," a buzz may indicate "too low," and a series of high-pitched, staccato tones may indicate "spot missed." Additionally or alternatively, text messages also may be displayed to alert the operator. Visual information, such as video or graphics, may graphically or pictorially alert the operator to errors in swing efficacy. In this way, the operator may be trained to properly swing the wand or otherwise be informed of proper manipulation of the wand.

The motion and position measuring module also may be used to provide wand head status information to the buried object detection process. Wand head status information may be used to improve accuracy of detection by the scanning system. For example, parameters corresponding to motion and position information of the wand head may be adjusted based on the motion and position of the wand head.

Before discussing additional details of motion and position sensing and use, general mine detection systems are described with reference to FIGS. 1-29. The motion and position measuring module may be used with, or incorporated into, one or more of the described mine detection systems.

Referring to FIGS. 1, 2, 13, and 14, an integrated mine detection system 100 incorporates a metal detector 1350 (FIG. 13) and a radar detector 1450 (FIG. 14) into a single integrated system for detecting mines, including those mines that would otherwise not be detected solely with the use of a metal detector. The mine detection system 100 includes a search device 105, an interface controller 110, and an electronics unit 115. The search device 105 connects to the electronics unit 115 through a bundled set of wires 106 and the interface controller 110 connects to the electronics unit 115 through a bundled set of wires 111. To ensure that internal electronics are kept dry and secure, the bundled sets 106 and 111 enter the search device 105 and the electronics unit 115 through weatherproof seals 116. In general, the metal detector 1350 and the radar detector 1450 each include a set of electronics within the unit 115 and transmitting and receiving components within the search device 105, as further described below.

The mine detection system 100 includes an elongated shaft 120 coupled to the search device 105, and an armrest 125 coupled to the shaft 120 with a cradle 127. The interface controller 110 is attached to the shaft 120 to enable a user to access the interface controller 110 with a first arm while resting her second arm in the armrest 125.

The mine detection system 100 also includes one or more audio output devices, such as an earpiece 135 that is coupled to the electronics unit 115 and a speaker 137 (shown in FIG. 2) within the electronics unit 115. A power source such as a battery pack 140 is coupled to the electronics unit 115 to provide power to the unit 115.

Figure 3:
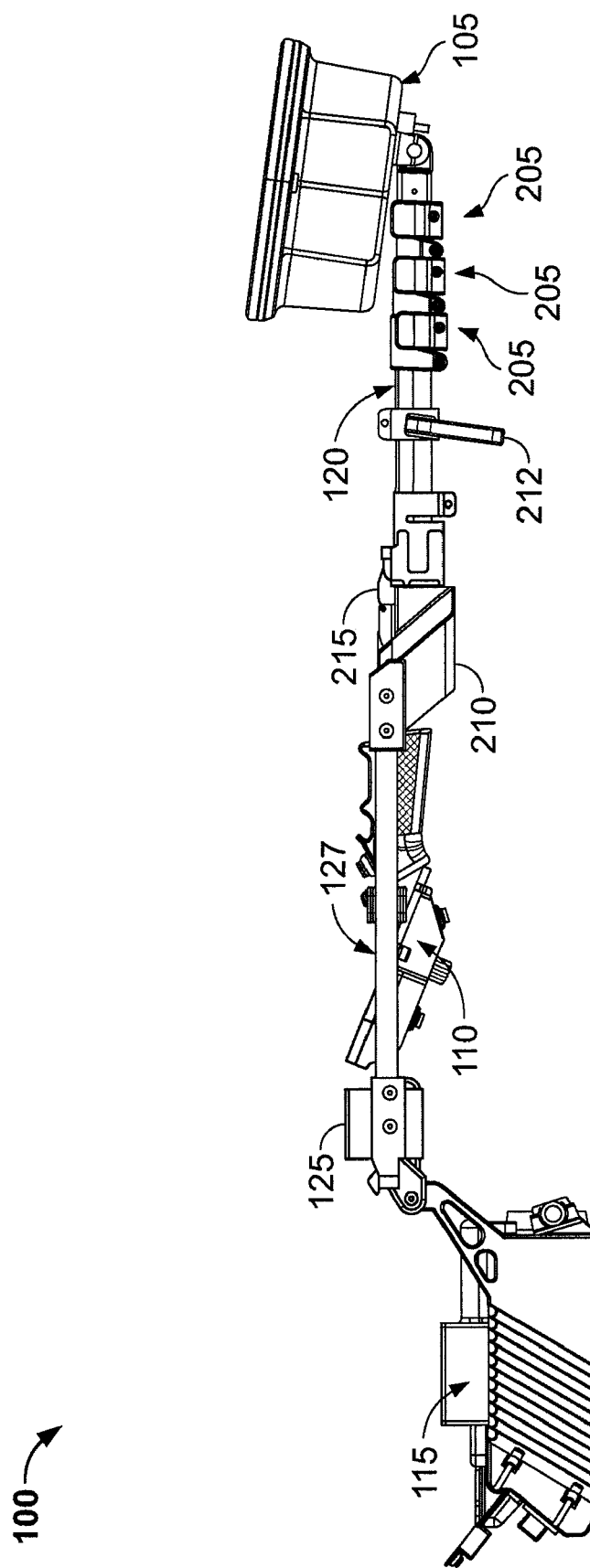
FIG. 3 is a side view of the mine detection system of FIG. 1 partially opened from storage.
Figure 4:
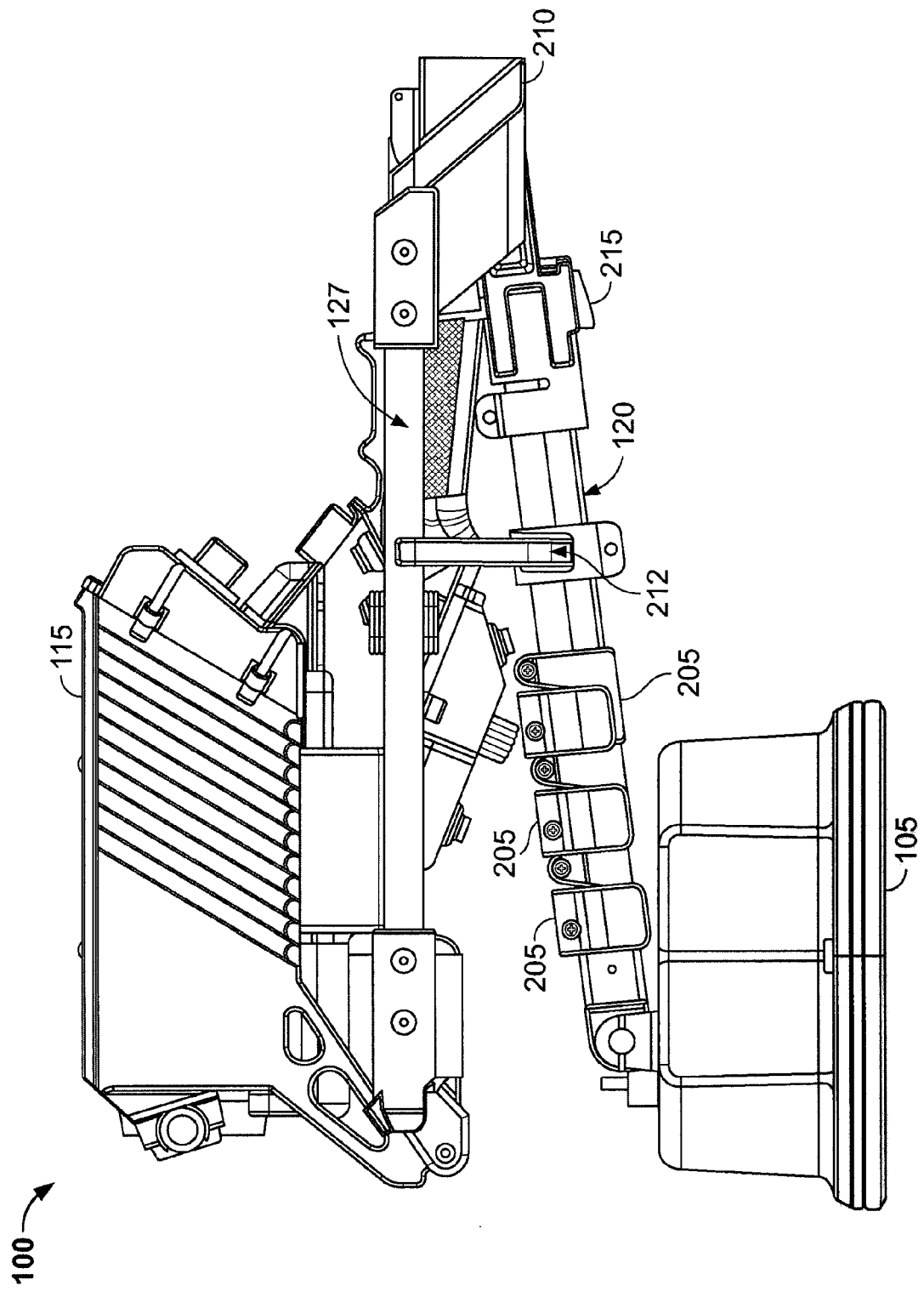
FIG. 4 is a side view of the mine detection system of FIG. 1 ready for storage.

FIGS. 3 and 4 show the mine detection system 100 without the battery pack 140 and the earpiece 135. The shaft 120 is telescoping and is made of segments 200 that slide into each other to adjust the length of the shaft 120 to accommodate the particular height of the user and to accommodate compact storage (as detailed below). Each of the segments 200 is secured in place relative to the adjacent segments 200 with a set of clamps 205 positioned between each pair of adjacent segments 200. Upon loosening a clamp, the smaller segment 200 can be slid into the adjacent larger segment 200, as shown in FIG. 3.

The shaft 120 is able to be folded relative to the cradle 127 at a joint 210. The shaft 120 includes a latching yoke 212 that secures the shaft 120 to the cradle 127 with a friction fit when the shaft 120 is folded relative to the cradle 127. The shaft 120 is secured in the open (unfolded) position relative to the cradle 127 by use of a latch 215 at the joint 210.

Figure 5:
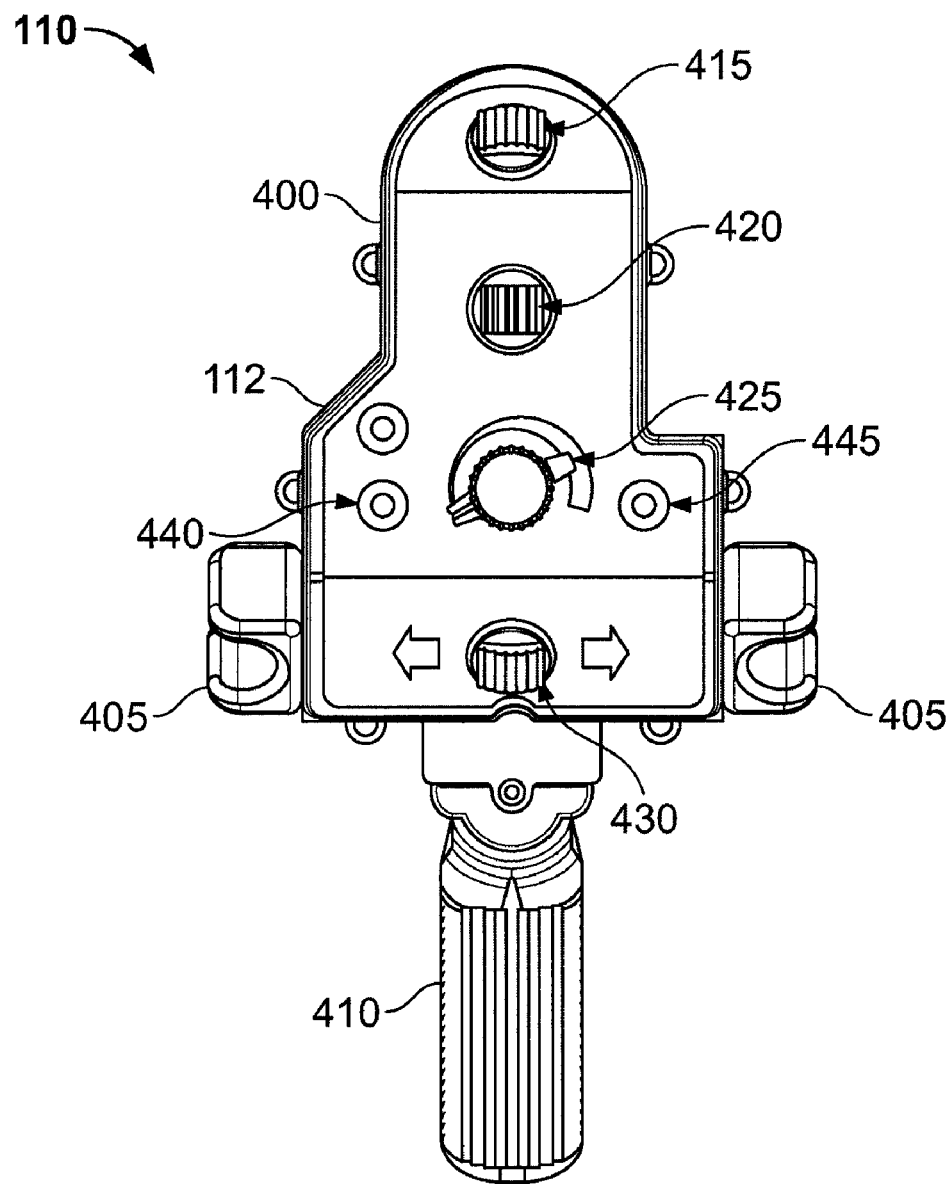
FIGS. 5 and 6 are, respectively, front and side perspective views of an interface controller of the mine detection system of FIG. 1.
Figure 6:
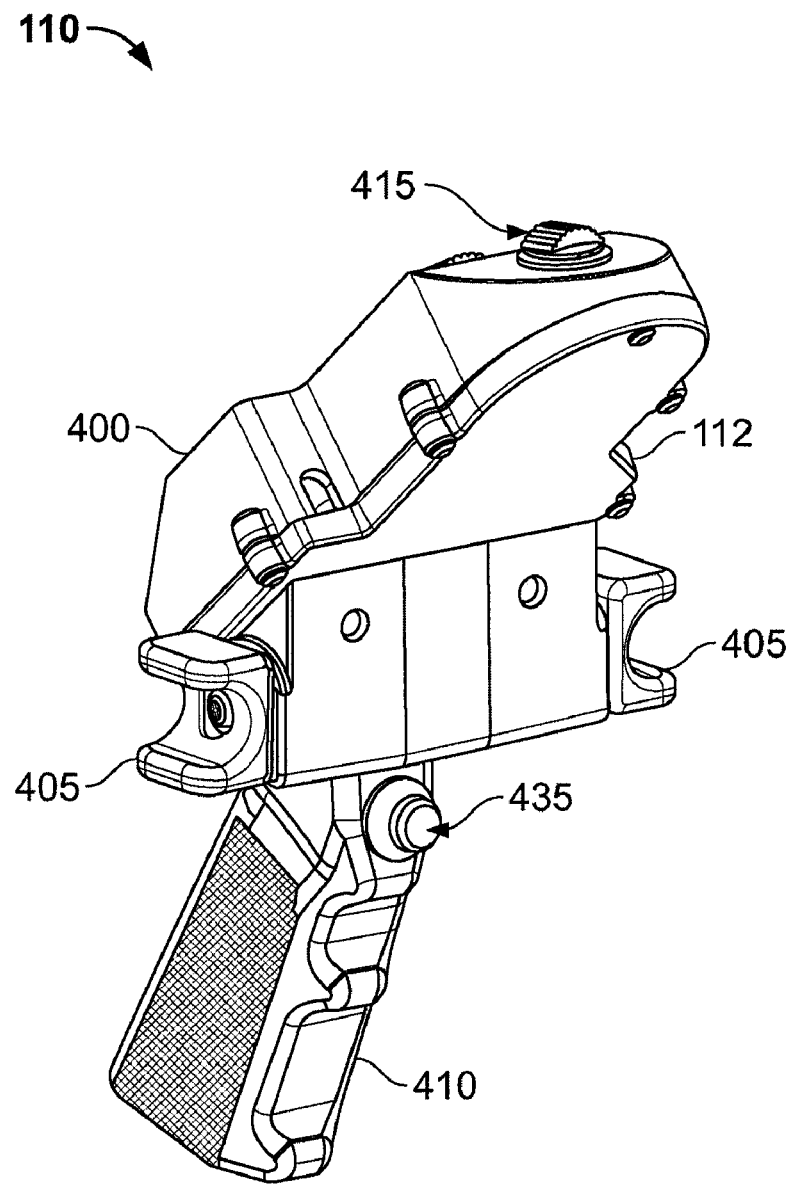

Referring also to FIGS. 5 and 6, the interface controller 110 includes a control section 400, a pair of clamps 405, and a handle 410 extending from the control section 400. The clamps 405 are sized to receive the cradle 127 with a friction fit to secure the controller 110 to the cradle 127. The interface controller 110 includes a housing 112 that houses all of its internal components and provides the control section 400, the clamps 405, and the handle 410. The housing 112 of the controller 110 can be made of any suitably durable material, such as, for example, molded plastic.

The control section 400 includes a set of switches that enable a user to control operation of the mine detection system 100. The set of switches includes a power switch 415, a metal detection control switch 420, a radar sensitivity switch 425, an audio control switch 430, and a trigger switch 435. The control section 400 also includes a set of indicators that provide feedback to a user of the mine detection system 100. The set of indicators includes a ready indicator 440 and a power and function indicator 445.

Figure 7:
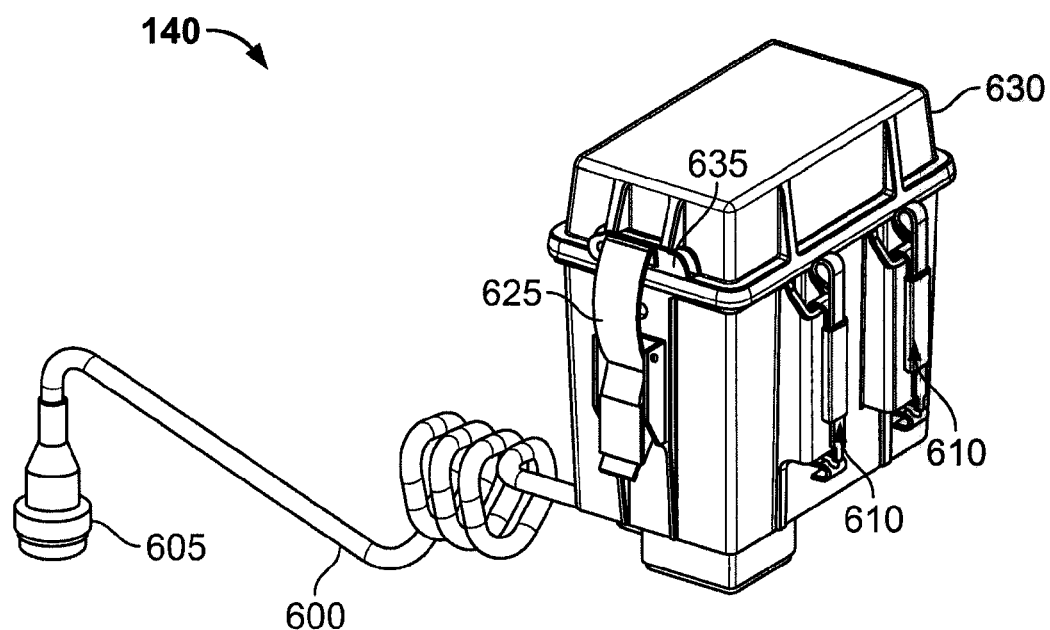
FIG. 7 is a perspective view of a battery pack of the mine detection system of FIG. 1.
Figure 8:
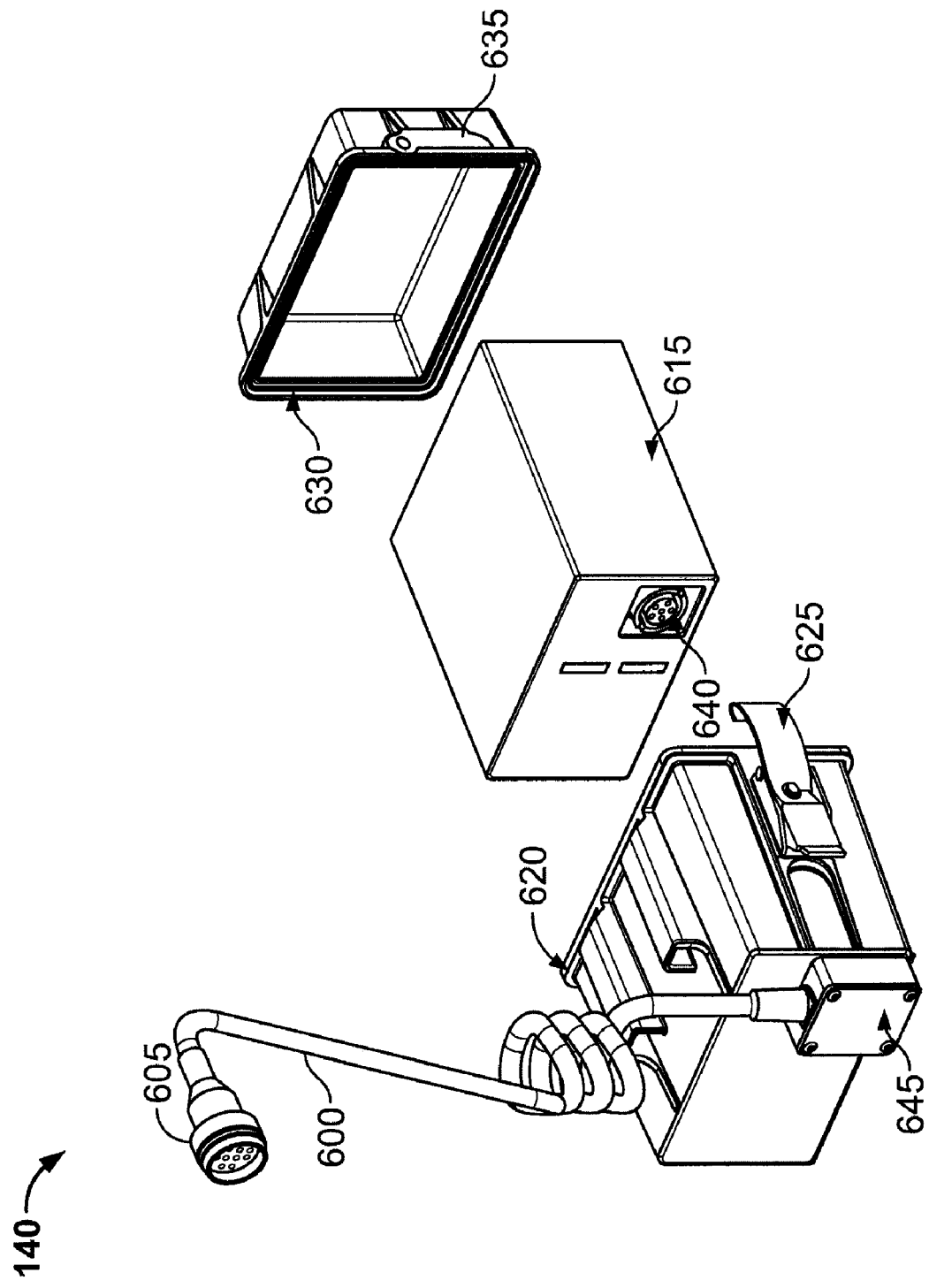
FIG. 8 is an exploded perspective view of the battery pack of FIG. 7.

Referring also to FIGS. 7 and 8, the battery pack 140 is connected to the electronics unit 115 with a cable 600 and a connector 605 (such as a circular twist lock connector) that mates with a connector 900 (shown in FIGS. 2 and 10) on the electronics unit 115. The battery pack 140 includes a pair of clips 610 that can be used to attach the battery pack 140 to a belt on a user. The battery pack 140 houses a battery 615 within a case 620 having latches 625 and a lid 630 having a lip 635. The case 620 and the lid 630 mate with each other and are secured to each other when the latches 625 lock to the lip 635. The case 620 and the lid 630 can be made of any non-metallic durable material, such as, for example, molded plastic. The battery 615 includes a connector 640 that mates with a connector 645 of the case 620 when the battery 615 is housed within the case 620.

Figure 9:
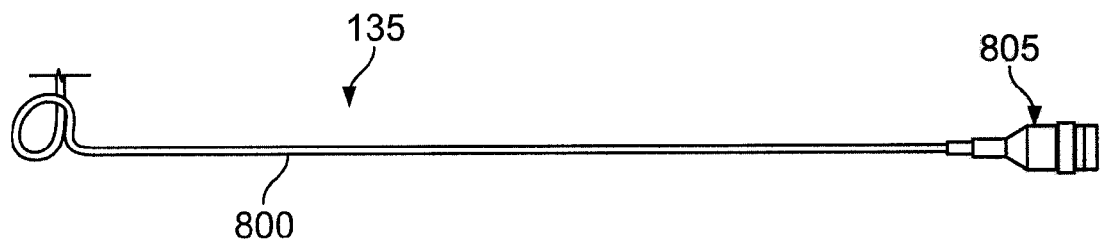
FIG. 9 is a perspective view of an earpiece of the mine detection system of FIG. 1.

Referring also to FIG. 9, the earpiece 135 includes a cable 800 and a connector 805 (such as a circular twist lock connector) that mates with a connector 910 (shown in FIGS. 2 and 10) on the electronics unit 115.

Figure 10:
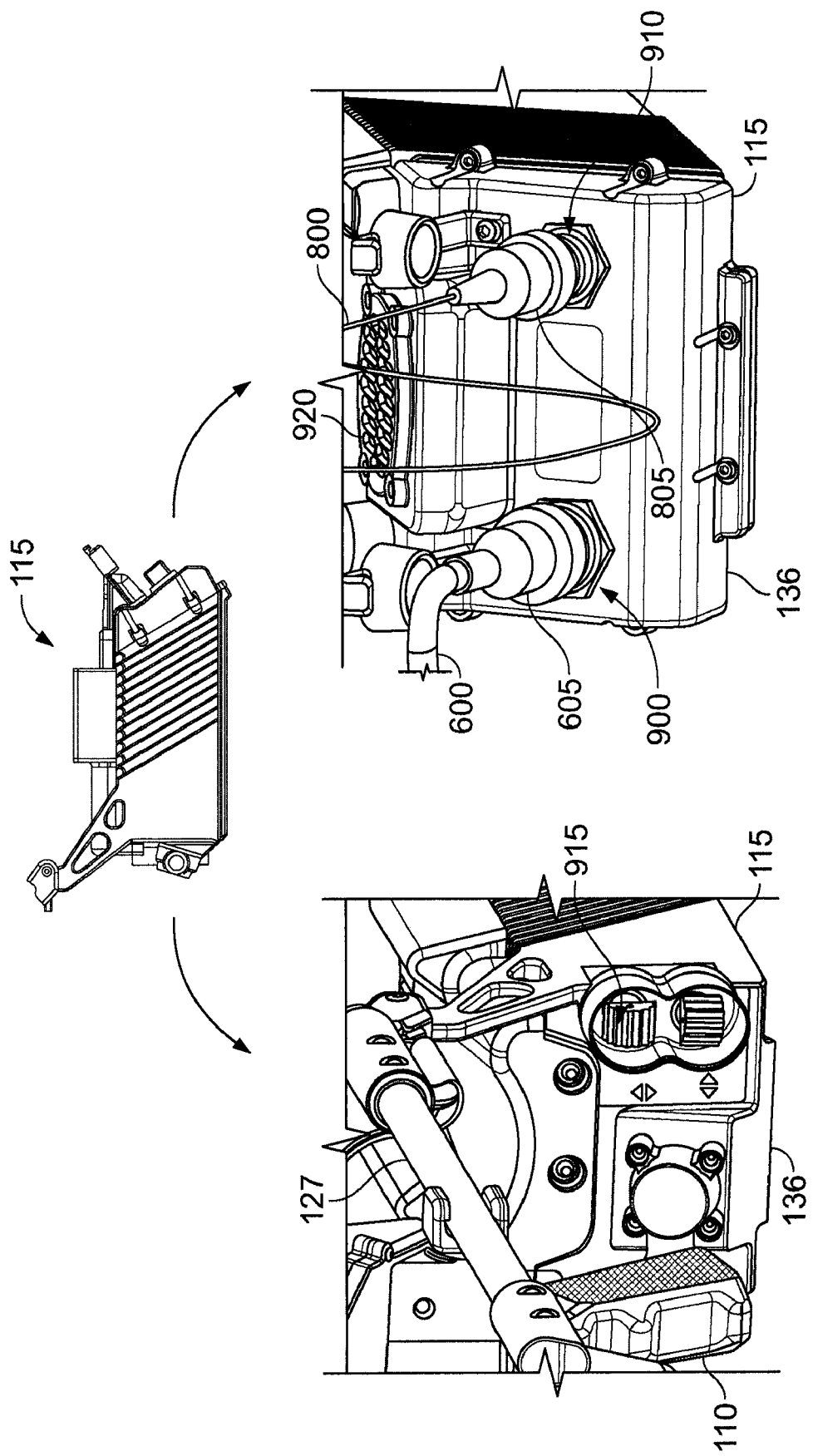
FIG. 10 shows back and front perspective views of an electronics unit of the mine detection system of FIG. 1.

Referring again to FIG. 2 and also to FIG. 10, the electronics unit 115 includes a housing 136, a speaker 137 (FIG. 2) within the housing 136, a set of switches external to the housing 136 that enable a user to control the unit 115, and a set of connectors 900 and 910 on the surface of the housing 136 that couple, respectively, to the connector 605 of the battery pack and the connector 805 of the earpiece 135. The set of switches includes a volume control switch 915. The internal speaker 137 is positioned adjacent one or more openings 920 on a housing 136 to permit audio waves to emanate from the unit 115. The housing 136 can be made of any suitable material, such as, for example, molded plastic.

The housing 136 houses a processor card 220, an interface card 225, electronics 230 of the metal detector, electronics 235 of the radar detector, and a power supply 240.

The power supply 240 is connected to the battery pack 140 through connectors 900 and 605, to the earpiece 135 through connectors 910 and 805, to the interface card 225, and to the radar detector electronics 235. The power supply 240 also connects to the interface controller 110 to enable a user to turn the mine detection system 100 using the power switch 415. The processor card 220 is connected to the interface card 225 and the metal detector electronics 230. The metal detector electronics 230 and the radar detector electronics 235 are controlled by software that is run by their respective processors and that is stored within memory. The memory can be either internal to the unit 115 or external to the unit 115, such as, for example, through a portable storage device 245 that can be accessed by the electronics 230 and 235 of the unit 115. Both the metal detector electronics 230 and the radar detector electronics 235 are connected to the search device 105, as discussed further below.

Figure 11:
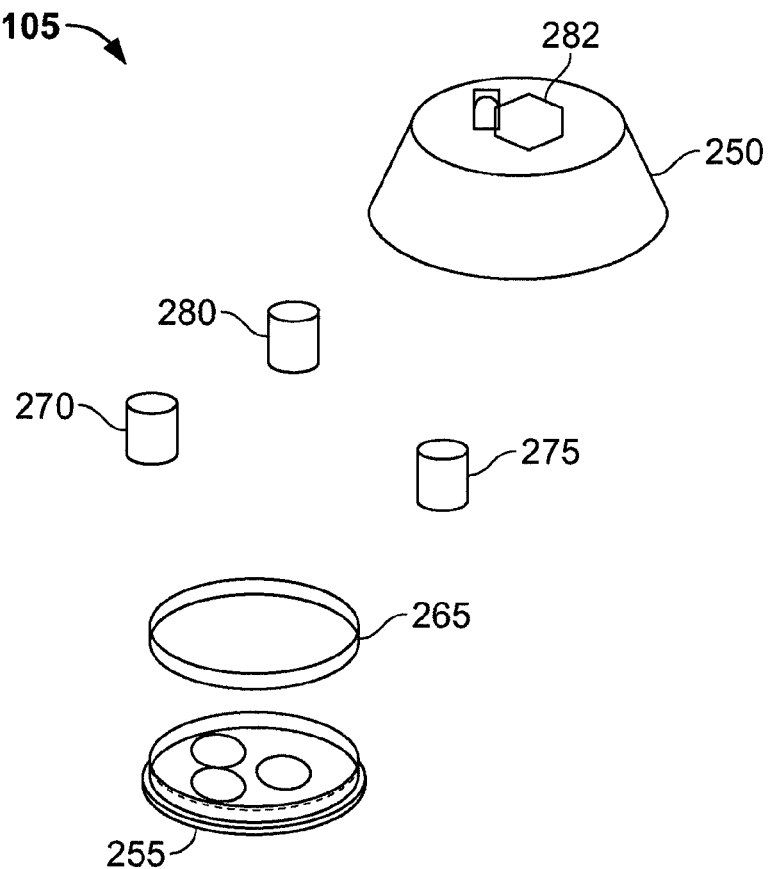
FIG. 11 is an exploded perspective view of a search device of the mine detection system of FIG. 1.
Figure 12:
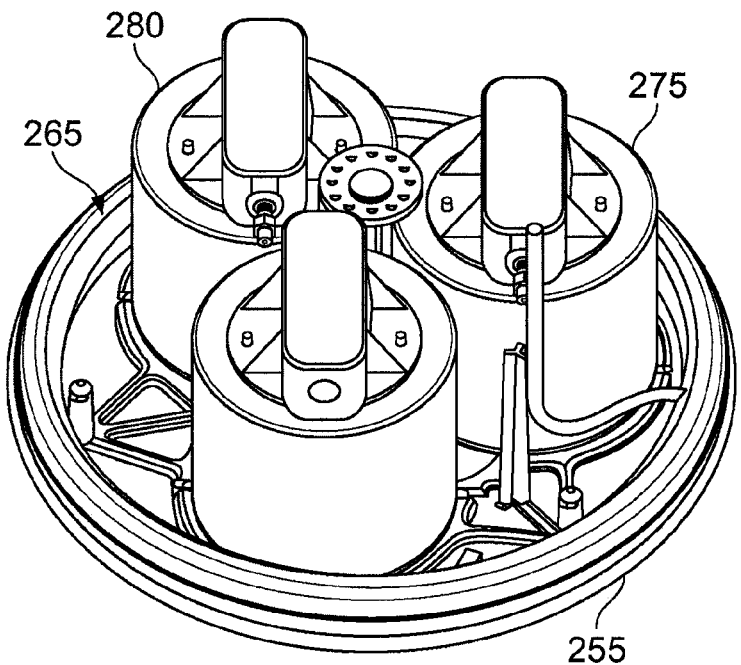
FIG. 12 is a perspective view of the search device of the mine detection system of FIG. 1 without its lid to show internal components.

Referring again to FIG. 2 and also to FIGS. 11 and 12, the search device 105 includes a lid 250 that mates with and connects to a base 255 to form a hollow enclosure. The lid 250 includes an extension piece 260 to which the last segment 200 of the shaft 120 connects. The lid 250 and the base 255 may be formed of any non-magnetic material, such as, for example, molded plastic.

The hollow enclosure of the search device 105 houses the transmitting and receiving components of the metal detector and the radar detector. Thus, the hollow enclosure houses a magnetic field producing device such as a coil 265 that acts as a transmitting/receiving component for the metal detector. Additionally, the hollow enclosure houses a radio wave transmitter such as a transmitting antenna 270, and a radio wave receiver such as a set of receiving antennas 275 and 280. The antenna 270 acts as a transmitting component for the radar detector and the antennas 275 and 280 act as receiving components for the radar detector.

The components of the metal detector and the radar detector within the search device 105 are placed and designed so that operation of one detector does not interfere with the results of the other detector. For example, each of the antennas 270, 275, and 280 can be shielded from external electromagnetic radiation and such that they radiate radio-waves into a narrow path and receive only that electromagnetic radiation from a downward direction that is approximately perpendicular to a bottom surface of the search device 105.

Figure 2:
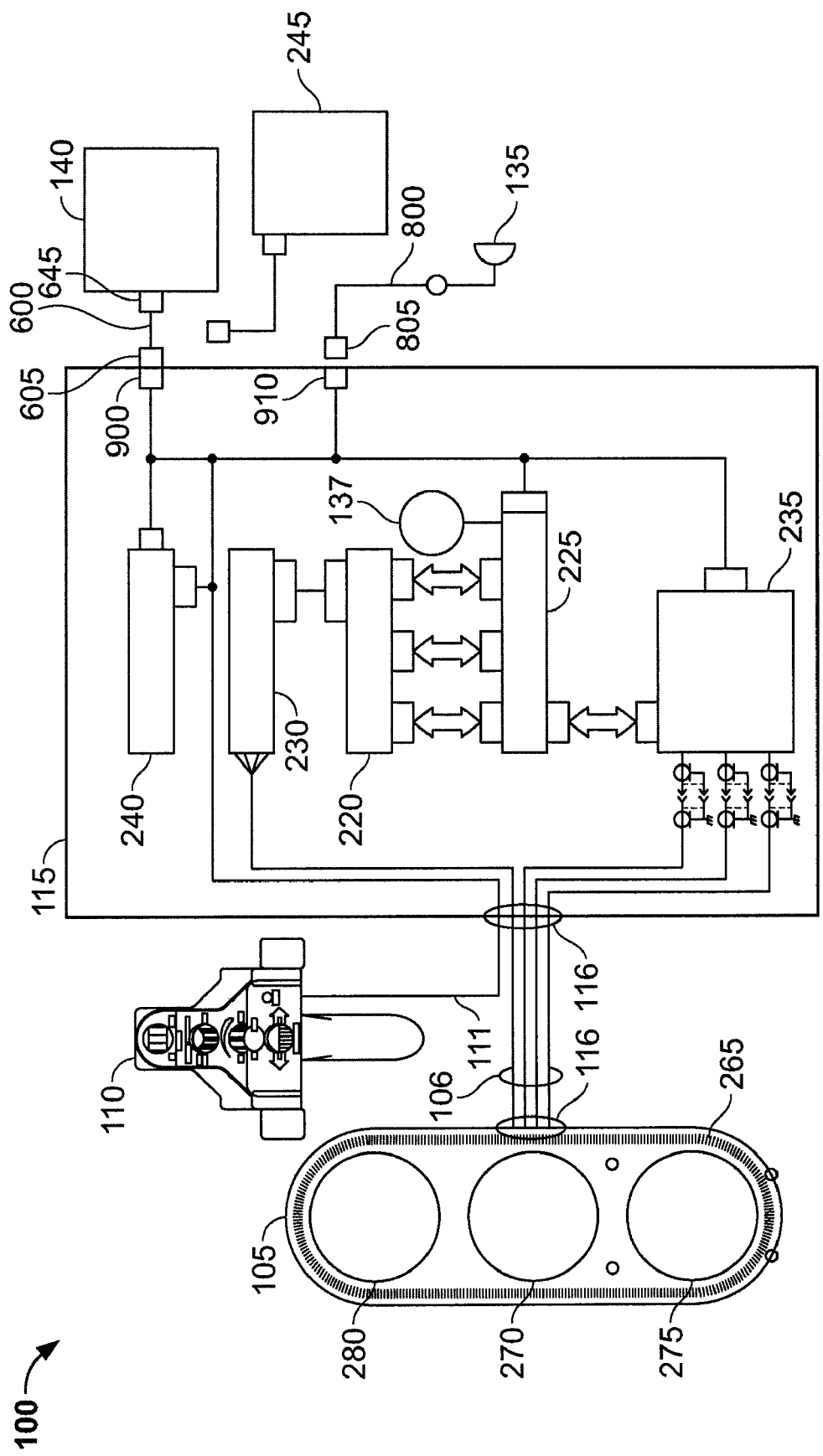
FIG. 2 is a block diagram of the mine detection system of FIG. 1.
Figure 13:
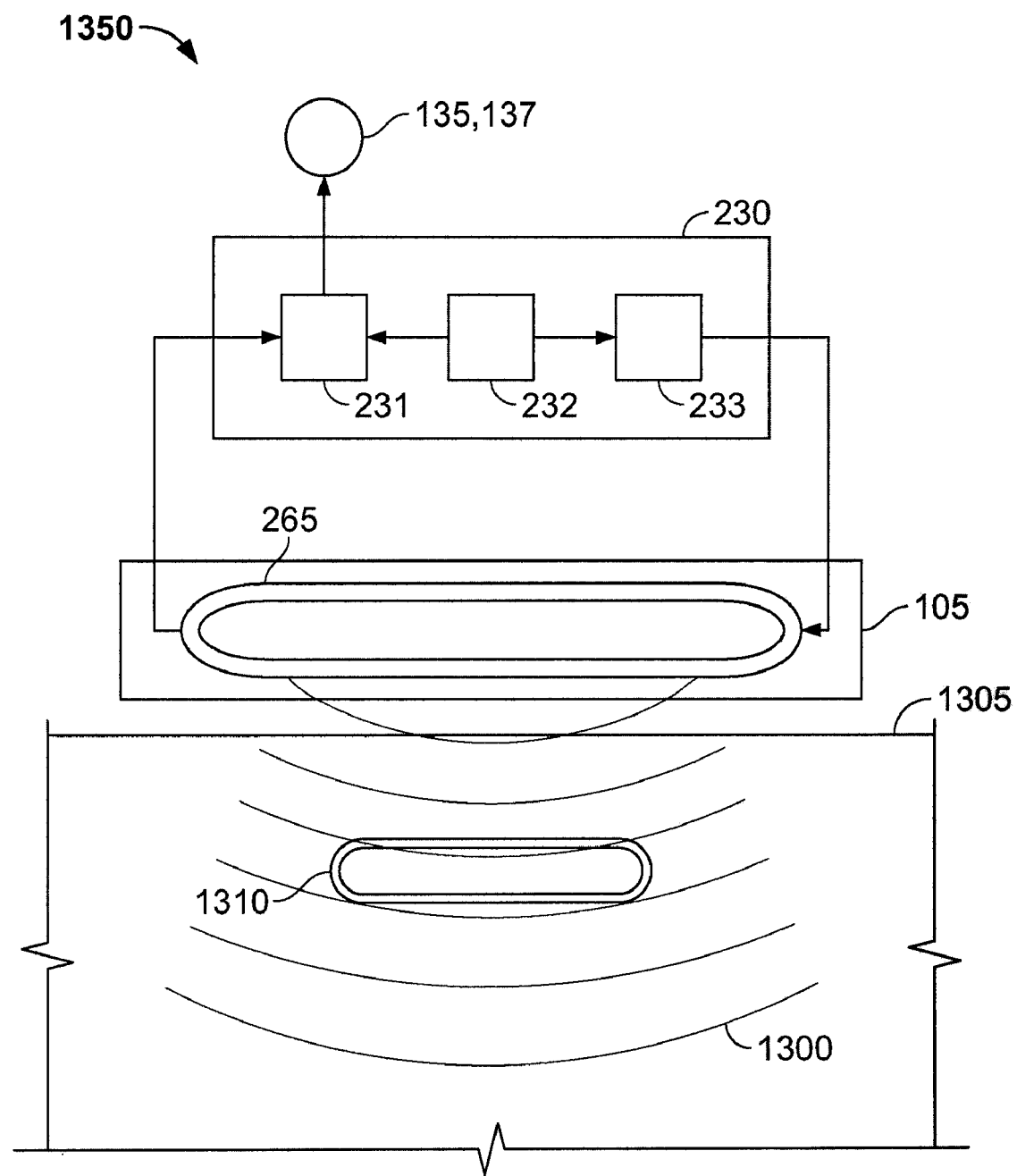
FIG. 13 is a block diagram of the metal detector of the mine detection system of FIG. 1.
Figure 14:
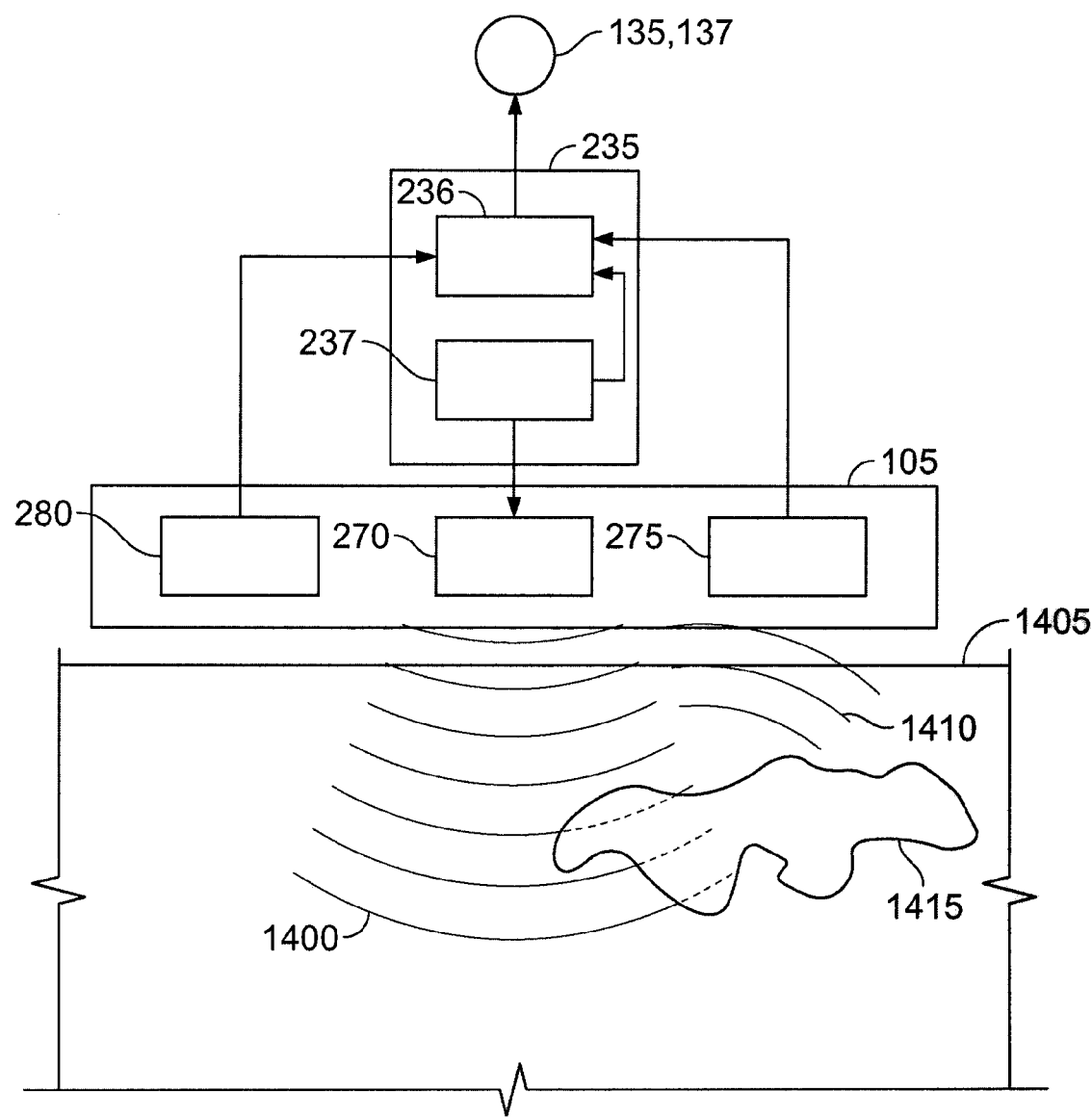
FIG. 14 is a block diagram of the radar detector of the mine detection system of FIG. 1.

Referring to FIG. 13, the metal detector electronics 230 includes a processor 231 that is connected to the coil 265, a pulse generator 232 coupled to the processor 231, and a transmitter 233 that receives electric signals from the pulse generator 232 and transmits the electric signals in the form of an electric current to the coil 265. The processor 231 is also coupled to one or more audio output devices 135, 137 through the interface card 225 (FIG. 2). Referring to FIG. 14, the radar detector electronics 235 includes a processor 236 coupled to the receiving antennas 275 and 280 and a radio frequency generator 237 coupled to the processor 236 and to the transmitting antenna 270. The processor 236 is also coupled to audio output devices 135 and 137 through the interface card 225 or directly (FIG. 2).

Figure 15:
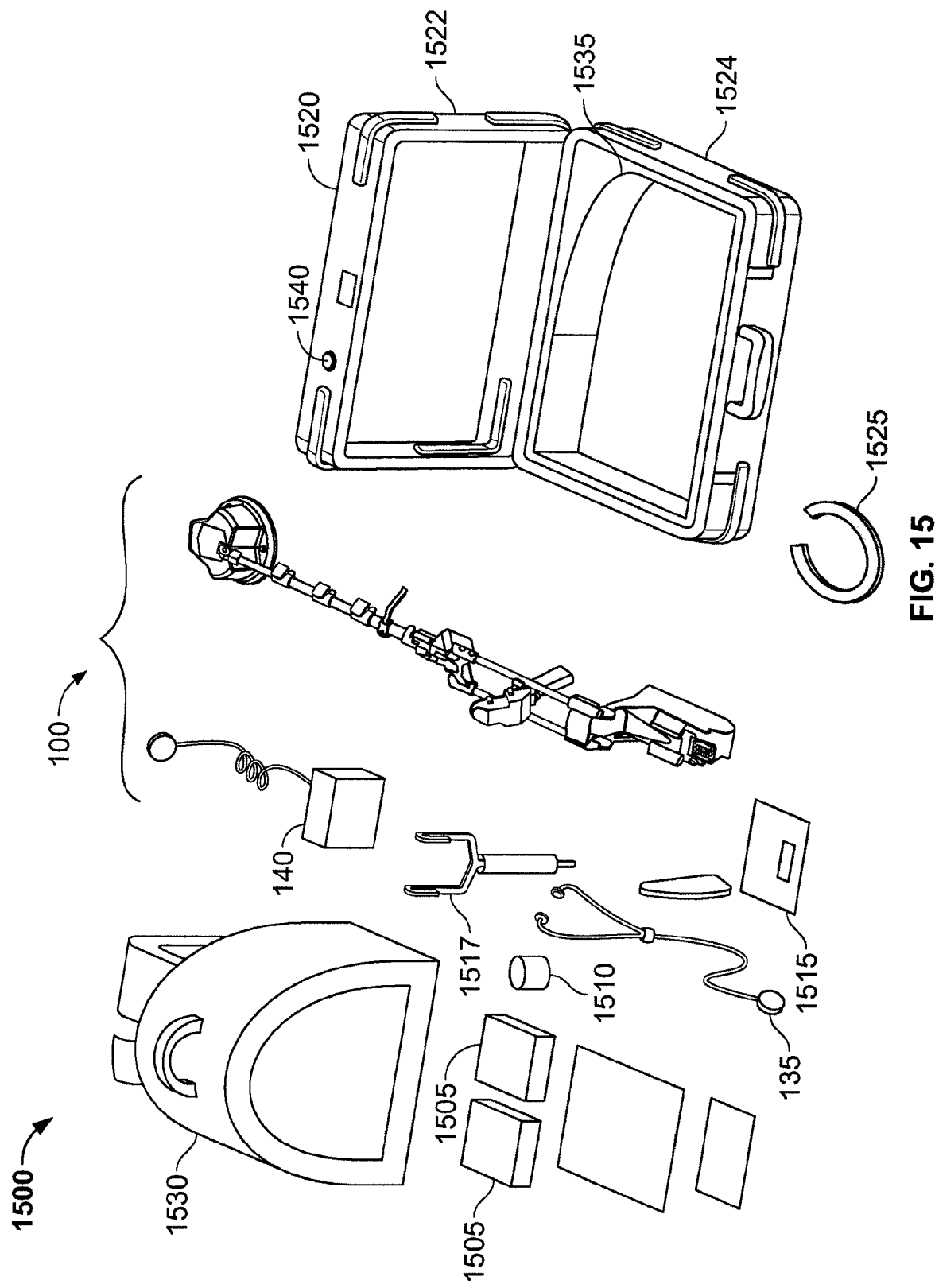
FIG. 15 is a perspective view of a kit for storing and transporting the mine detection system of FIG. 1.

Referring also to FIG. 15, the integrated mine detection system 100 is typically stored and transported in the form of a kit 1500 that includes the system 100, the battery pack 140, and the earpiece 135. The kit 1500 also includes a set of spare batteries 1505, a test piece 1510 that mimics a mine and is used to test the system 100, and a set of training materials that are stored on an external memory device such as a floppy disk 1515 (as shown), a USB memory key, or a CD-ROM. The kit 1500 may include a support sling 1517 that attaches to the interface controller 110 and to clothing worn by a user, such as, for example, a load-bearing vest, to relieve some of the weight of the system 100 during operation.

The kit 1500 includes a storage and transport container 1520, an additional support handle 1525 for carrying the container 1520, and a backpack 1530. The container 1520 is sized to receive the backpack 1530 and includes a lid 1522 and a base 1524. The container 1520 may be lined with cushioning such as foam 1535 to protect the system 100 during storage and transport. Additionally, the container 1520 may be vacuum or air sealed to prevent moisture from entering the system 100 during storage. The seal of the container 1520 is broken by use of an air pressure release valve 1540 on a front of the container 1520.

The backpack 1530 is sized to receive the system 100 in a folded state (shown in FIG. 4), the batteries 1505, the test piece 1510, the floppy disk 1515, and the support sling 1517 (if provided). Thus, during storage in the container 1520, all of the equipment is stored within the backpack 1530, which is then stored in the container 1520. Such a configuration reduces size requirements for storage and transport.

Figure 16:
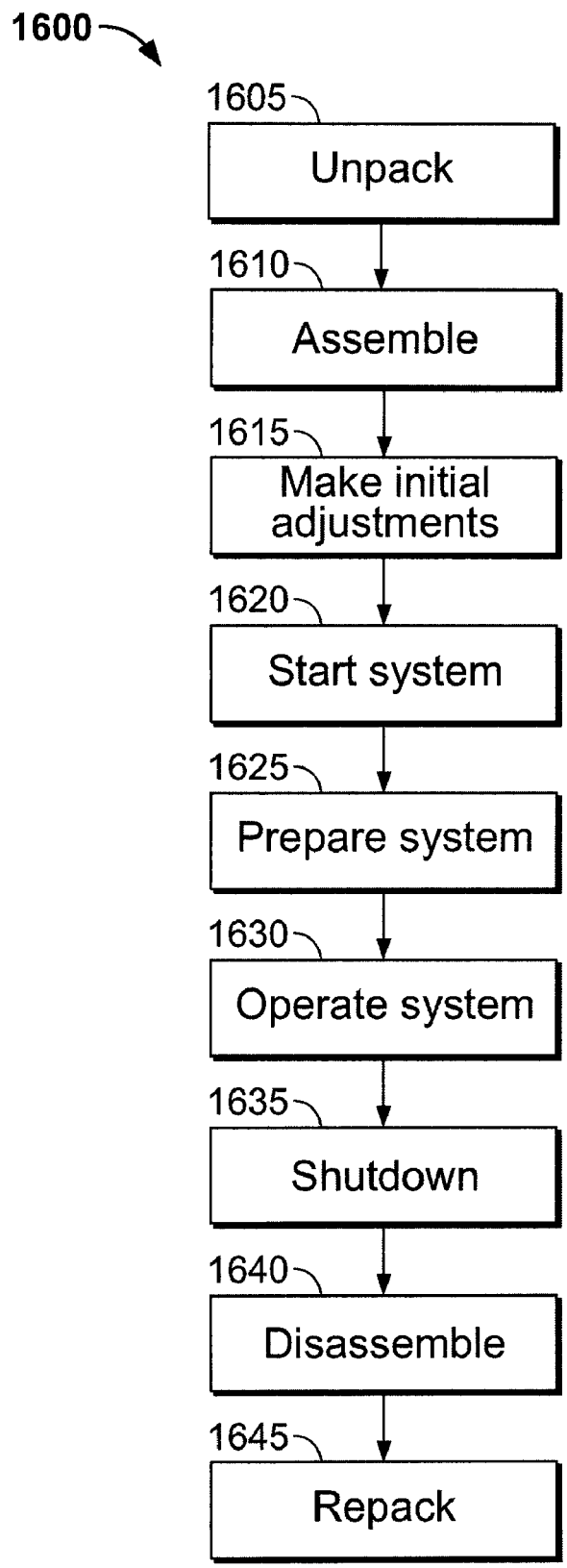
FIG. 16 is a flow chart of a procedure performed by a user for unpacking, preparing, and operating the mine detection system of FIG. 1.

Referring to FIG. 16, a procedure 1600 is performed to use the system 100. Initially, the user unpacks the system 100 from the container 1520 (step 1605) and assembles the system 100 prior to use (step 1610). Initially, during unpacking (step 1605), the user opens the valve 1540 and unlatches the container lid 1522 from the base 1524. Then, the user removes the backpack 1530 from the container 1520 and opens the backpack 1530. The user then removes the system 100 and any other needed equipment from the backpack 1530.

Referring also to FIG. 4, during assembly (step 1610), the user unlatches the yoke 212 from the cradle 127 and unfolds the shaft 120 away from the cradle 127. The user secures the shaft 120 with the latch 215 and unfolds the electronics unit from the cradle 127, as shown in FIG. 3. The user rotates the search device 105 relative to the shaft 120 and the interface controller 110 relative to the cradle 127, as shown in FIG. 1. The user also opens the clamps 205 and expands the segments 200 out to a comfortable position. When the comfortable position is reached, the user closes the clamps 205 to secure the segments 200 and the shaft 120 for use.

Referring also to FIG. 8, the user opens the latches 625, removes the battery pack lid 630 from the case 620, and inserts the battery 615 into the case 620 making sure the battery connector 640 is properly connected to the case connector 645. The user replaces the lid 630 and closes the latches 625. Then, the user connects the battery connector 605 to the electronics unit connector 900, as shown in FIG. 10. If the earpiece 135 is to be used along with the speaker 137, then the user connects the earpiece connector 805 to the electronics unit connecter 910, as shown in FIG. 10. Next, the user inserts her arm through the armrest 125 and grabs the handle 410 of the interface controller 110 (FIGS. 1, 5, and 6). The user can adjust the position of the handle 410 by rotating the handle 410 and by sliding the handle and the controller 110 along the cradle 127. The user can also adjust the tightness of the armrest 125 to her personal comfort.

Once the system is unpacked and assembled (steps 1605 and 1610), the user makes initial adjustments to the system 100 (step 1615). If only the earpiece 135 is to be used during operation (that is, the speaker 137 is not active), then the user should connect the earpiece 135 to the unit 115 during these initial adjustments (step 1615) and prior to startup. If only the speaker 137 is to be used during operation (that is, the earpiece 135 is not active), then the user should not connect the earpiece 135 to the unit 115 during these initial adjustments (step 1615) and prior to startup. If both the earpiece 135 and the speaker 137 are to be used, the user should connect the earpiece 135 after the system 100 is turned on (as discussed below).

After the initial adjustments are made (step 1615), the user starts the system 100 (step 1620). Initially, referring also to FIG. 5, the user sets the radar sensitivity switch 425 to a center position and pushes the power switch 415 momentarily to the on position (for example, to the right). The user then lets the system 100 warm up for a predetermined time such as five minutes. Next, the user pushes the power switch 415 momentarily to the off position (for example, to the left) to shut down the system 100. Then, the user pushes the power switch 415 momentarily to the on position once again while the search device 105 is resting on the ground. The user then waits until the processor 231 or the processor 236 sends a signal to the audio device 135 or 137 indicating that the system 100 is ready to be trained. The power and function indicator 445 emits a signal (such as a flashing light) after the system 100 has completed startup (step 1620).

After startup (step 1620), the user prepares the system 100 (step 1625) by calibrating the system 100 to the local ground and electromagnetic interference (EMI) conditions and training the system 100, as discussed in detail below with respect to FIG. 17. Once the system 100 is prepared (step 1625), the user can then operate the system (step 1630), as discussed in detail below. When the user is finished operating the system 100 (step 1630), the user shuts down the system 100 by pushing the power switch 415 to the off position (step 1635). After the system 100 is shut down (step 1635), the user disassembles the system 100 (step 1640) and repacks the system 100 (step 1645) in the backpack 1530 and the container 1520 in a reverse order from which the system is assembled and unpacked.

Figure 17:
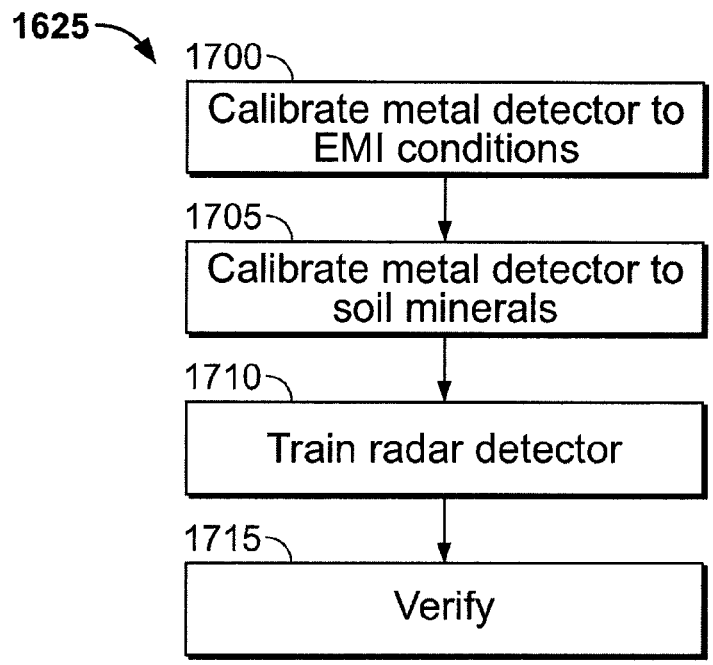
FIG. 17 is a flow chart of a procedure performed by a user for preparing the mine detection system of FIG. 1 for operation.
Figure 18:
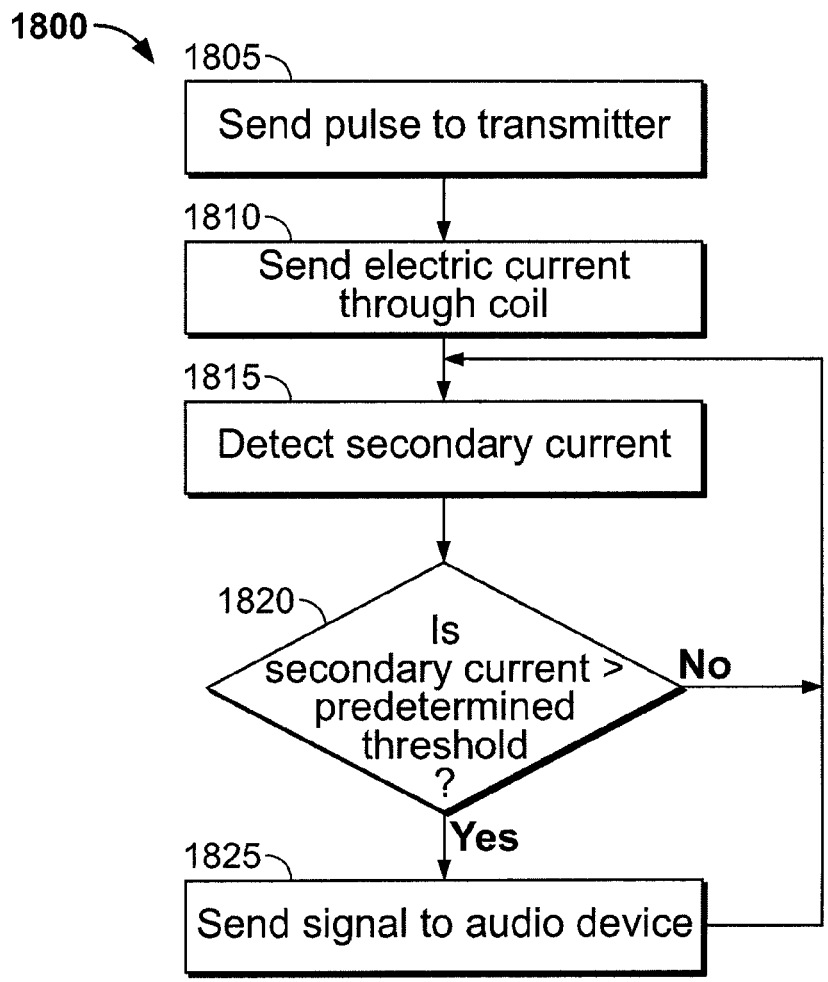
FIG. 18 is a procedure performed by the metal detector of the mine detection system of FIG. 1 for detecting a presence of a mine.
Figure 19:
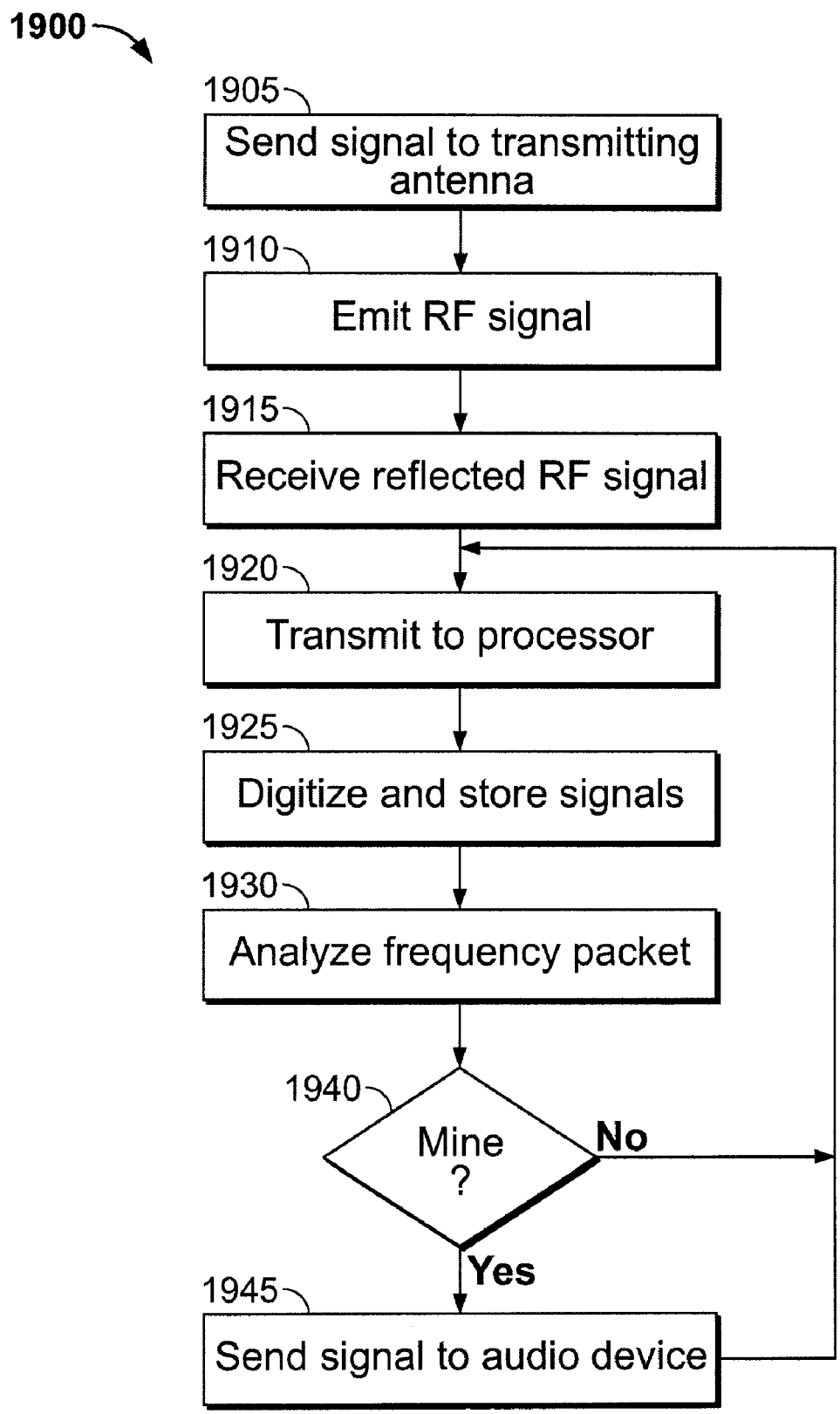
FIG. 19 is a flow chart of a procedure performed by the radar detector of the mine detection system of FIG. 1 for detecting a presence of a mine.

Referring to FIG. 17, the user performs a procedure 1625 to prepare the system 100. Initially, the user performs a procedure for canceling the effects of EMI conditions on operation of the metal detector (step 1700). During this procedure, the user holds the search device 105 on the ground but not above metal for a predetermined duration (such as 55 seconds). During this duration, the user pushes the metal detection control switch 420 to the left momentarily, and the processor 231 causes the audio device 135 or 137 to continually emit an audio signal such as "noise cancel" indicating to the user that the system 100 is being calibrated to the effects of the EMI conditions. At the end of the duration, the processor 231 causes the audio device 135 or 137 to emit an audio signal such as "noise cancel complete" indicating to the user that the system 100 has been calibrated to the effects of the EMI conditions.

Next, the user performs a procedure for canceling the effects of minerals in the soil on operation of the metal detector (step 1705). Before beginning this procedure, the user ensures that the area is free of all metallic targets. The user then holds the search device 105 a predetermined height (for example, 6-10 inches) above the surface of the ground and pushes and holds the metal detection control switch 420 to the right (FIG. 5). At this time, the processor 231 causes the audio device 135 or 137 to emit a message such as "cal mode" to indicate to the user that the system 100 is being calibrated to the effects of minerals in the soil. The user then maneuvers the search device 105 in an appropriate manner while this calibration is taking place. For example, the user lowers the search device 105 slowly to the ground surface and then returns it to the predetermined height in a smooth, continuous motion for about four seconds. Or, the user moves the search device 105 up and down relative to the ground surface for a predetermined time period. When the user finishes maneuvering the search device 105, the user releases the metal detection control switch 420 and listens for an audio signal emitted from the device 135 or 137 indicating that calibration is complete. For example, the processor 231 may send a "cal mode complete" signal to the audio device 135 or 137 after the user releases the control switch 420.

Moreover, the user may perform this procedure (step 1705) at any time if the user determines that background audio levels have increased or decreased during normal operation as long as there is no mineralized soil or metal in the region.

Next, the user trains the radar detector electronics 235 (step 1710) over ground that is similar to the area to be searched. Training sets a baseline for the mine detection system 100 to compare future readings. Furthermore, the system 100 is retrained when the ground to be swept is drastically different from the ground on which the system 100 was trained. In this case, the system 100 is first shut down completely (step 1635) and then restarted (step 1620). To train, the user pushes and holds the trigger switch 435 (FIG. 6) on the interface controller 110. Then, the user performs a normal sweep pattern over the ground in front of the user, advancing about ⅓ of the diameter of the search device 105 after each swing while keeping the search device 105 below a predetermined height (for example, 2 inches) from the ground. The user can then cover about 3-6 feet of ground in a forward direction during the normal sweep pattern. The user performs the normal sweep pattern while the processor 236 sends a signal to the audio device 135 or 137 to emit a "training" sound. The user releases the trigger switch 435 when the user hears the sound "training complete" from the audio device 135 or 137. The training takes about 45 seconds and at the end of the training, the processor 236 sends a signal to the audio device 135 or 137 to emit a sound (for example, "localize") indicating that the user can begin normal operation of the system 100.

Generally, during start up (step 1620), the user can set the radar sensitivity switch 425 to an up position. The user can adjust the radar sensitivity by moving the switch 425 to accommodate for the user's sweeping technique or a particular terrain.

After training (step 1710), the user then verifies that the system 100 is ready to be operated (step 1715). During verification, the user releases the trigger switch 435, places the test piece 1510 on the ground, passes the search device 105 over the test piece 1510, and verifies proper operation of the metal detector and the radar detector by listening for audio signals from the devices 135 or 137. If either or both of the audio signals are not heard, then the user must shut down the system 100 (step 1635) and repeat startup (step 1620) and preparation (step 1625).

After the system has been prepared (step 1625), the user can operate the system 100 during normal operation (step 1630). During normal operation, the user pushes the trigger switch 435 (FIG. 6) on the interface controller 110 and performs a sweep technique, which is detailed below. During this time, the metal detector (made up of the electronics 230 and the coil 265) and the radar detector (made up of the electronics 235 and the antennas 270, 275, and 280) operate independently and simultaneously to detect mines in the vicinity of the sweep. Both detectors transmit and receive data and automatically and continuously update the audio signal sent to the device 135 or 137 to notify the user of any changes in detection that might indicate the presence of a mine. As discussed above, the two detectors are operationally compatible with each other such that they do not interfere with each other during simultaneous operation.

Referring to FIG. 18 and again to FIGS. 2 and 13, the metal detector electronics 230 perform a procedure 1800 during a sweeping operation (either during preparation at step 1625 or during normal operation at step 1630). Initially, the pulse generator 232 sends pulses to the transmitter 233 (step 1805), which transmits electric current to the coil 265 (step 1810). The electric current through the coil 265 induces a magnetic field 1300 that emanates from the coil 265 and into the ground 1305. When the magnetic field strikes a metal object 1310, it induces a secondary magnetic field in the metal object 1310. The secondary magnetic field of the metal object 1310 induces a secondary current in the coil 265. The processor 231 monitors the current from the coil 265 and detects the secondary current by detecting a change in the electric current through the coil 265 from the transmitter 233 (step 1815). If the processor 231 determines that the secondary current is greater than a predetermined threshold (step 1820), then the processor sends an audio signal to the device 135 or 137 to indicate to the user that metal is present under the ground 1305 (step 1825).

Referring to FIG. 19 and again to FIG. 14, the radar detector electronics 235 perform a procedure 1900 during a sweeping operation (either during preparation at step 1625 or during normal operation at step 1630). The radio frequency generator 237 continuously sends a radio frequency (RF) signal of sufficient strength or power for the radar sensitivity desired (as determined by the configuration of the radar sensitivity switch 425) to the transmitting antenna 270 (step 1905). The transmitting antenna 270 emits the RF signal 1400 into the ground 1405 (step 1910). Either or both of the receiving antennas 275 and 280 collect any RF signals 1410 that have been reflected by an underground feature 1415 and that reach the antenna 275 or 280 (step 1915). During this process, the generator 237 steps the RF signal between a start frequency and a stop frequency in equal increments. For each frequency step, the RF signals reflected from the underground feature 1415 are received by the antenna 275 or 280, which transmits the RF signals to the processor 236 (step 1920), which then digitizes and stores the signals (step 1925). The processor 236 collects the data for all steps between the start and stop frequencies and the data collection is referred to as a "frequency packet." The processor 236 analyzes the frequency packet (step 1930) to determine if a mine is underground (step 1940). If the processor 236 determines that a mine is underground, the processor 236 sends a signal to the audio device 135 or 137 indicating the presence of the mine (step 1945). If the processor 236 determines that a mine is not underground (step 1940), then the processor 236 simply awaits the next transmission from the antenna 275 or 280 (step 1920).

As mentioned above, the user "sweeps" the mine detection system 100 to detect mines, with the quality of the mine detection results being directly related to the quality of the user's sweep technique. The important components to a proper sweep technique are the user's stance, the position of the search device 105, the speed at which the user sweeps the search device 105, and the coverage of the sweep (called a lane).

First, the user stands in a comfortable and balanced position that permits the user to cover a full lane width without having to change position.

Figure 20:
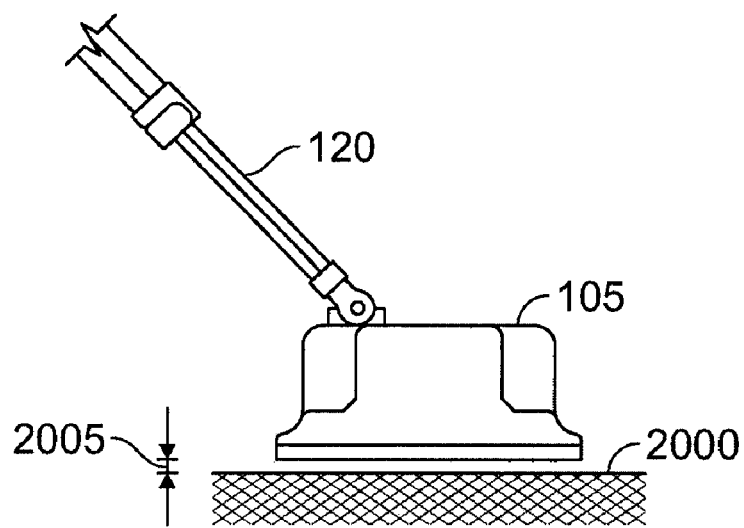
FIGS. 20 and 21 are side views of the search device of the mine detection system of FIG. 1.

Second, referring to FIG. 20, the search device 105 is positioned parallel to and as close to the ground 2000 as possible but not more than a predetermined height 2005 above the ground. In one implementation, the predetermined height 2005 is 2 inches. Moreover, before beginning a sweep, the user adjusts the relative angle between the search device 105 and the shaft 120 to ensure that the search device 105 is parallel to the ground during a sweep.

Third, the user sweeps the search device 105 across the ground within a predetermined sweep speed. In one implementation, the sweep speed is between about 1 to 3.6 feet/second across a five-foot lane.

Figure 21:
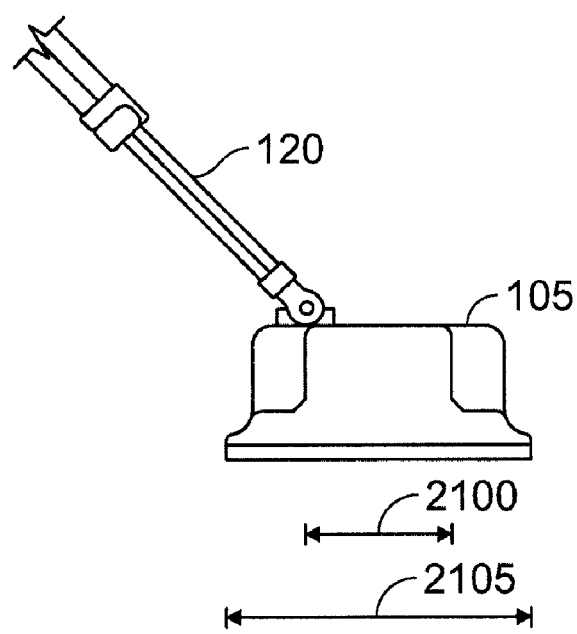

Fourth, the user moves the search device 105 across a lane in as straight a line as possible, while trying not to pull the search device 105 back toward the user's body or rock the device 105 near the edge of the lane. Referring also to FIG. 21, the actual search width 2100 of the radar detector does not extend to the edges of the search device 105. In practice, the search width for the radar detector extends to the locations of the antennas 270, 275, and 280 and is indicated on a top of the search device 105 by a different colored marking, called a sweet spot 282 (FIGS. 1 and 11). The search width 2105 of the metal detector is approximately equal to the diameter of the coil 265. Because the search width 2100 for the radar detector is about ⅓ of the diameter of the search device 105, the search device 105 should be moved forward no more than about ⅓ of the diameter of the search device 105 between sweeps.

Figure 22:
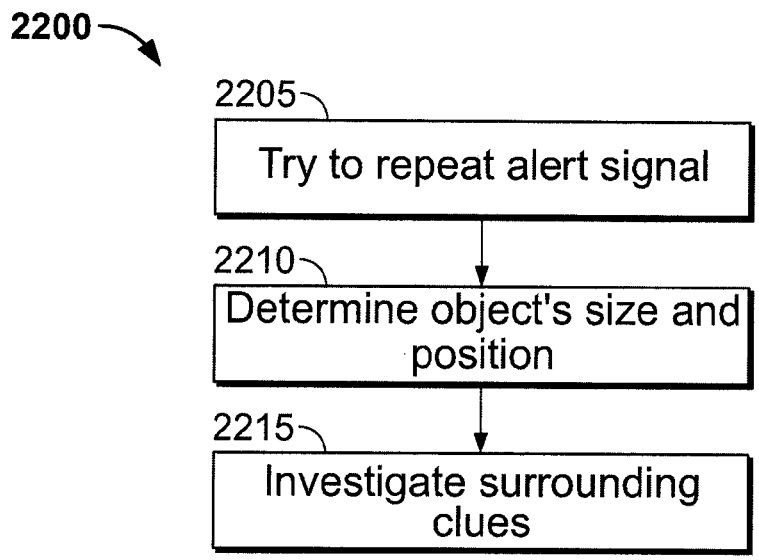
FIG. 22 is a flow chart of a procedure performed by a user of the mine detection system of FIG. 1 after receiving an alert signal.

If the user passes the search device 105 over a suspected buried mine or debris, the processor 231 of the metal detector sends a tone to the audio device 135 or 137 or the processor 236 of the radar detector sends a beep to the audio device 135 or 137. In this way, the user can distinguish between the results from the radar detector and the results from the metal detector. After the user hears the tone or the beep, the user then investigates the suspected mine further according to a procedure 2200 as shown in FIG. 22. To investigate the suspected mine, the user typically first tries to repeat the alert signal (that is, the beep or the tone) (step 2205). To do this, the user repeats the sweep several times at different angles over the same area while adjusting sensitivity higher or lower if necessary. If the new sweep does not repeat the alert signal then the user can continue sweeping the lane. Next, once the alert signal has been repeated, the user can then proceed to determine the object's size and position (step 2210). Meanwhile, the user also investigates surrounding clues (step 2215) to make an overall determination of the location of a mine.

Figure 23A:
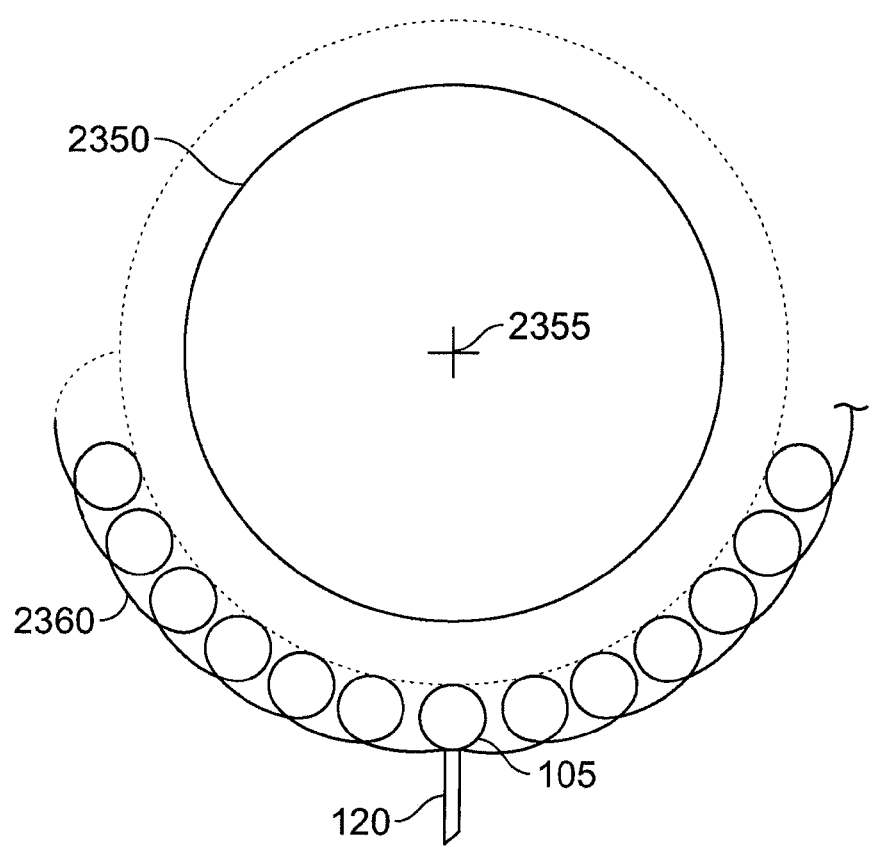
FIG. 23A shows an overhead view of a sweep pattern performed by a user of the metal detector of the mine detection system of FIG. 1.
Figure 23B:
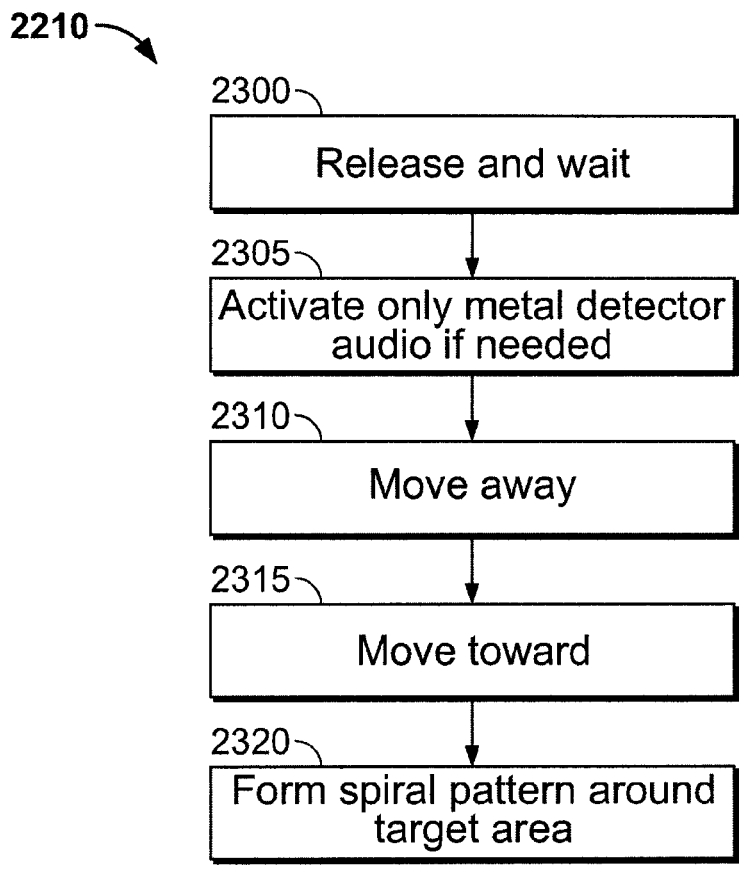
FIG. 23B is a flow chart of a procedure performed by the user during the sweep pattern of FIG. 23A.

Referring also to FIGS. 23A and 23B, in determining the object's size and position at step 2210, the user performs a procedure 2210 if using the metal detector to investigate. First, the user releases the trigger switch 435 and waits for an audio ready signal such as "localize" (step 2300). If needed, the user then moves the audio control switch 430 to the right to activate the metal detector only (step 2305). Next, the user moves the search device 105 back from the suspected mine area 2350 until the audio sound for the metal detector diminishes (step 2310) and then moves the search device 105 toward the center 2355 of the suspected mine area 2350 until the audio sound for the metal detector is heard or increases (step 2315). The user moves the search device 105 back and forth and in and out such that the search device 105 spirals around the target area (step 2320), thus forming a spiral pattern 2360.

Figure 24A:
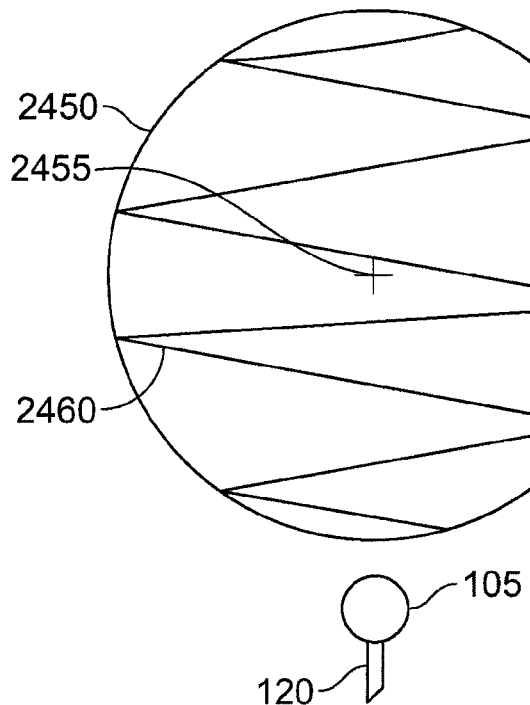
FIGS. 24A and 24C show overhead views of sweep patterns performed by a user of the radar detector of the mine detection system of FIG. 1.
Figure 24B:
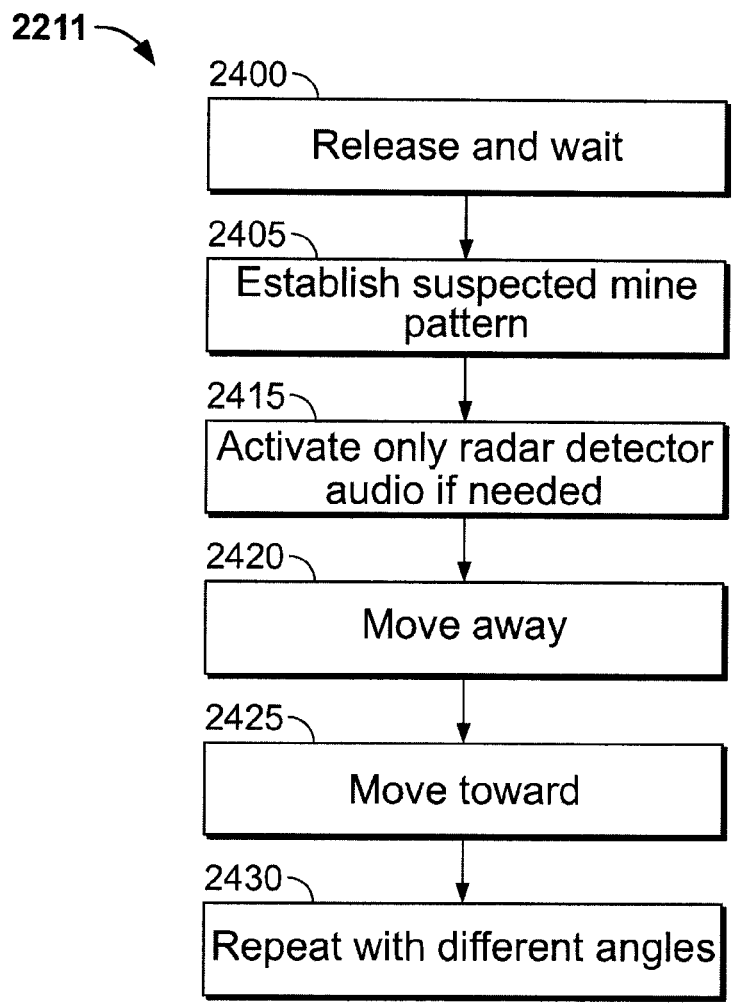
FIG. 24B is a flow chart of a procedure performed by the user during the sweep pattern of FIGS. 24A and C.
Figure 24C:
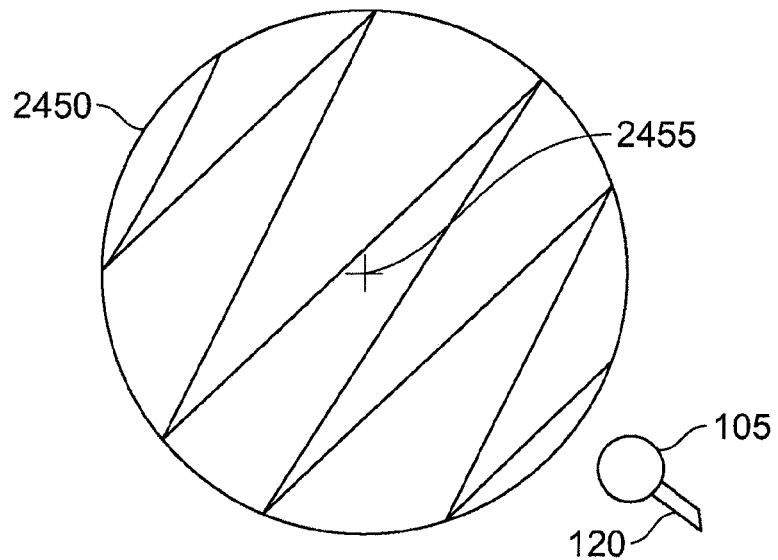

Referring also to FIGS. 24A and 24B, in determining the object's size and position at step 2210, the user performs a procedure 2211 if using the radar detector to investigate. First, the user releases the trigger switch 435 and waits for an audio ready signal such as "localize" (step 2400). Then, the user establishes the suspected mine pattern using the procedure 2210 detailed in FIG. 23B (step 2405). If needed, the user then moves the audio control switch 430 to the left to activate the radar detector only (step 2415). Next, the user moves the search device 105 back from the suspected mine area 2450 until the audio sound for the radar detector stops (step 2420). Then, the user moves the search device 105 in short sweeps within the suspected mine area 2450 and around the approximate center of the mine 2355 until the audio sound for the radar detector is heard (step 2425). The user continues the short forward sweeps through the suspected mine area 2450 while the radar detector alerts are activating, thus forming a zigzag pattern 2460. The user then repeats the zigzag pattern from several different approach angles (one alternate zigzag pattern 2465 is shown in FIG. 24C) to verify the results of the suspected mine location (step 2430).

The user can also use characteristics of known mines to evaluate the results of the investigation. For example, an anti-tank, metallic mine (AT-M) shows a metal detector footprint of a semi-circular halo of about 20-26 inches from the mine center when buried at a depth of 5 inches and a radar detector footprint of an outside edge of about 13 inches in diameter.

Other implementations are within the scope of the following claims. For example, the audio signals sent to the audio device 135 or 137 may be sounds other than beeps or tones.

Figure 25A:
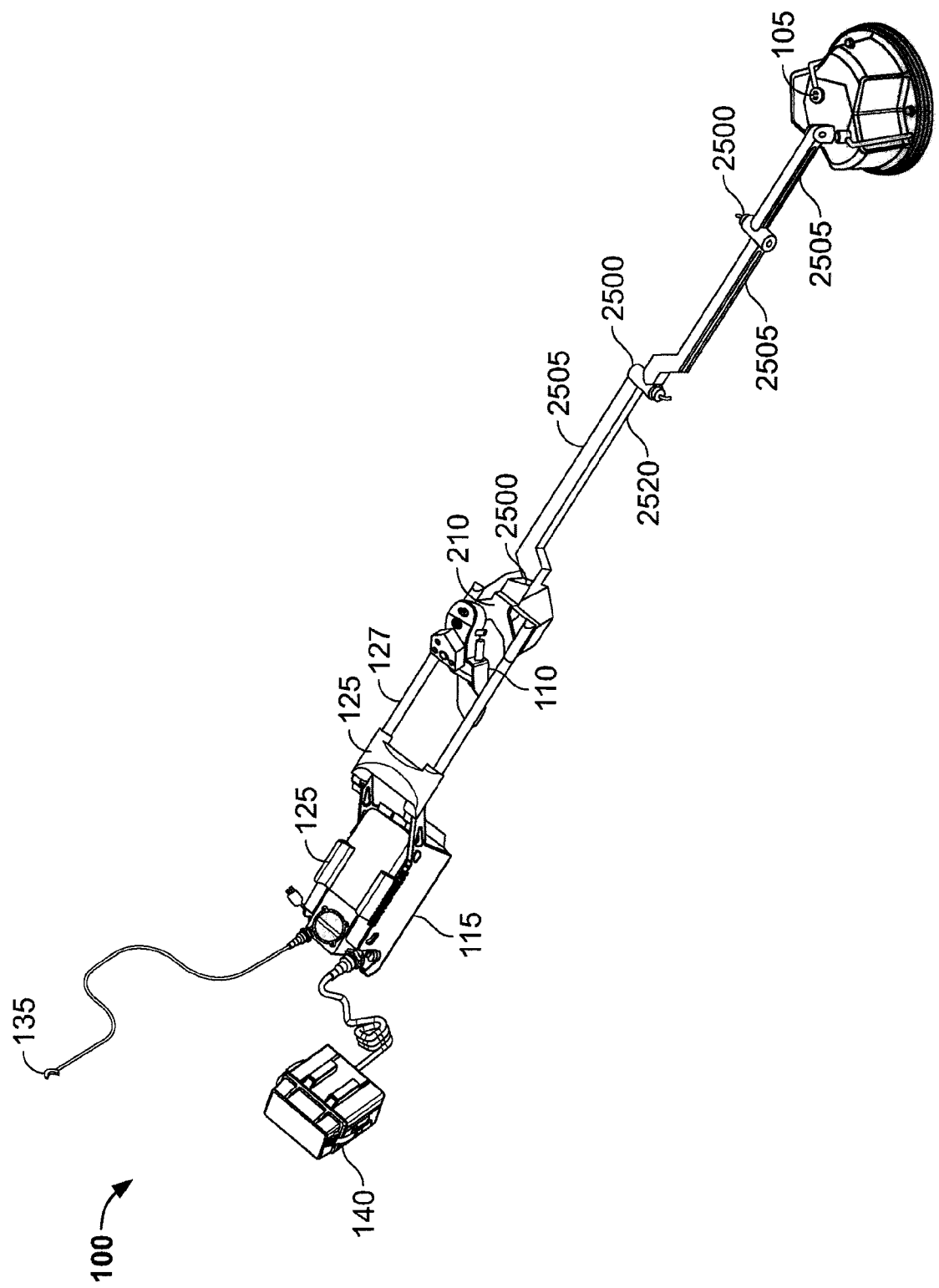
FIGS. 25A and 25B show another implementation of the mine detection system of FIG. 1.
Figure 25B:
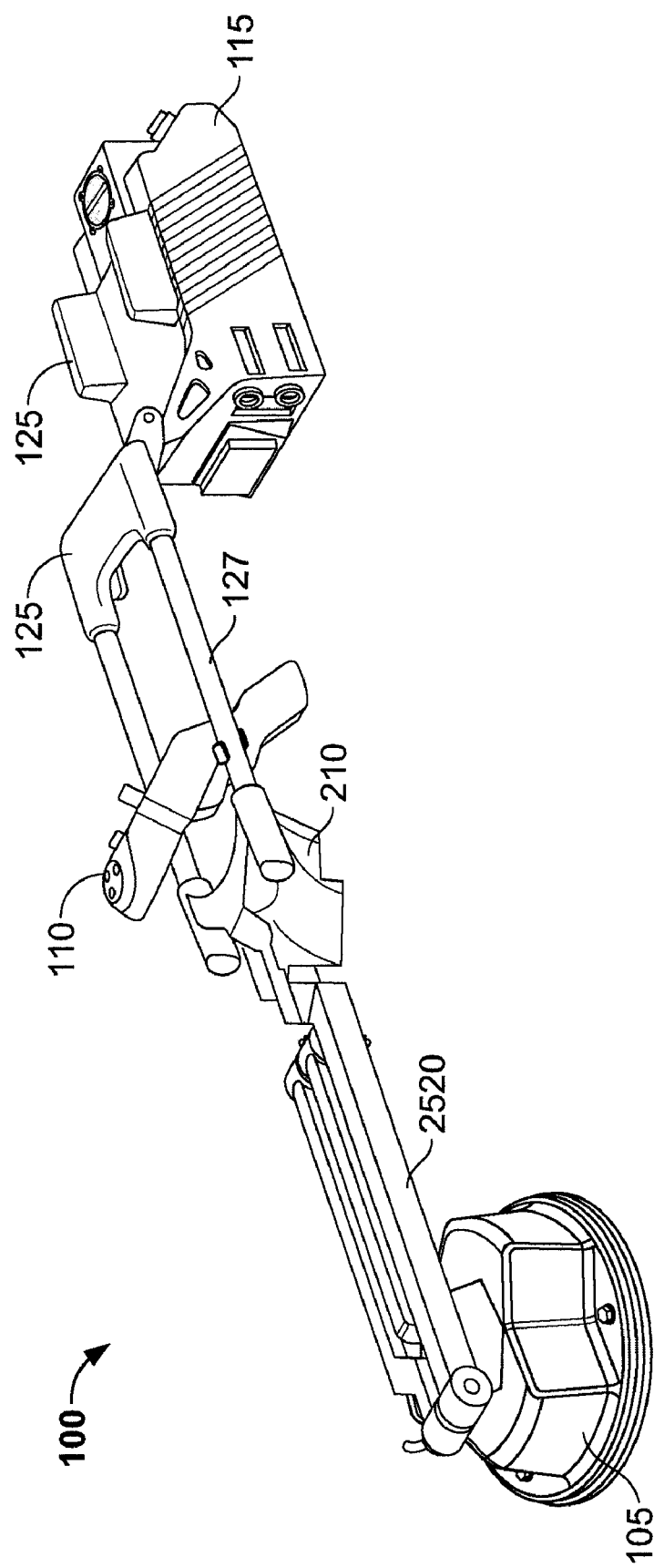

Referring also to FIGS. 25A and 25B, in another implementation, instead of the telescoping shaft 120, the shaft 2520 is articulated at joints 2500 to form segments 2505. Thus, each segment 2505 can be folded over to reduce the length for storage and transportation (as shown in FIG. 25B).

The mine detection system 100 may include infrared detection integrated with the radar and the metal detection. The radar detector may include more than one transmitting antenna and more than two receiving antennas.

In the procedure discussed above, the metal detector (made up of the electronics 230 and the coil 265) and the radar detector (made up of the electronics 235 and the antennas 270, 275, and 280) operate independently and simultaneously to detect mines in the vicinity of the sweep. Thus, each detector includes its own processor. However, in another implementation, a single processor can be used to control both the metal detector and the radar detector. The processor can run a single algorithm for analyzing the results and notifying the user of any changes in detection that might indicate the presence of a mine.

Figure 26:
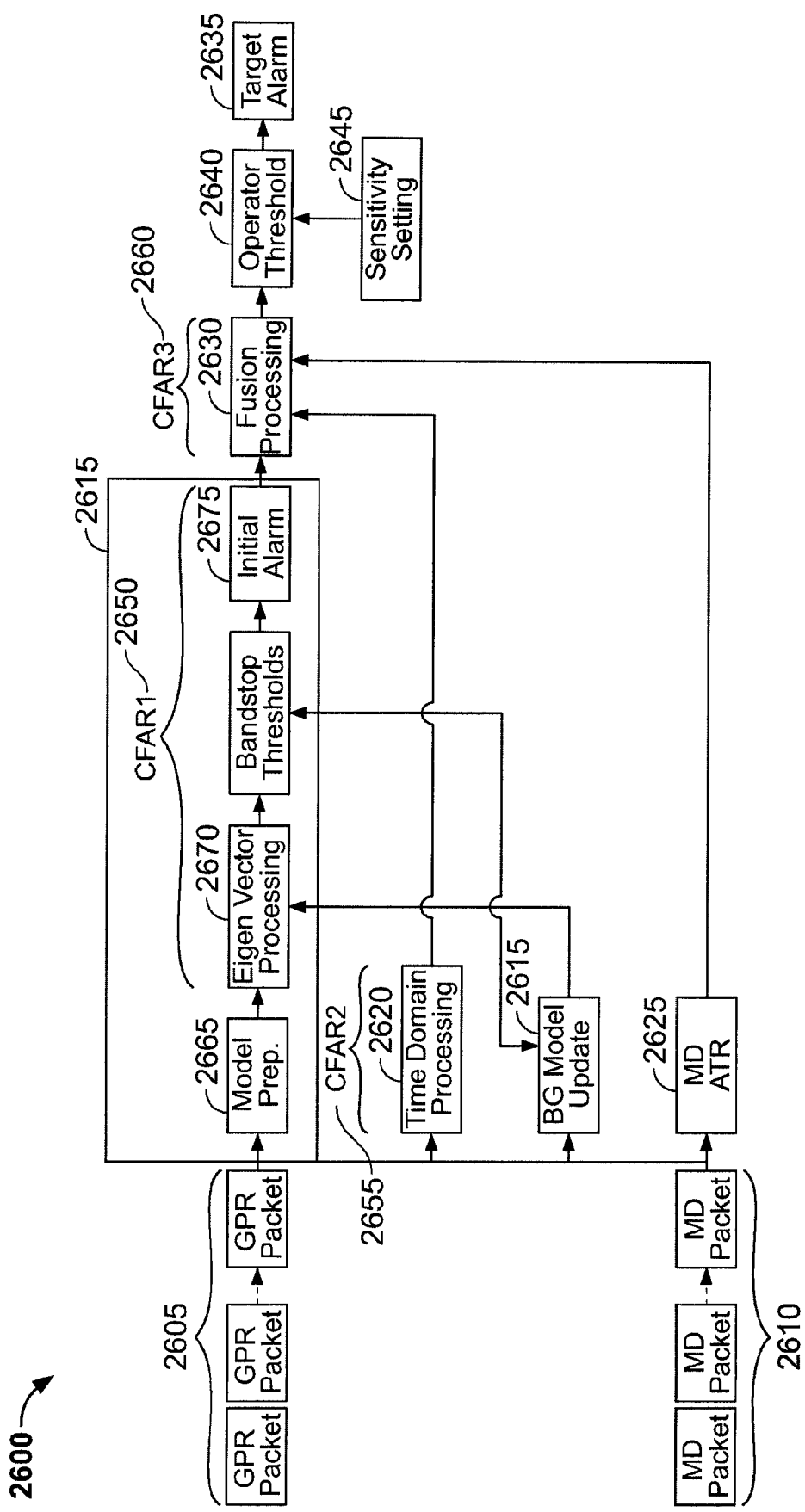
FIGS. 26-28 are flow charts of procedures performed by a processor of the radar detector within the mine detection system of FIG. 1.

In one implementation, the processor 236 analyzes the data (that are in the form of packets) from the transmitting and receiving components of both the radar detector and the metal detector to determine if a mine is underground at step 1940. Referring to FIG. 26, in this implementation, the processor 236 uses a procedure 2600 that begins by receiving the data packet from the radar detector receiving component (for example, the antennas 275 and 280) (step 2605) and receiving the data packet from the metal detector that came from its receiving component, that is, the coil 265 (step 2610).

The processor 236 analyzes a model of radar detector response to current ground conditions using a principal component analysis to describe clutter features, as detailed below (step 2615). The processor 236 also transforms the radar data from the frequency domain to the time domain in order to analyze the depth of the anomaly (step 2620). The processor 236 receives results from the analysis of the metal detector (step 2625) and uses these results later to eliminate clutter noise and localize alarms from the radar detector.

Next, the processor 236 compares the results of the model analysis from step 2615, the depth analysis from step 2620, and the metal detector analysis from step 2625 (step 2630) to make a determination of whether an alert signal should be sent to the audio device 135 or 137 (step 2635) based on a signal threshold 2640 that depends, at least in part, on the sensitivity setting 2645 from the radar sensitivity switch 425.

Additionally, at various stages (for example, steps 2650, 2655, and 2660) during the procedure 2600, the processor 236 adjusts the signal threshold 2640 to maintain a constant false alarm rate (CFAR). Often, the alarm rate can rapidly rise or drop with abrupt changes in background statistics due to changing ground conditions. Thus, the processor 236 dampens the effects of the changing ground conditions by recognizing a rapid change in background statistics and adjusting the signal threshold 2640 on the fly to accommodate for such changes.

Figure 27:
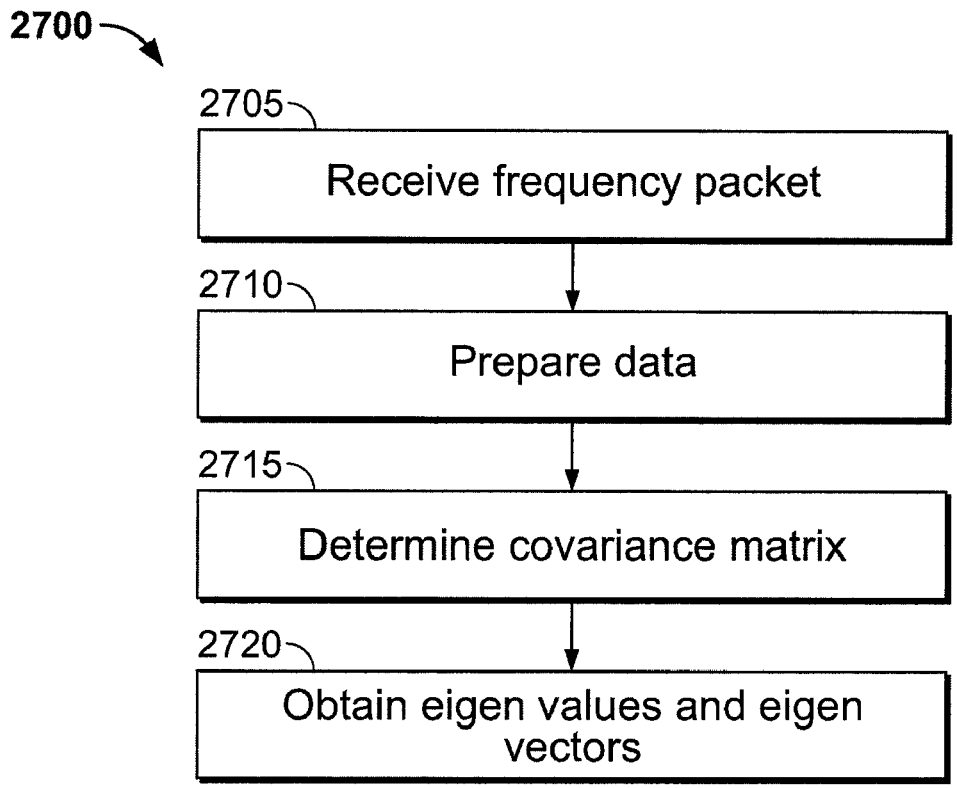

Referring also to FIG. 27, the model of radar detector response is trained prior to use of the mine detection system 100 using a procedure 2700. Initially, data is collected from a trial run in a mine-free region such that the only features present during the trial run are clutter features. Typically, clutter and noise data remain relatively constant from scan to scan and often contain less energy than data obtained from scans of mines. Ultimately, common features among the clutter scans are captured and new scans that display significantly distinct features are considered to contain mines.

Although the scans for data can be applied to many different types of clutter features, the scans for data are based on principal components analysis (PCA), which describes features through principal components, thus permitting automation and enabling adaptation to clutter features in local environments. The number of variables involved in the modelling is reduced and the structure of the relationships between variables can be detected using PCA.

Basically, PCA involves a mathematical procedure that transforms a number of possibly correlated variables into a smaller number of uncorrelated variables that are called principal components. The first principal component accounts for as much of the variability in the data as possible, and each succeeding component accounts for as much of the remaining variability as possible. PCA determines a direction with the most variance and rotates the space such that this direction is now the first dimension. Then, PCA finds the direction with the next largest variance and rotates the space such that this direction is the second dimension. This process continues until all dimensions are accounted for. The result is a new feature space with the same number of dimensions as the original space but with the variance concentrated in the lower order dimensions.

In general, the mathematical technique used in PCA is eigen analysis in which the eigenvalues and the eigenvectors of a square symmetric matrix are solved with sums of squares and cross products. The eigenvector associated with the largest eigenvalue has the same direction as the first principal component. The eigenvector associated with the second largest eigenvalue determines the direction of the second principal component. The sum of the eigenvalues equals the trace of the square matrix and the maximum number of eigenvectors equals the number of rows (or columns) of this matrix.

Referring to FIG. 27, to begin the PCA process, the processor 236 receives the collected data from the trial run in the form of frequency packets (step 2705). Typically, several hundred clutter-only frequency packets are received. Next, the data is prepared (step 2710) and the covariance matrix is determined (step 2715). Then, using single value decomposition, the eigenvalues and eigenvectors are obtained (step 2720).

Referring again to FIG. 26, once the model is trained using the procedure 2700, the processor 236 can update the model using a procedure 2615. Initially, the data received in the form of frequency packets (step 2605) are prepared (step 2665). Then, the processor 236 processes the prepared data using PCA (step 2670), a procedure further discussed below. Based on the PCA, the processor 236 outputs a preliminary result of whether a mine is present (step 2675).

Figure 28:
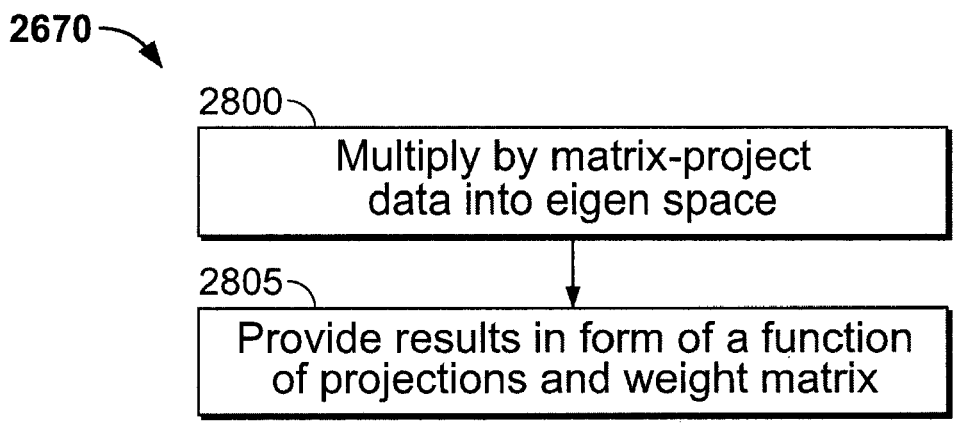

Referring also to FIG. 28, the processor 236 processes the prepared data using a PCA procedure 2670. Initially, the processor 236 projects the prepared data into eigenspace by multiplying the data vector by the eigenvalue matrix (step 2800). Then, the results are provided in the form of a function of the projection of the data and the weight matrix (step 2805).

Figure 29:
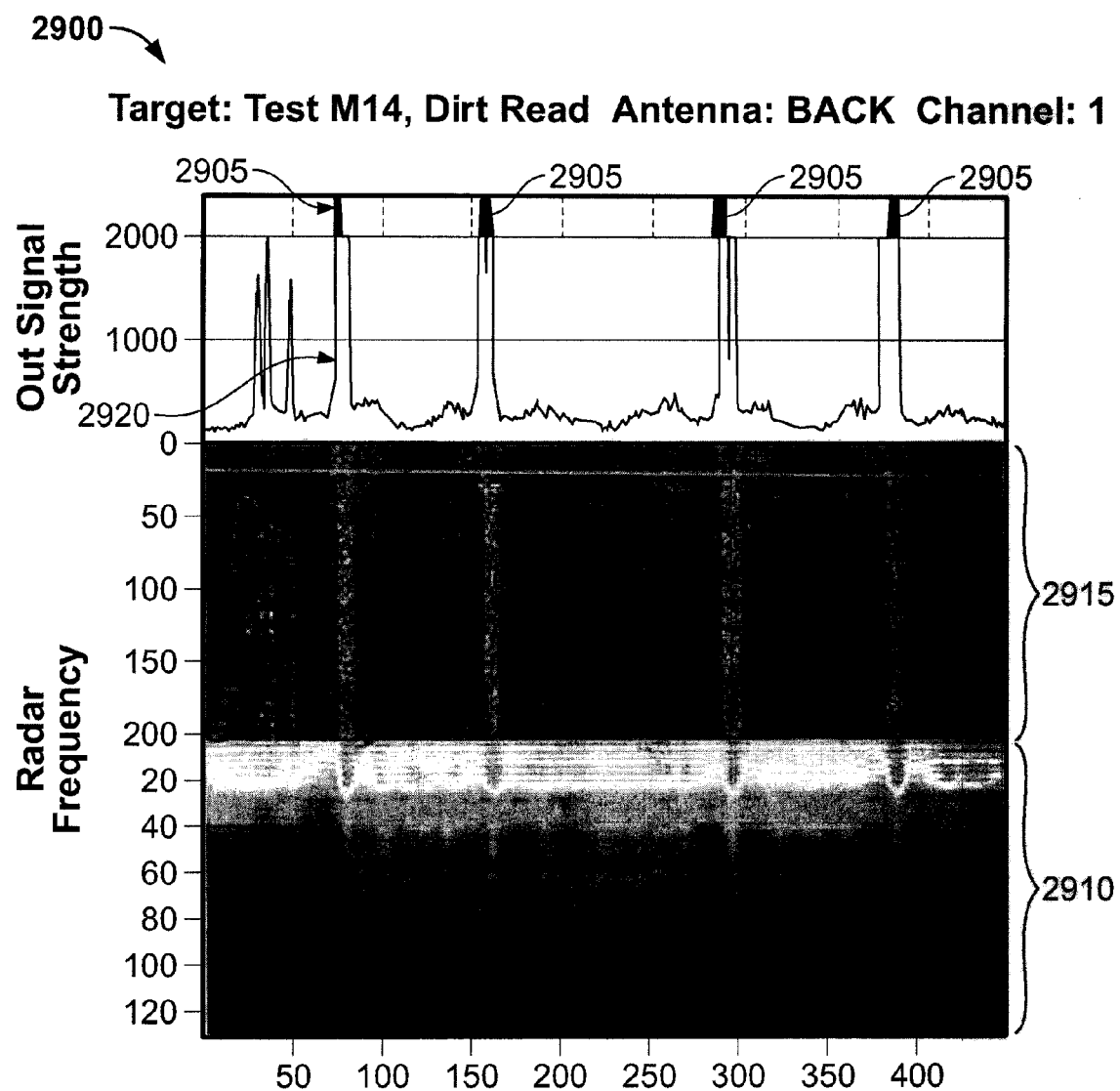
FIG. 29 is a graph of sample results produced by the processer using the procedures of FIGS. 26-28.

Because PCA can safely discard some of the higher order dimensions, noisy sources of variability are removed and the dimensionality of the input is reduced, thus making modelling simpler. Referring to FIG. 29, sample results for PCA in the form of a graph 2900 are shown for various mine locations 2905. Raw data 2910 is input into PCA and PCA outputs a signal 2915 that has a strength measured in the upper graph 2920. As shown, PCA enhances the target-to-clutter signal ratio.

Referring again to FIG. 26, the processor 236 transforms the radar data from the frequency domain to the time domain at step 2620. As discussed above, during operation of the system 100, the radar data is stepped through frequencies. Typically, the range through which the radar is stepped is about one and a half gigahertz. The processor 236 uses Fourier transformation to transform the radar data from the frequency domain to the time domain. Because the data is transformed into the time domain, information about depth (if using two or more antennas) or distance to the mine may be obtained.

The system 100 employs two receiving antennas 275 and 280 to determine the depth of a mine. For example, with a single receiving antenna, an object located five inches directly below the antenna might appear to be in the same time domain location as an object located three inches deep but four inches laterally from the antenna (where the distance from the antenna to the object is still five inches). By using a second receiving antenna, data from the two receiving antennas may be correlated to permit a higher degree of accuracy and to permit a determination of depth.

Referring again to FIG. 26, the processor 236 compares the results of the model analysis, the depth analysis, and the metal detector analysis (step 2630) to make a determination of whether an alert signal should be sent to the audio device 135 or 137 (step 2635). The comparison may determine that the alert signal should be sent even if model analysis provides a weak mine signal if the metal detector analysis signal is strong.

Figure 30:
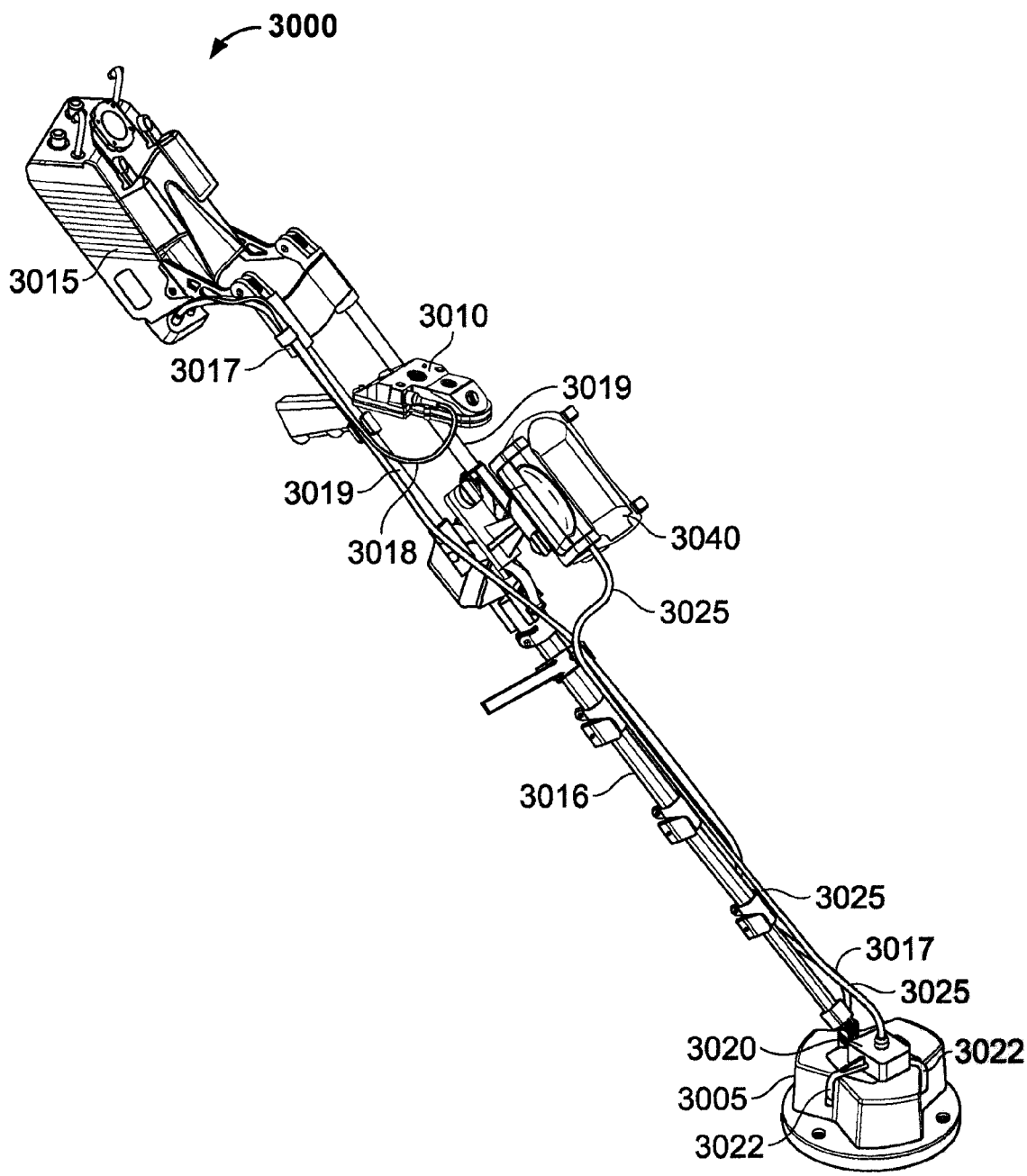
FIGS. 30-34 show a buried object detection system with a motion and position measuring module.

Referring to FIGS. 30-48, a handheld wand-type scanning system also may include a motion and position measuring module. FIG. 30 depicts one example of a buried object detection system 3000 that includes a motion and position measuring module. The buried object detection system 3000 is one example of a handheld wand-type scanning system.

More particularly, the buried object detection system 3000 includes a sensor head 3005, an interface controller 3010, and an electronics unit 3015. The sensor head 3005 may be an implementation of the search device 105, the interface controller 3010 may be an implementation of the interface controller 110, and the electronics unit 3015 may be an implementation of the electronics unit 115, all of FIGS. 1, 2, 13 and 14. The sensor head 3005 also may be referred to as a wand head.

The buried object detection system 3000 also includes an elongated shaft 3016 that is coupled to the sensor head 3005. The sensor head 3005 connects to the electronics unit 3015 through a bundled set of wires 3017, and the interface controller 3010 connects to the electronics unit 3015 through a bundled set of wires 3018. The interface controller 3010 is attached to the shaft 3016 with a cradle 3019. A battery or other type of power source (not shown) may be attached to the electronics unit 3015 to provide power to the unit 3015.

In contrast to the integrated mine detection system 100 of FIGS. 1, 2, 13 and 14, the buried object detection system 3000 includes a motion and position sensor 3020 attached to the sensor head 3005 by prongs 3022. The buried object detection system 3000 also includes a processor/communicator device 3040. In this example, the processor/communicator device 3040 is a PDA having an associated battery operable to supply the PDA with power residing in a case (collectively, "PDA") 3040. The motion and position sensor 3020 connects to the PDA 3040 through a bundled set of wires 3025. The bundled set of wires 3025 includes an interface cable for transmitting data from the motion and position sensor 3020 to the PDA 3040. The bundled set of wires 3025 also includes a power cord that transmits power to the motion and position sensor 3020 from the battery used to power the PDA 3040. The PDA 3040 is inserted in a PDA holder 3045, which, in turn, is attached to the cradle 3019.

In general, the PDA 3040 processes the data received from the motion and position sensor 3020 to provide feedback on a swing of the buried object detection system 3000 by the operator. The PDA 3040 is operable to compare data for a swing made by the operator with a reference swing and, based on the comparison, to provide feedback about the operator's swing to the operator, as described in more detail later.

The buried object detection system 3000 also may include one or more audio output devices, such as an earpiece (not shown) that is coupled to the PDA 3040 and/or a speaker (not shown) within the PDA 3040. In some implementations, an audio output device may be used to provide audio output about object detection and about feedback concerning operation of the buried object detection system (e.g., feedback about the operator's swing).

The motion and position sensor 3020 and the PDA 3040 each may be attached to the buried object detection system 3000 and later removed. This enables the motion and position sensor 3020 and the PDA 3040 to be attached for one or more training sessions to facilitate an operator's mastery of swinging the sensor head 3005 while moving forward to cover a lane to be swept for buried objects. Once the training session or sessions have been completed, the motion and position sensor 3020 and PDA 3040 may be removed from the buried object detection system 3000. In other implementations, the motion and position sensor and the PDA may be permanently attached to the system.

The motion and position sensor 3020 and the PDA 3040 collectively represent one example of a motion and position measuring module. As illustrated, the buried object detection system 3000 includes a motion and position sensor 3020 that is separate from the sensor head 3005, though the motion and position sensor 3120 need not necessarily be a separate device from the sensor head 3005. For example, some implementations may integrate a motion and position sensor with the sensor head.

In some implementations, the electronics unit 3015 may perform some or all of the functionality of the PDA 3040. In such a case, additional controls may be added to the interface controller 3010 to enable an operator to activate or de-activate the motion and position sensor.

Figure 31:
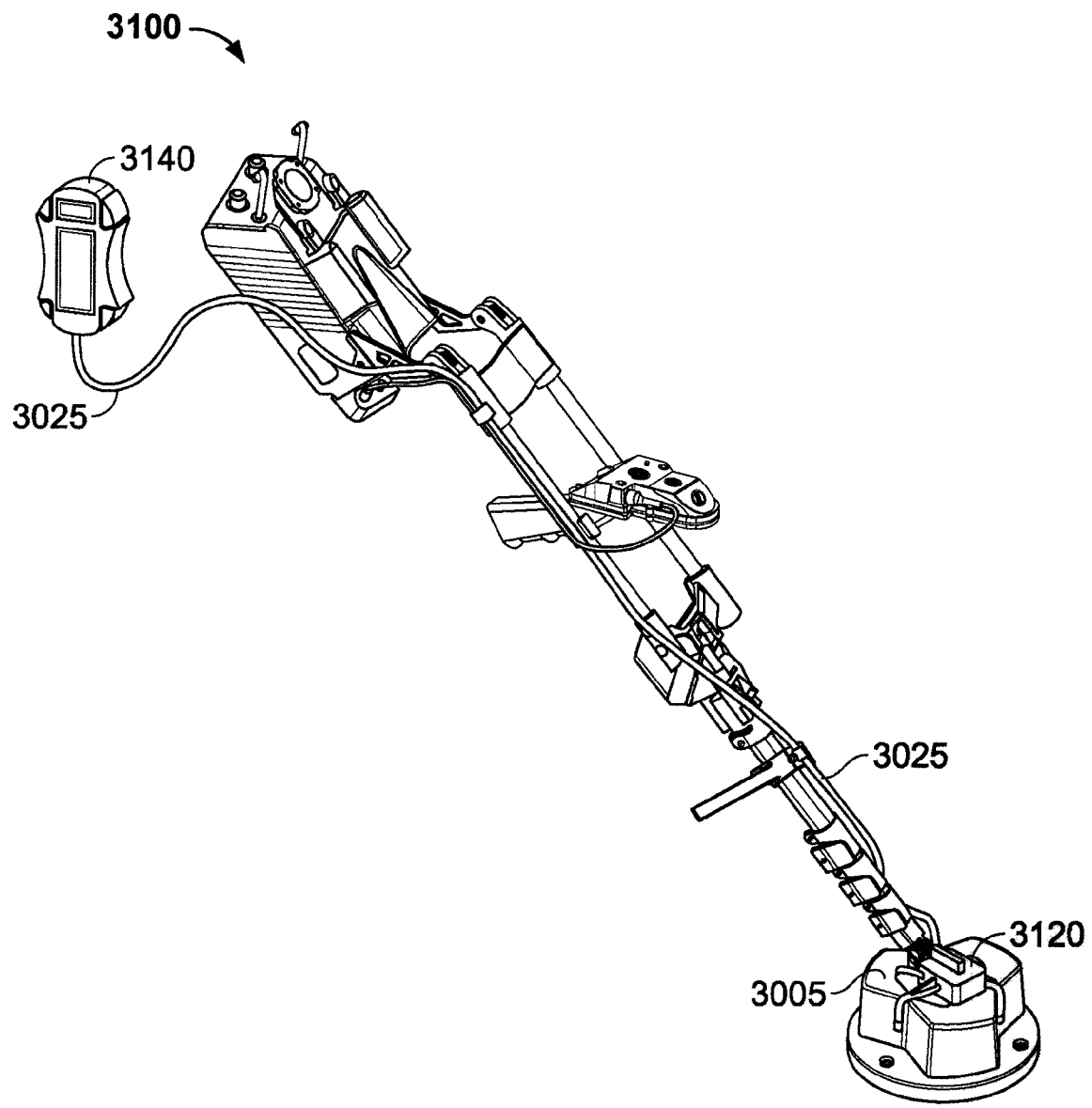

Alternatively or additionally, a buried object detection system may include a PDA that is attached in another way other than through a removable PDA holder 3045. In one example, a PDA may be permanently attached to a buried object detection system (e.g., a PDA may be integrated within the buried object detection system). FIG. 31 illustrates another example of attaching a PDA with a buried object detection system.

FIG. 31 shows a buried object detection system 3100 with a PDA 3140 capable of being mounted on the belt of an operator. A motion and position sensor 3120 connects to the PDA 3140 through a bundled set of wires 3025 that includes an interface cable for transmitting data from the motion and position sensor 3120 to the PDA 3140.

In contrast to the PDA 3040 of FIG. 30, the PDA 3140 is capable of being mounted on the belt of an operator. This may be accomplished, for example, by including a belt clip on the PDA case. When mounted on the belt of the operator, the operator generally is not able to view the display of the PDA while operating the buried object detection system 3100. In some implementations, a PDA may be able to be mounted on the operator's belt, as illustrated in FIG. 30, or in a holder, as illustrated in FIG. 31, which enables an operator to choose the manner in which the PDA is mounted.

Figure 32:
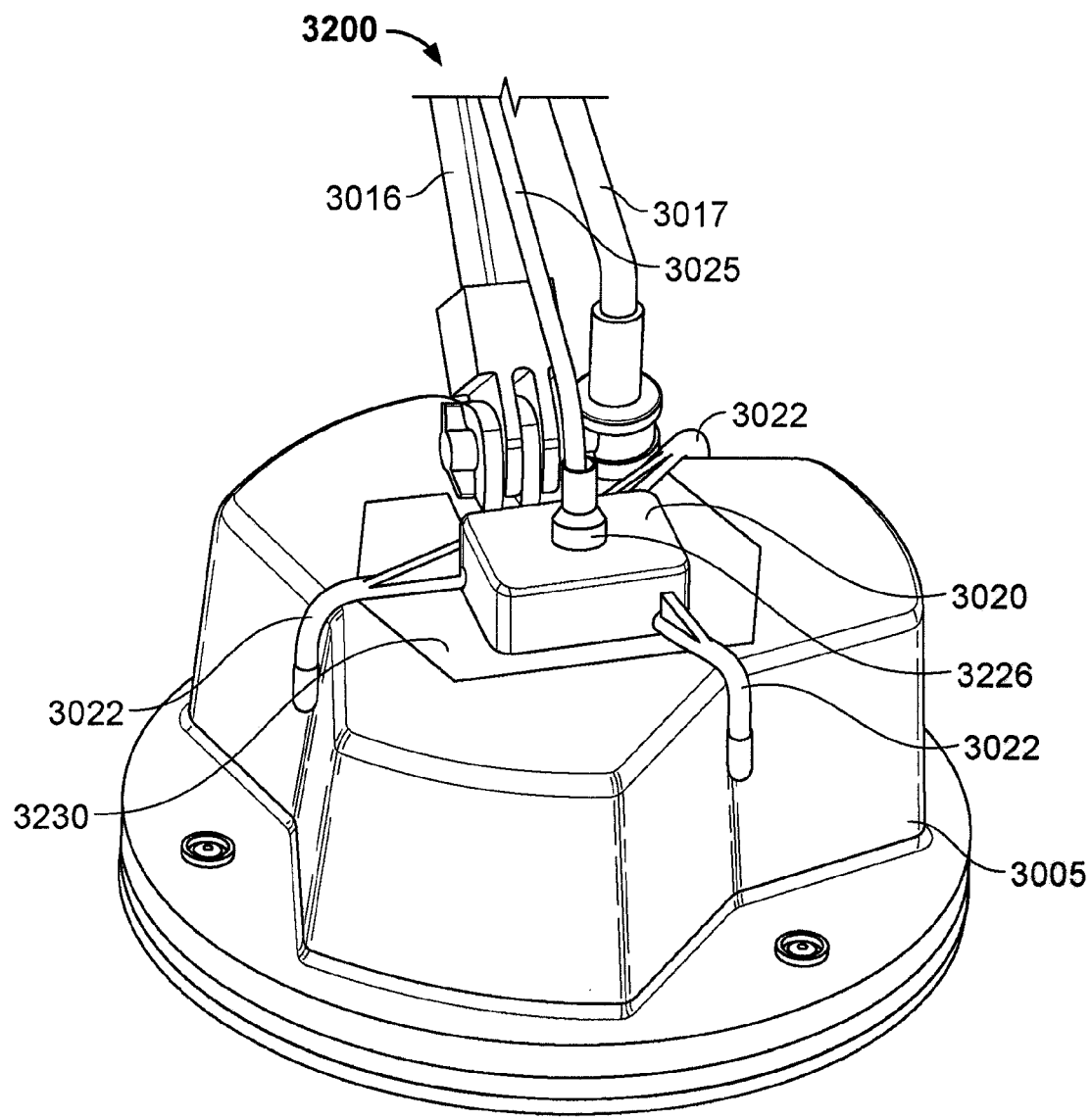

FIG. 32 illustrates an example 3200 of how the motion and position sensor 3020 may be attached to the sensor head 3005. More particularly, the motion and position sensor 3020 is attached to the sensor head 3005 by prongs 3022. In this example, the prongs 3022 are not permanently affixed to the sensor head 3005, which enables the motion and position sensor 3020 to be later removed. The search width of the buried object detector is indicated on top of the sensor head 3205 by different colored marking, which may be called a sweet spot 3230. As shown, the motion and position sensor 3020 is placed over and within the sweet spot 3230, though this need not necessarily be so. For example, the motion and position sensor 3120 in FIG. 31 is over but not within the sweet spot. In another example, a motion and position sensor may be placed on the sensor head without being necessarily placed over any portion of a sweet spot.

The motion and position sensor 3020 connects to the processor/communicator (i.e., the PDA 3040, not shown) through the bundled set of wires 3025. The bundled set of wires 3025 connects to the motion and position sensor 3020 using a weatherproof seal 3226 that helps to keep the motion and position sensor 3020 dry.

The example 3200 also shows other attachments to the sensor head. For example, the shaft 3016 is coupled to the sensor head 3005. The bundled set of wires 3017 connects the sensor head 3005 to an electronics unit (not shown) for processing signals from the sensor head to detect buried objects.

Figure 33:
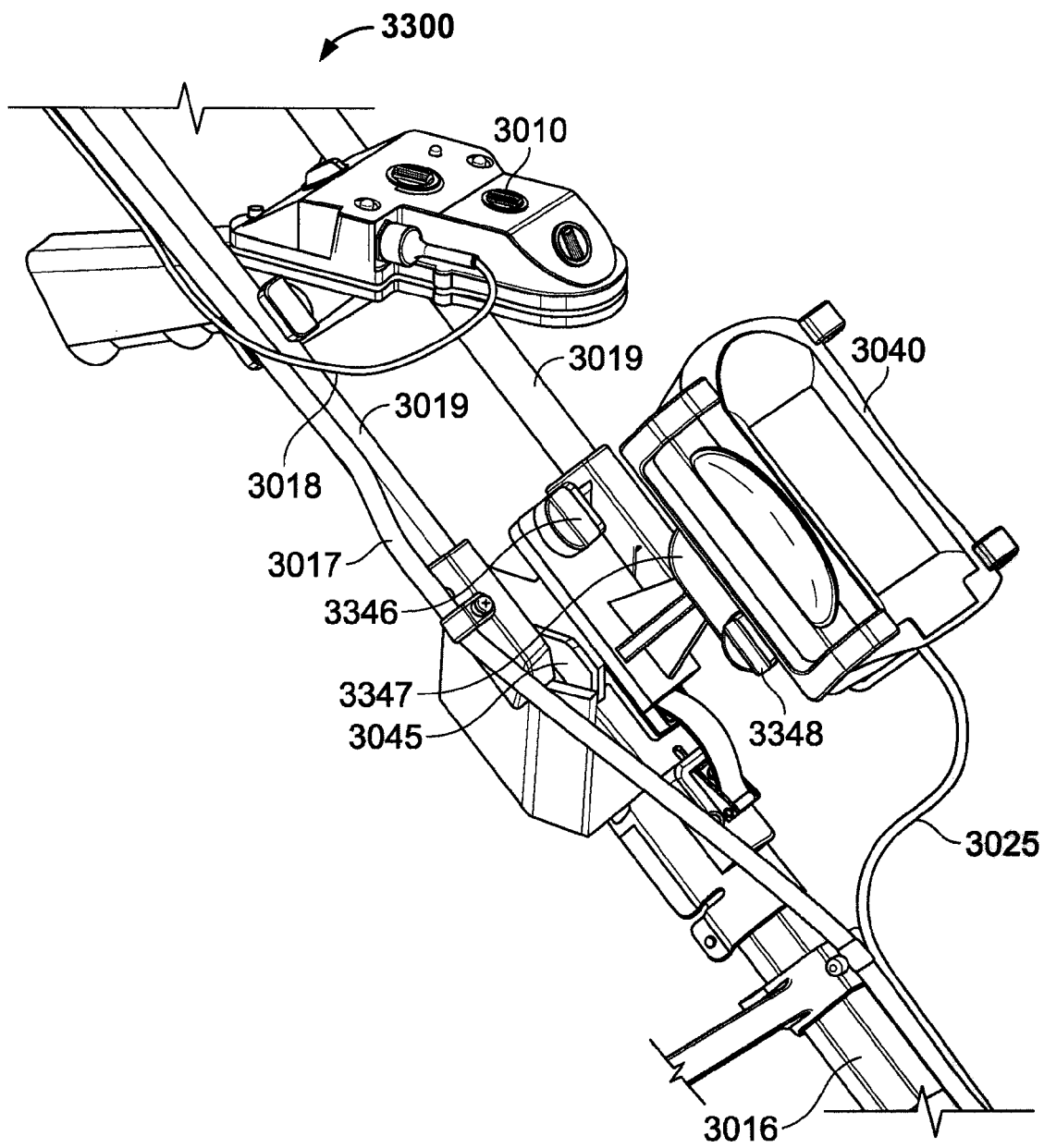

FIG. 33 illustrates an example 3300 of how the PDA 3040 may be removably attached to the cradle 3019 of a buried object detector. More particularly, the PDA 3040 is inserted in the holder 3045, which, in turn, is locked onto the cradle 3019 though a quarter-turn connector 3346. The holder 3045 may be removed from the cradle 3019 once the quarter-turn connector 3346 is unlocked.

The holder 3045 includes a ball/socket assembly 3347 and a quarter-turn connector 3348, which together enable an operator to set a preferred viewing position of the display area of the PDA 3040. When the quarter-turn connector 3348 is unlocked, the ball/socket assembly 3347 enables the PDA 3040 to be swiveled to adjust the viewing position of the display area of the PDA 3040 into one of a large number of possible viewing position. A preferred viewing position may be set by locking the quarter-turn connector 3348 to disable the swivel capability of the ball/socket assembly 3347, which, in turn, locks the PDA into the selected position.

Figure 34A:
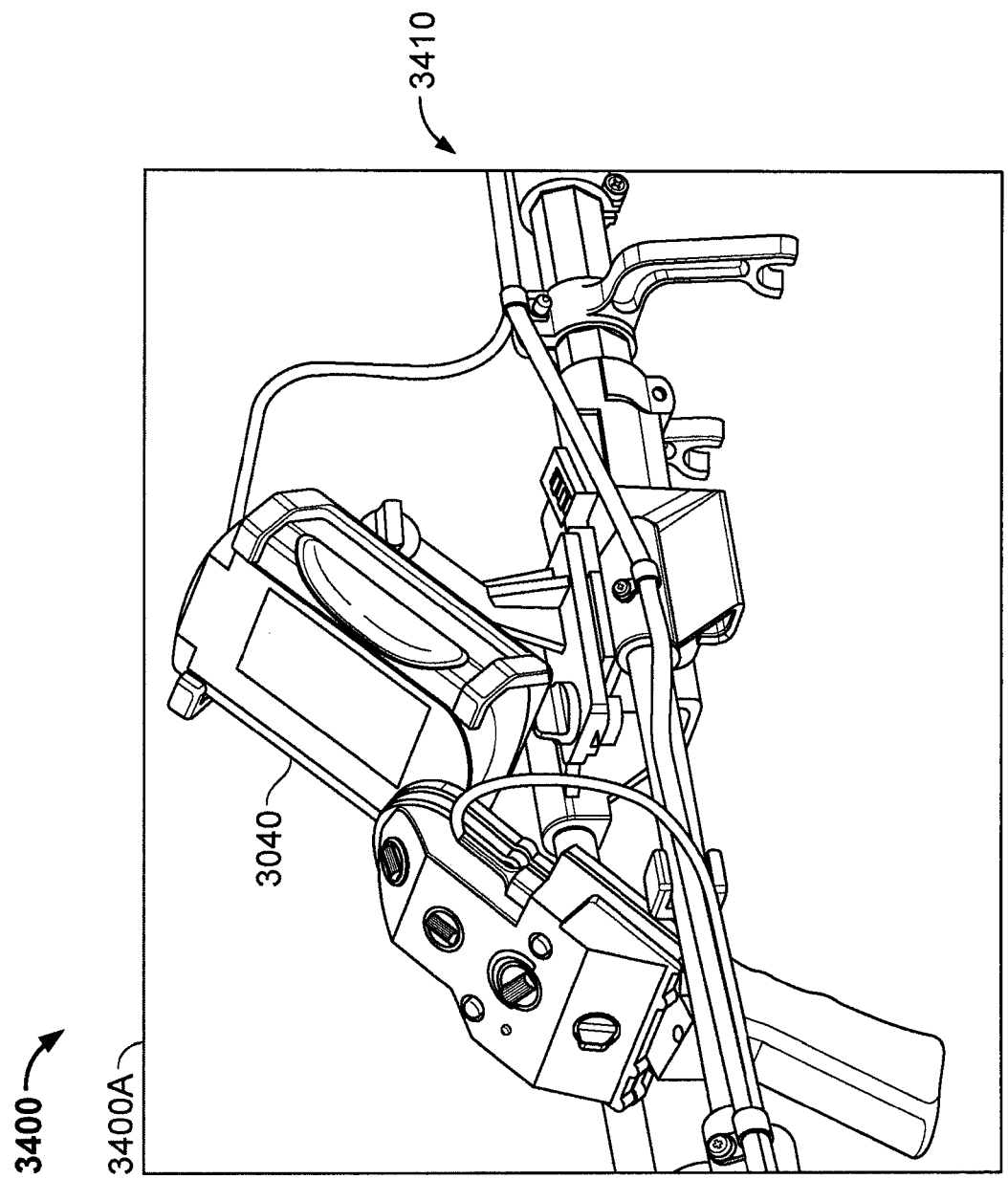
Figure 34B:
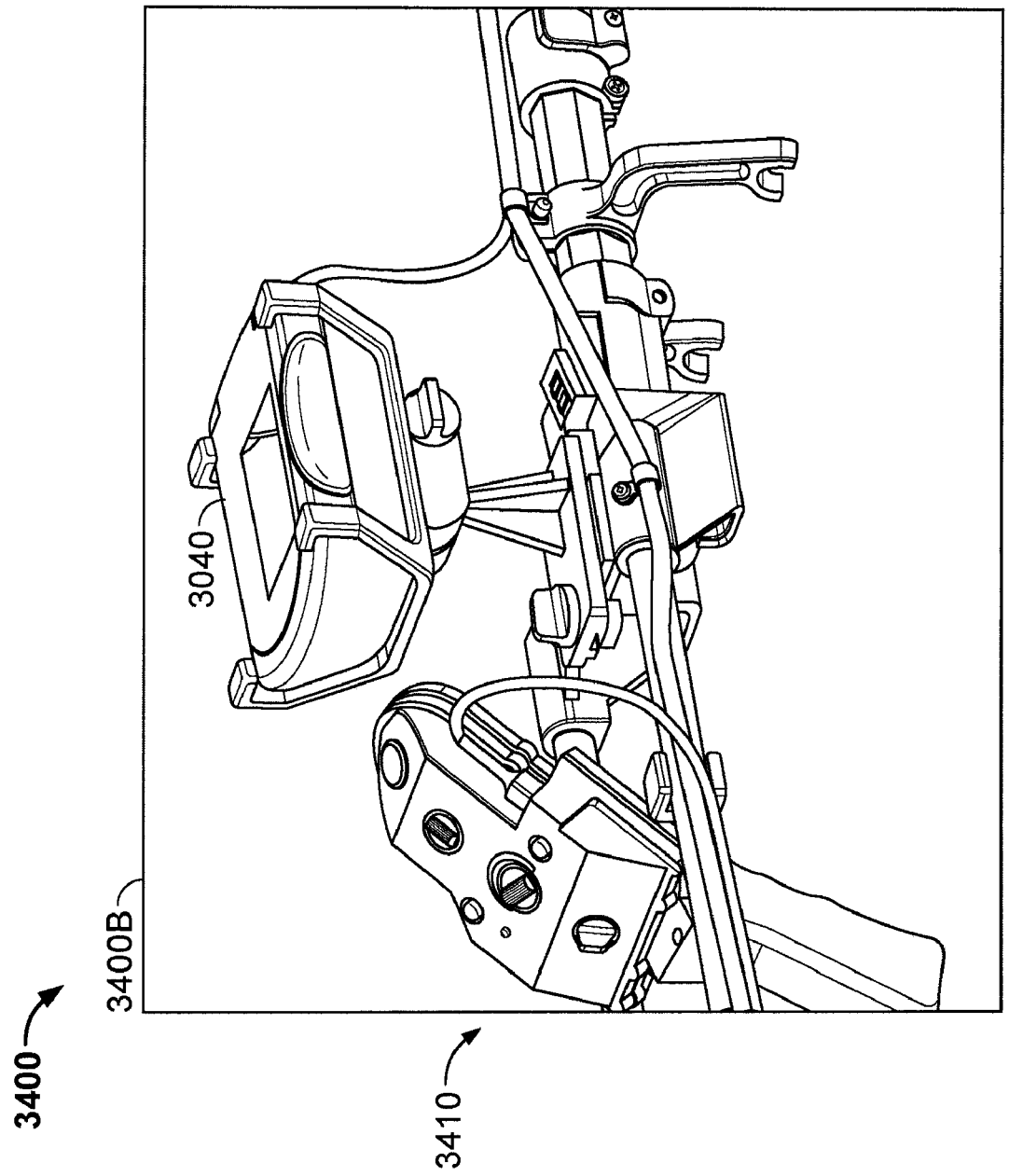

FIG. 34 illustrates two possible viewing positions 3400A and 3400B of the PDA 3040. As indicated by arrow 3410, the PDA 3040 also may be adjusted in a variety of viewing positions between the viewing position 3400A and the viewing position 3400B.

Figure 35:
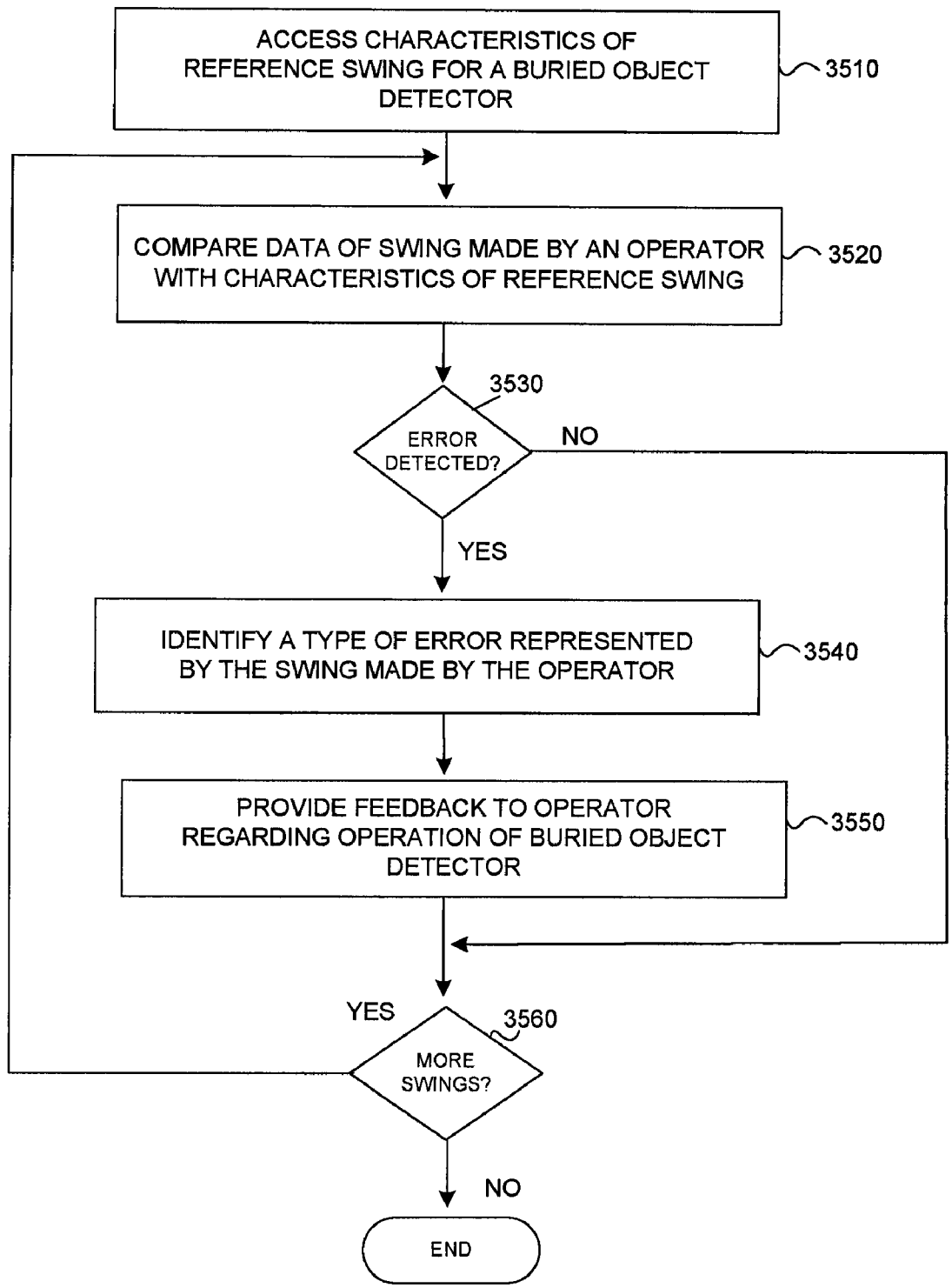
FIGS. 35-37 are flow charts of processes performed by a processor of a motion and position measuring module.

FIG. 35 illustrates a process 3500 performed by a processor/communicator device to analyze data from a motion and position sensor and to provide feedback to the operator about operation of buried object detector. In general, an operator walks through an area to be swept for buried objects by moving forward and swinging the detector from side-to-side relative to the operator's body. The area to be covered in this manner may be referred to as a lane. As the operator progresses forward in the lane, the operator's swings move the sensor head of the buried object detector laterally relative to the operator's body and the operator's forward movement moves the sensor head forward.

The processor/communicator device accesses characteristics of a reference swing for a buried object detector (step

3510). The characteristics of a reference swing may represent a model or ideal swing. The characteristics of a reference swing may be created and stored in the processor/communicator device based on a swing previously performed by a trained operator. The characteristics of a reference swing may include, for example, the acceleration, velocity, position, or angle of the sensor head. The characteristics of a reference swing may be accessed from transient or persistent memory of the processor/communicator device.

The processor/communicator device compares characteristics of the reference swing with data of a swing of the buried object detector made by the operator (step 3520). To do so, for example, the processor/communicator device receives data from the motion and position sensor and processes the received data to identify data related to a swing and transform the raw swing data into a form that may be compared to one or more characteristics of the reference swing. To make the comparison, for example, the processor/communicator device may use pattern matching techniques. When the data of the swing made by the operator does not match the reference swing, a swing error is detected. A match may be determined based on a predetermined threshold that allows for permitted variations in measurement data and/or swing mechanics.

When a swing error is detected based on the comparison (step 3530), such as when the operator's swing does not match the reference swing within a predetermined threshold, the processor/communicator device identifies a type of error represented by the swing made by the operator (step 3540). This may be accomplished, for example, by comparing the data of the operator's swing with data corresponding to a swing characterized by a type of error. To do so, the processor/communicator device may use pattern matching techniques to identify a type of error. More particularly, the processor/communicator device may compare the data of the operator's swing with data corresponding to a type of error, and, if no match is found, compare the data of the operator's swing with data corresponding to another type of error, and so on, until a pattern match is found. In some implementations, types of errors may be searched in order of frequency of error occurrence or based on a hierarchical structure of errors, which may help identify a type of error more efficiently.

Types of errors that may be detected include errors related to an improper height of the sensor head during some portion of the swing, such as an improper increase in the height of the sensor head near the end of the swing (which may be called cupping) or an improper increase in the height of the sensor head in the center of the swing (which may be referred to as a dome effect). Examples of other types of errors include errors related to improper swing speed, such as a swing that is too fast, a swing that is too slow, and a swing that does not maintain constant velocity. A swing that does not maintain a constant velocity may be referred to as an inconsistent swing. Examples of other types of errors that may be detected include a sensor head tilt, excessive arc in the swing, and a side-to-side sweep that is too short.

The processor/communicator device provides feedback to the operator regarding operation of the buried object detector (step 3550). Typically, the processor/communicator device provides an audio message in response to the identified type of error. For example, an audible message may be presented in an earpiece or speaker of the processor/communicator device. Examples of types of messages include "too slow," "too fast," "cupping at end of swing," "too high in middle," and "inconsistent speed." The message may be presented textually and/or visually in addition to, or in lieu of, the audio message. For example, a text message may be displayed on a display associated with the processor/communicator device. In another example, a visual representation of the errant swing or type of error may be presented, such as a graph representing the swing or a pictorial illustration of the errant swing or type of error. In some implementations, a video of an errant swing or a type of error may be presented, as may a video or pictorial illustration of a reference swing.

When an error is not detected (step 3530) and another swing is to be analyzed (step 3560), the processor/communicator device proceeds to compare data of the operator swing to be analyzed (step 3520); otherwise, the process ends.

Typically, the processor/communicator device performs steps 3520-3550 repeatedly for multiple swings while the operator is sweeping a lane. Often feedback about a swing can be presented rapidly at the end of the swing so that the feedback provided occurs substantially in real-time. Thus, the operator hears a succession of messages as the operator sweeps a lane, where a message corresponds to a swing that immediately preceded the swing in progress. In some implementations, an error message may not necessarily be presented for each errant swing. For example, when an operator repeats the same swing error multiple times, an error message need not be repeated for each swing. Some implementations may present error message only when an error message is different from the previous error message or based on threshold of error occurrence. Some implementations may provide positive feedback (such as "good swing") when an error has not been detected. In some implementations, this positive feedback may be provided only after a prior swing has resulted in an error message.

Figure 36:
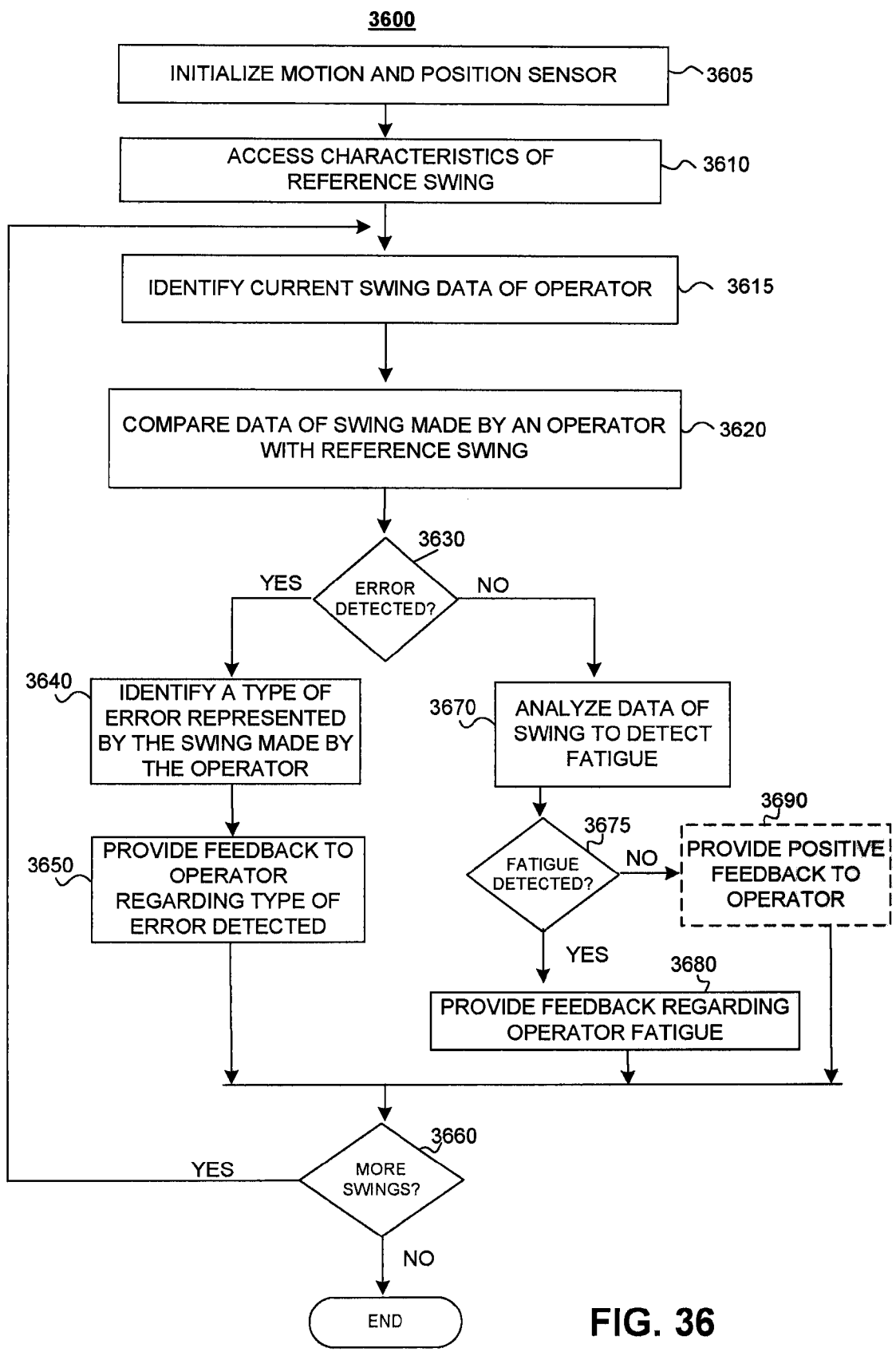

FIG. 36 illustrates another example of a process 3600 performed by a processor/communicator device to analyze data from a motion and position sensor and to provide feedback to the operator about operation of buried object detector.

The process 3600 begins when the processor/communicator device initializes the motion and position sensor (step 3605). For example, an operator may hold the buried object detection system touching the ground with the sensor head motionless and may release a trigger switch or otherwise signal that a training session is to begin. In response, the processor/communicator device initializes the motion and position sensor, such as by resetting measurement devices, such as an accelerometer or a gyroscope, included in the motion and position sensor, and begins to receive data from the measurement devices in the motion and position sensor.

The processor/communicator device accesses characteristics of a reference swing for a buried object detector (step 3610). The processor/communicator device also identifies a portion of data that represents a current swing of the operator from the stream of data being received from the motion and position sensor (step 3615). This may be accomplished, for example, by detecting an abrupt change of direction of the sensor head of the buried object detector.

The processor/communicator device compares characteristics of the reference swing with data of a swing made by the operator (step 3620). When an error is detected based on the comparison (step 3630), the processor/communicator device identifies a type of error represented by the swing made by the operator (step 3640) and provides feedback to the operator regarding the type of error (step 3650). The processor/communicator device analyzes another swing of the operator (step 3660) by identifying current swing data (step 3615) and proceeding as described previously. The steps 3640-3660 may be performed in a substantially similar manner as described with respect to steps 3530-3550 of FIG. 35.

In contrast to the process 3500 of FIG. 35, when an error is not detected based on a comparison with the reference swing (step 3630), the processor/communicator device analyzes data of the swing made by the operator to detect operator fatigue (step 3670). For example, a swing that matches a reference swing within a predetermined threshold may be inconsistent as compared with a previous swing of the operator. In such a case, the processor/communicator device may detect operator fatigue. In another example, the processor/communicator device may determine that the operator's swing matches a swing pattern characteristic of jitter that may be indicative of operator fatigue. When the processor/communicator device detects operator fatigue (step 3675), the processor/communicator device provides feedback to the operator regarding operator fatigue (step 3680). The processor/communicator device may present the feedback audibly, textually, or graphically. In some implementations, the processor/communicator device may provide positive feedback to the operator (step 3690) when fatigue is not detected. The processor/communicator device then analyzes another swing of the operator (step 3660) by identifying current swing data (step 3615) and proceeding as described previously.

The process 3600 ends when all swings have been analyzed (step 3660) or the operator signals the end of the training system, such as by toggling a trigger switch off.

Figure 37:
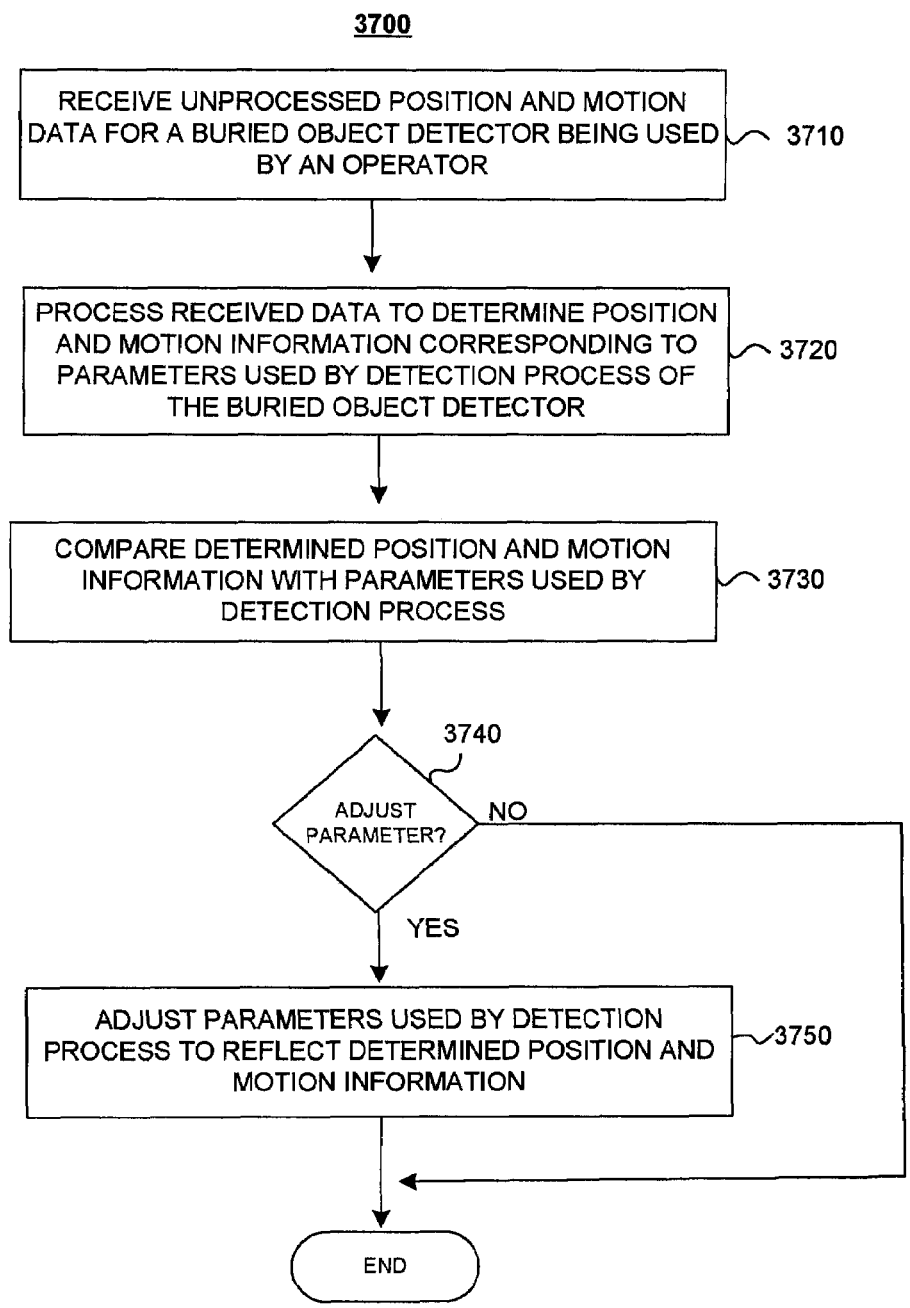

FIG. 37 depicts a process 3700 performed by a processor/communicator device to analyze data received from a motion and position sensor and to adjust parameters used by a detection process. The process 3700 may be used to help improve the accuracy of buried object detection.

The processor/communicator device receives unprocessed position and motion data from a motion and position sensor of a buried object detector while an operator is using the buried object detector (step 3710). Typically, the data is received while the operator is searching an area for buried objects (rather than operating the buried object detector for training purposes).

The processor/communicator device processes the received motion and position data to determine motion and position information that corresponds to one or more parameters used by a detection process executed by the buried object detector (step 3720). For example, the processor/communicator device may integrate received acceleration data to determine velocity and position of the sensor head. In another example, the processor/communicator device may integrate a received rate of rotation to determine an angle of rotation of the sensor head.

The processor/communicator device compares the determined motion and position information with one or more parameters used by a detection process (step 3730). The comparison is used to determine whether to adjust one or more parameters used by the detection process. For example, the height of the sensor head relative to the ground may be compared with a parameter representing an assumed or default height used by the detection process. In another example, the velocity of the sensor head may be compared with a parameter representing an assumed or default velocity used by the detection process.

When a parameters differs, or differs substantially, from motion and position sensor information corresponding to the parameter (step 3740), the processor/communicator device adjusts the parameter (step 3750). For example, the processor/communicator device may update a data table or another type of data structure that includes some or all of the parameters used by the detection process. The processor/communicator device may adjust one or more parameters based on the comparison of motion and position information with parameters used by the detection process. The process 3700 then ends.

FIGS. 38-48 describe an example of a motion and position measuring module in which the motion and position sensor is implemented using a six degree-of-freedom (6-DOF) inertial measuring unit (IMU) and the processor/communicator device is implemented using a PDA. In this example, movement down-range of a lane being swept (i.e., forward movement of the sensor head as the operator moves forward down the lane) is represented by the x-axis; movement across-range (i.e., lateral movement of the sensor head as the operator's swings the sensor head from side to side) is represented by the y-axis; and movement that is transverse-to-lateral as the operator swings the sensor head (i.e., up-and-down vertical movement) is represented by the z-axis.

Figure 38:
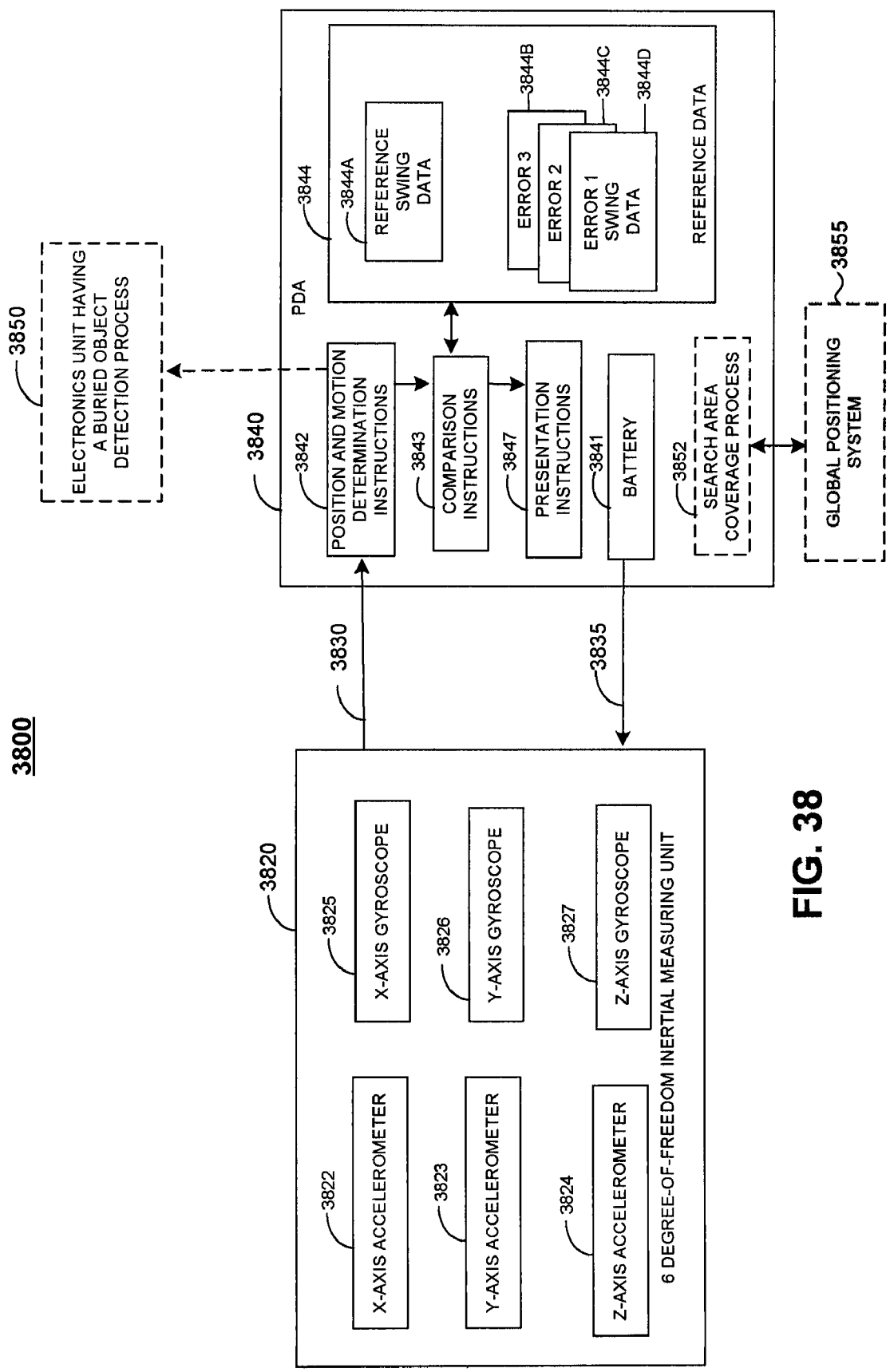
FIG. 38 is a block diagram of a motion and position measuring module.

Referring to FIG. 38, a motion and positioning measuring module 3800 includes a 6-DOF IMU 3820 having accelerometers 3822-3824 and gyroscopes 3825-3827. The accelerometers 3822-3824 each measure the rate of acceleration of the sensor head in the x-axis, the y-axis or the z-axis, respectively. The gyroscopes 3825-3827 each measure the angular rate of the sensor head in the x-axis, the y-axis or the z-axis, respectively. A gyroscope may also be referred to as an angular rate sensor. The measurements from each of the accelerometers 3822-3824 and from each of the gyroscopes 3835-3827 are transmitted to the PDA 3840 using an RS-232 interface cable. In some implementations, a RS-232 interface of the IMU 3820 may be connected to an RS-232-to-Bluetooth adapter to provide a wireless connection to the PDA 3840, where the PDA 3840 is configured with a wireless receiver. The IMU 3820 obtains power from a cable 3835 connected to a battery 3841 of the PDA 3840. As illustrated, the battery 3841 is included in the PDA 3840, though this need not necessarily be so.

The PDA 3840 includes instructions 3842 that, when executed, perform calculations to determine position and motion of the sensor head based on the data received from the IMU 3820. For instance, the PDA 3840 may execute instructions 3842 to calculate the current position and the current velocity of the sensor head.

The PDA 3840 also includes comparison instructions 3843 that, when executed, use the calculated position and movement information of the sensor head to identify data related to an operator swing and compare the operator-swing data with some or all of reference data 3844. Data related to an operator swing may be identified based on an abrupt change of direction of the sensor head, as described previously. The operator-swing data may be compared with the reference-swing data 3844A and/or one or more of error-swing data 3844B-3844D to identify a type of error associated with the operator swing. Only three templates for error-swing data are shown for brevity.

The PDA 3840 further includes presentation instructions 3847 that, when executed, present information related to the results of the comparison process 3843. For example, an audio message indicating an error represented by the operator's swing may be presented through an earpiece connected to the PDA 3840 or a speaker of the PDA 3840 (neither shown). Additionally or alternatively, a text message or a visual image (such as a graph representing the operator swing) may be presented on a display (not shown) associated with the PDA 3840. Collectively, the instructions 3842, 3843 and 3847, when executed, may represent an example implementation of the process 3500 of FIG. 35 or the process 3600 of FIG. 36.

In some implementations, the PDA 3840 may interface, directly or indirectly, with an electronics unit 3850 having a buried object detection process, such as the electronics unit 3015 of FIGS. 30 and 31. The PDA 3840 may provide position and motion information about the sensor head to the electronics unit 3850, which, in turn, may adjust one or more parameters used by the detection process based on the position and motion information, as described previously. Additionally or alternatively, the PDA 3840 may display a visual image of the results of the buried object detection process. For example, the PDA 3840 may display the image produced by a radar of the electronics unit 3850.

Additionally or alternatively, the PDA 3840 may include, or be operable to interface with, a receiver 3855 for a global positioning system (GPS). The PDA 3840 may execute a process 3852 to monitor or guide sweeping a search area. For example, the PDA 3840 may include information on a search area to be covered and may monitor the lanes or other portions of the search area that have been swept.

In some implementations, the PDA 3840 may include a communications device for voice or data communications. The components included in, and the functionality performed by, the PDA 3840 may be distributed across one or more other devices. For example, a voice or data communications device may be used in which the device that does not necessarily include all of the functions typically performed by a PDA, such as a calendar function or a task management function.

FIGS. 39-47 illustrate examples 3900-4700 of reference swing data to which operator swing data may be compared. The examples 3900-4700 include measurement data from accelerometers and gyroscopes in the IMU. More particularly, the examples 3900-4700 illustrate measurement data 3920 from an x-axis accelerometer, measurement data 3925 from a y-axis accelerometer, measurement data 3930 from a z-axis accelerometer, measurement data 3935 from an x-axis gyroscope, and measurement data 3945 from a z-axis gyroscope.

The examples 3900-4700 also include position and measurement information that is based on measurement data. More particularly, the examples 3900-4700 identify a point 3955 of acceleration of the sensor head through the x-axis, which also represents a swing end point. The examples 3900-4700 also identify a point 3960 of acceleration of the sensor head through the y-axis, and a point 3965 of acceleration of the sensor head through the z-axis. The examples 3900-4700 further identify the minimum and the maximum time of a swing 3970.

Figure 39:
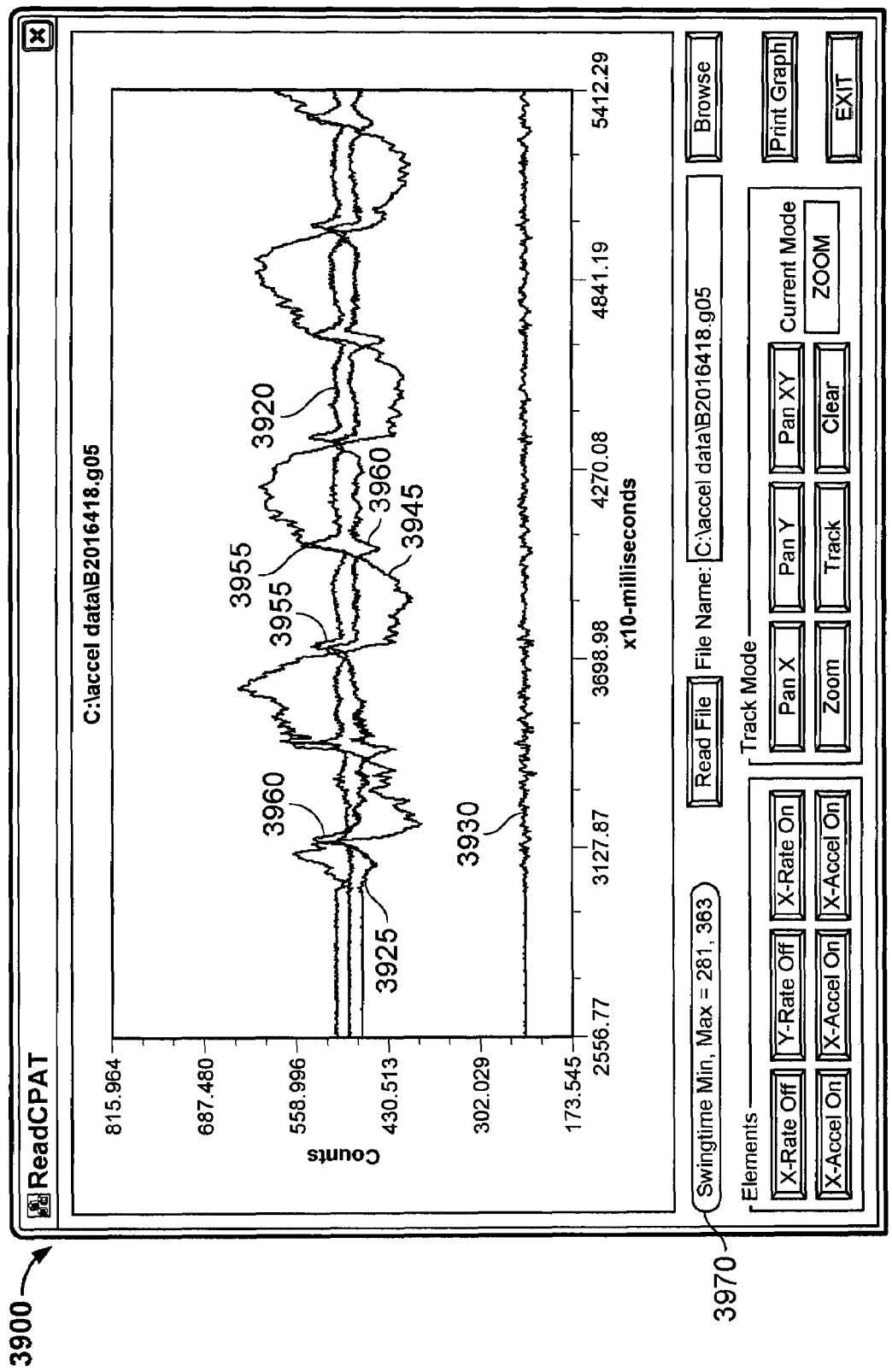
FIGS. 39-47 depict examples of reference swing data to which operator swing data may be compared.
Figure 40:
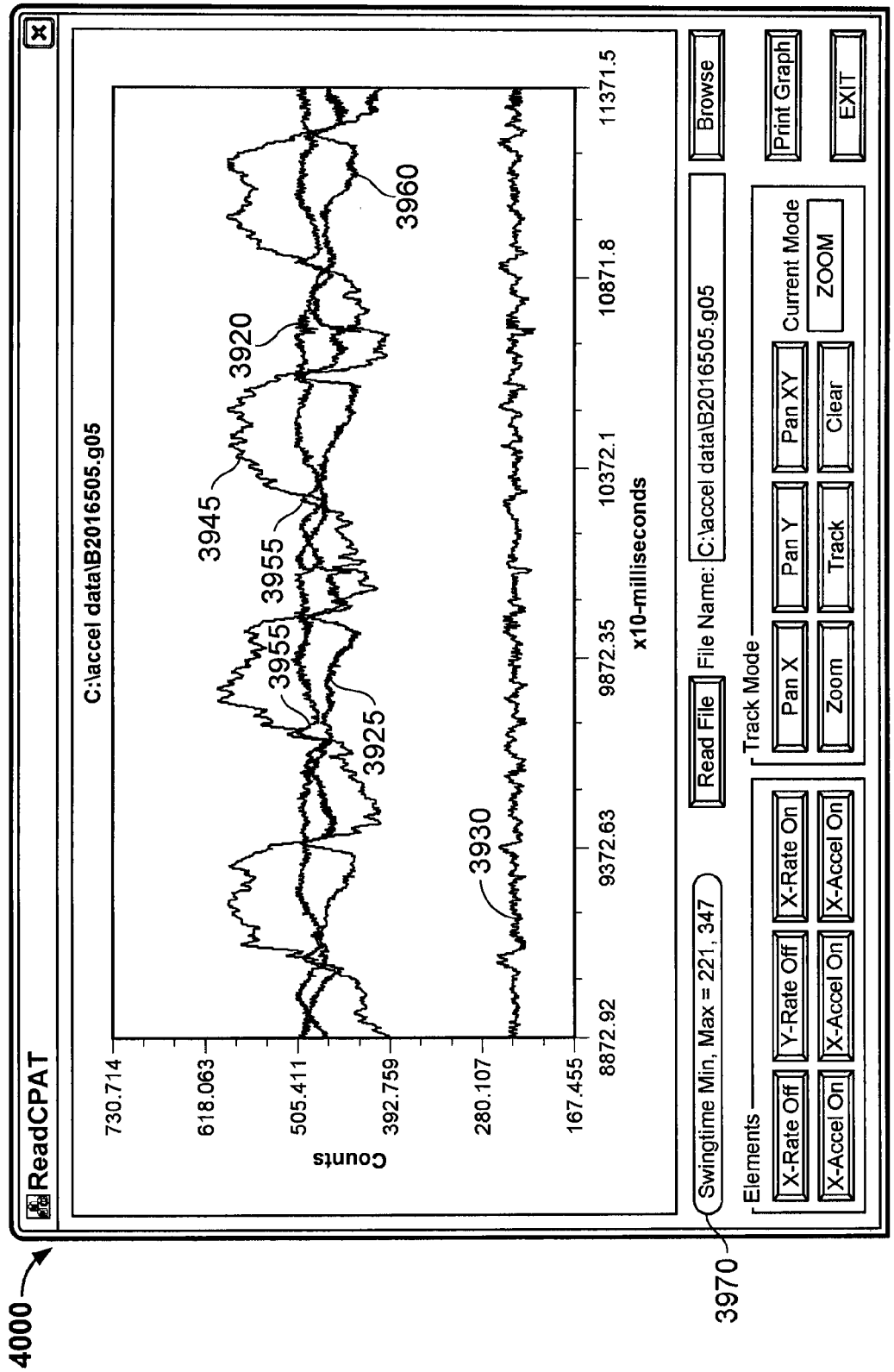
Figure 41:
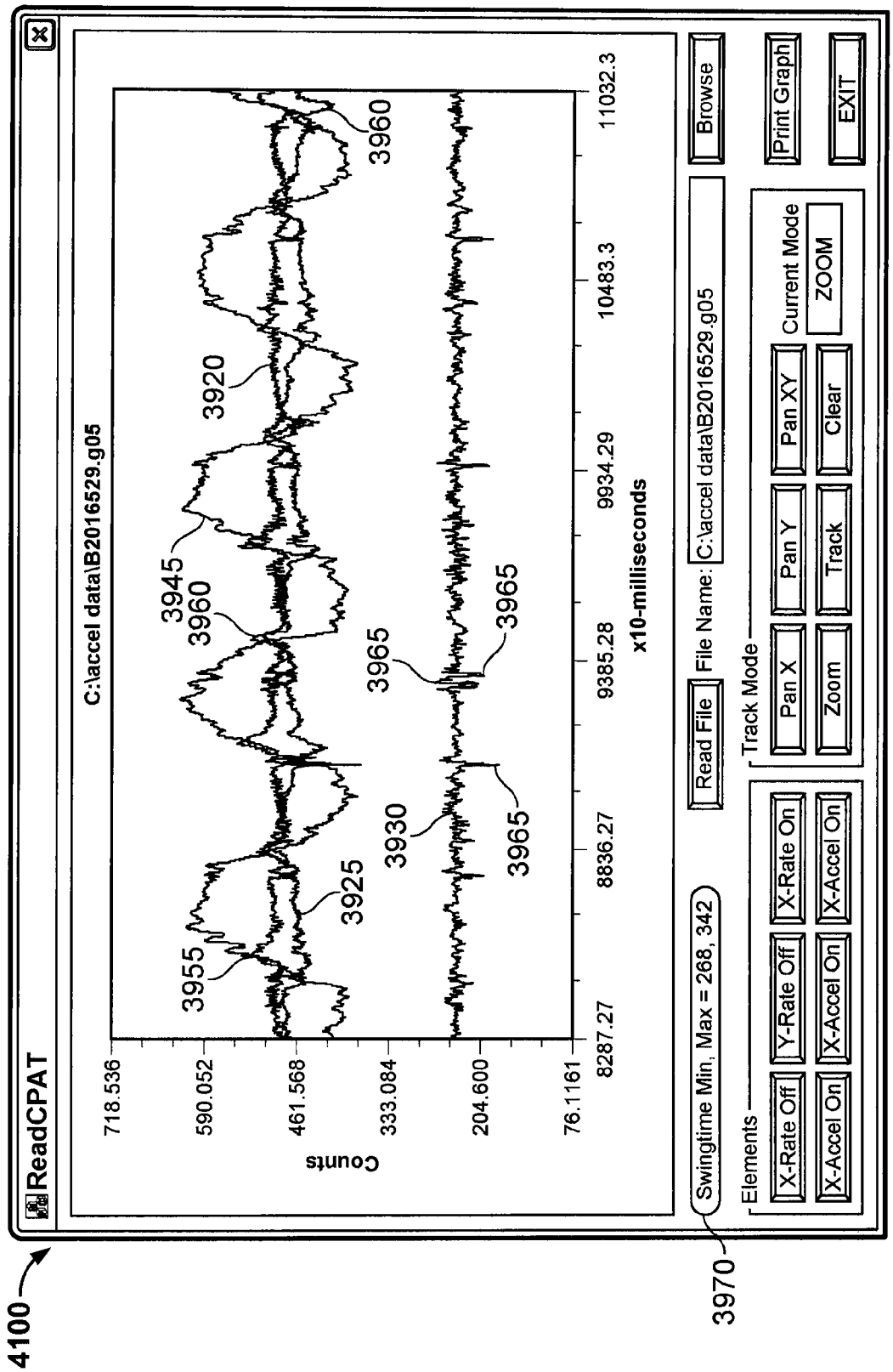
Figure 42:
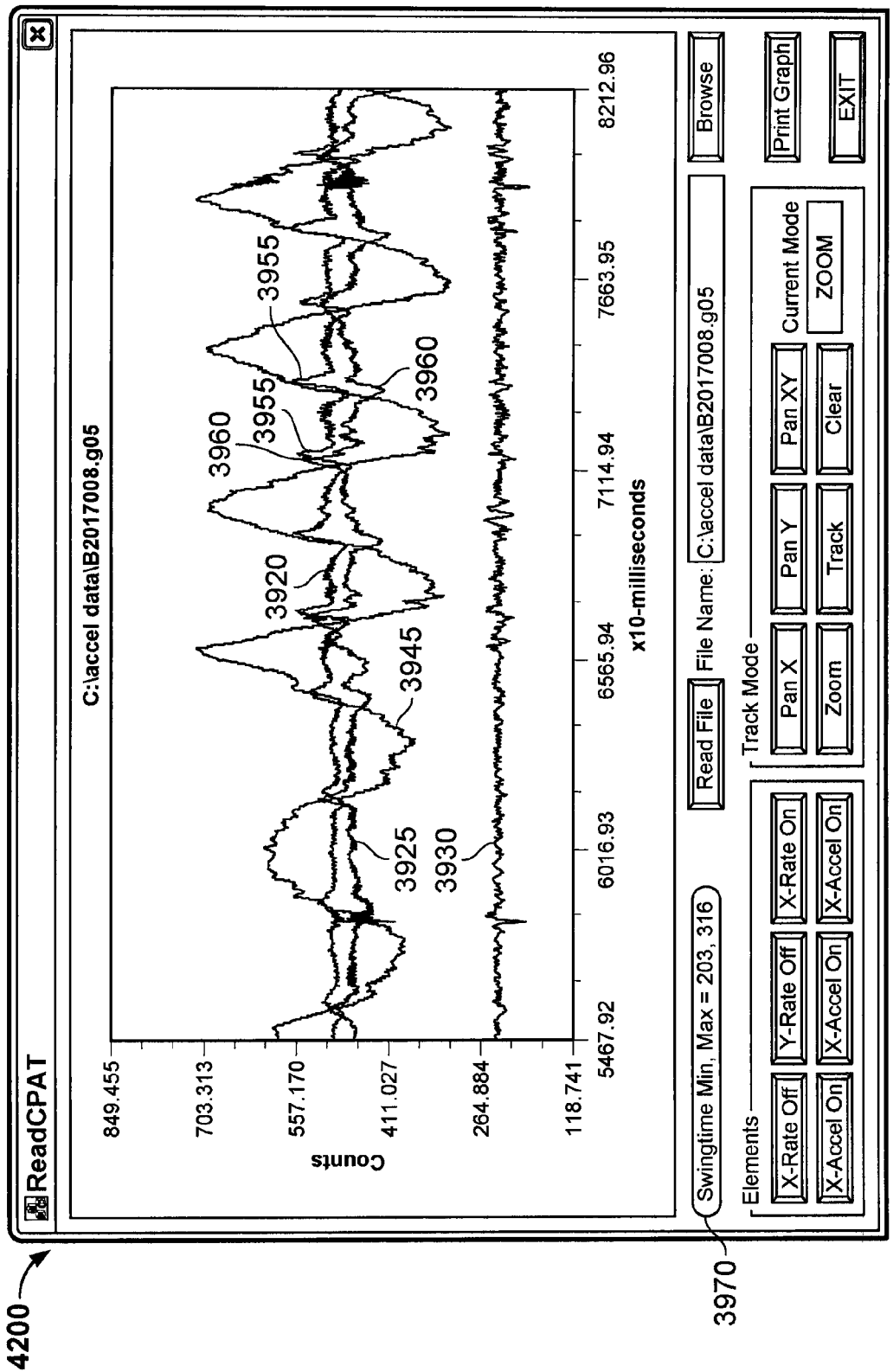
Figure 43:
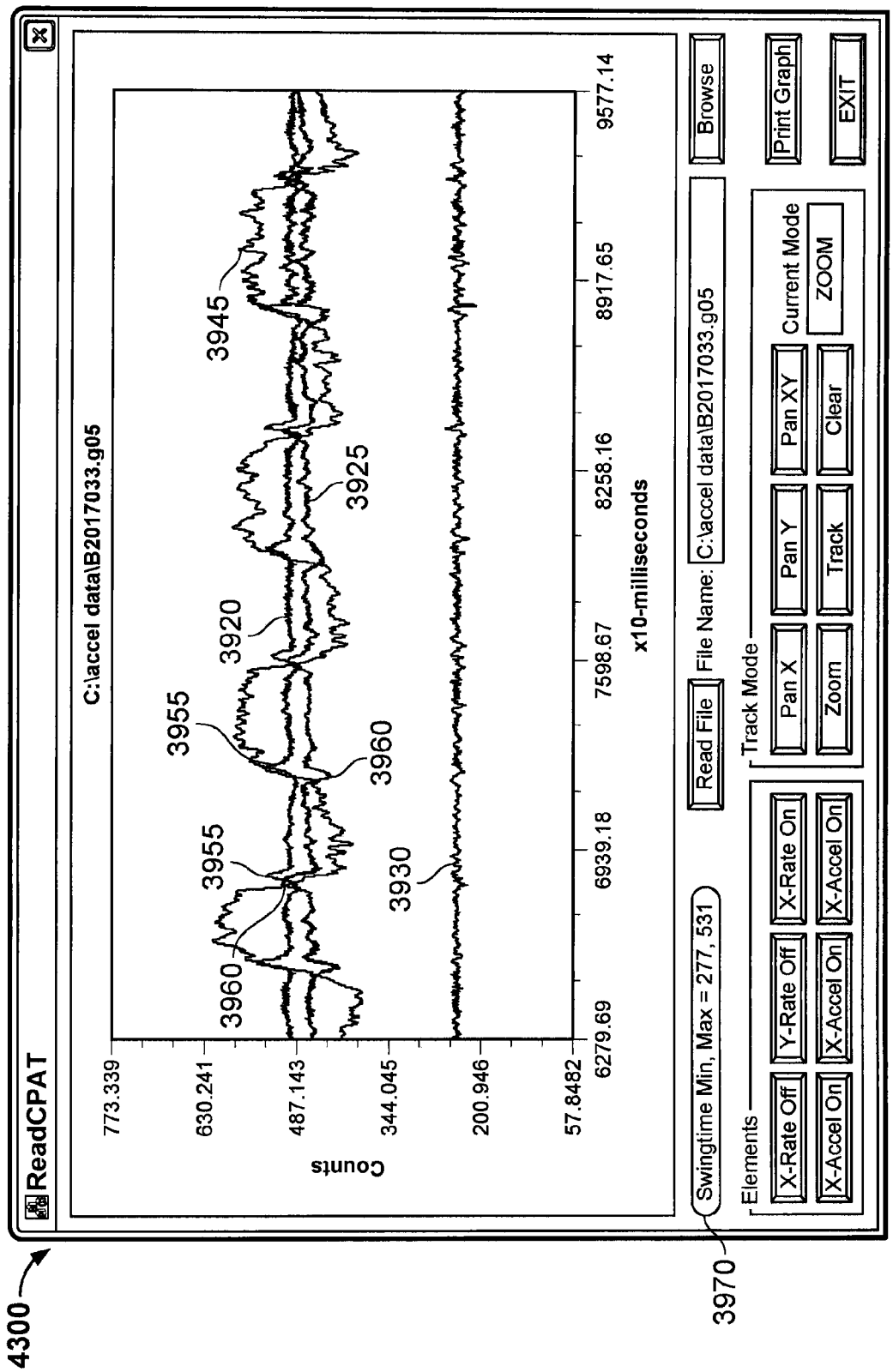
Figure 44:
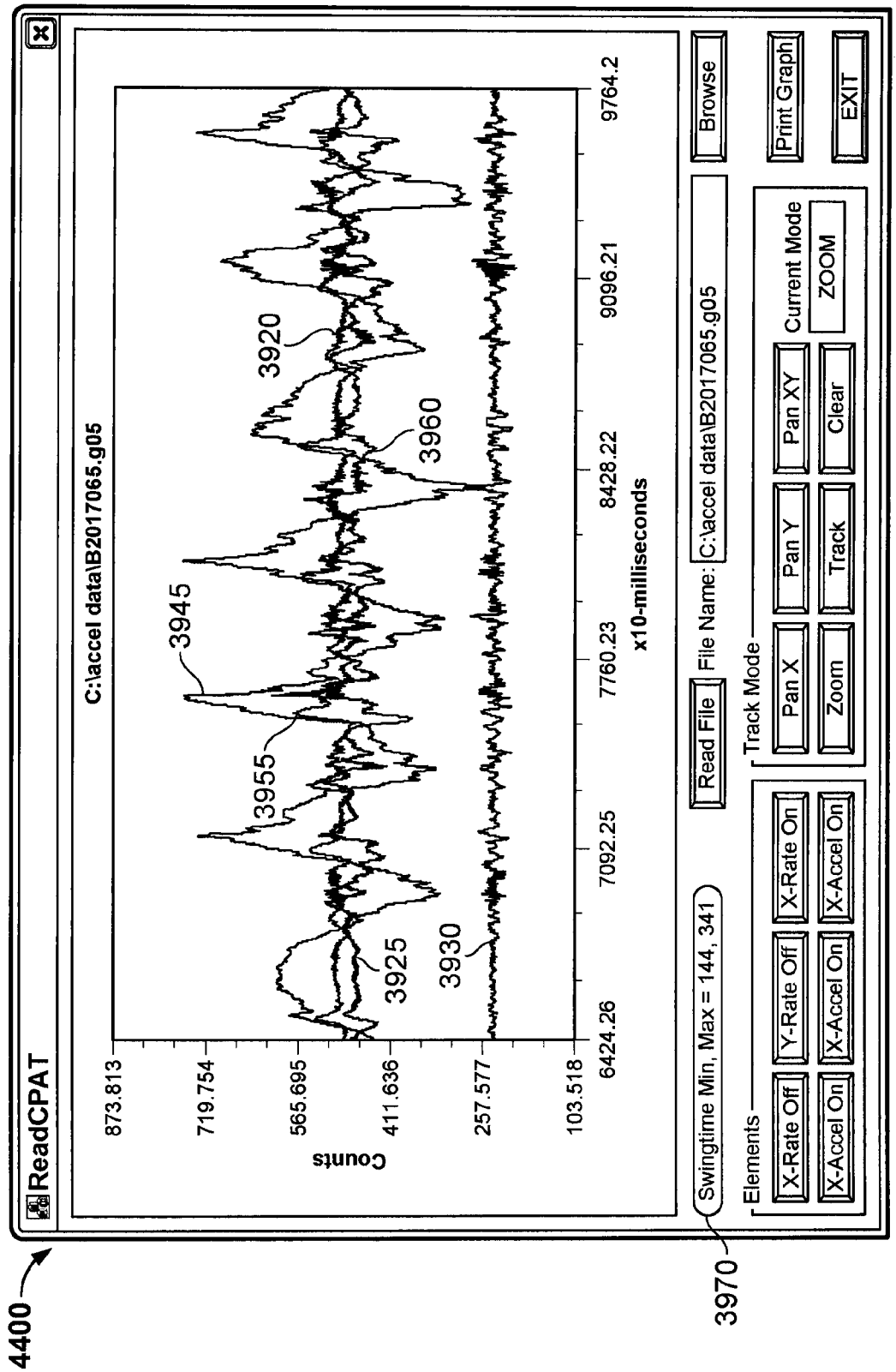
Figure 45:
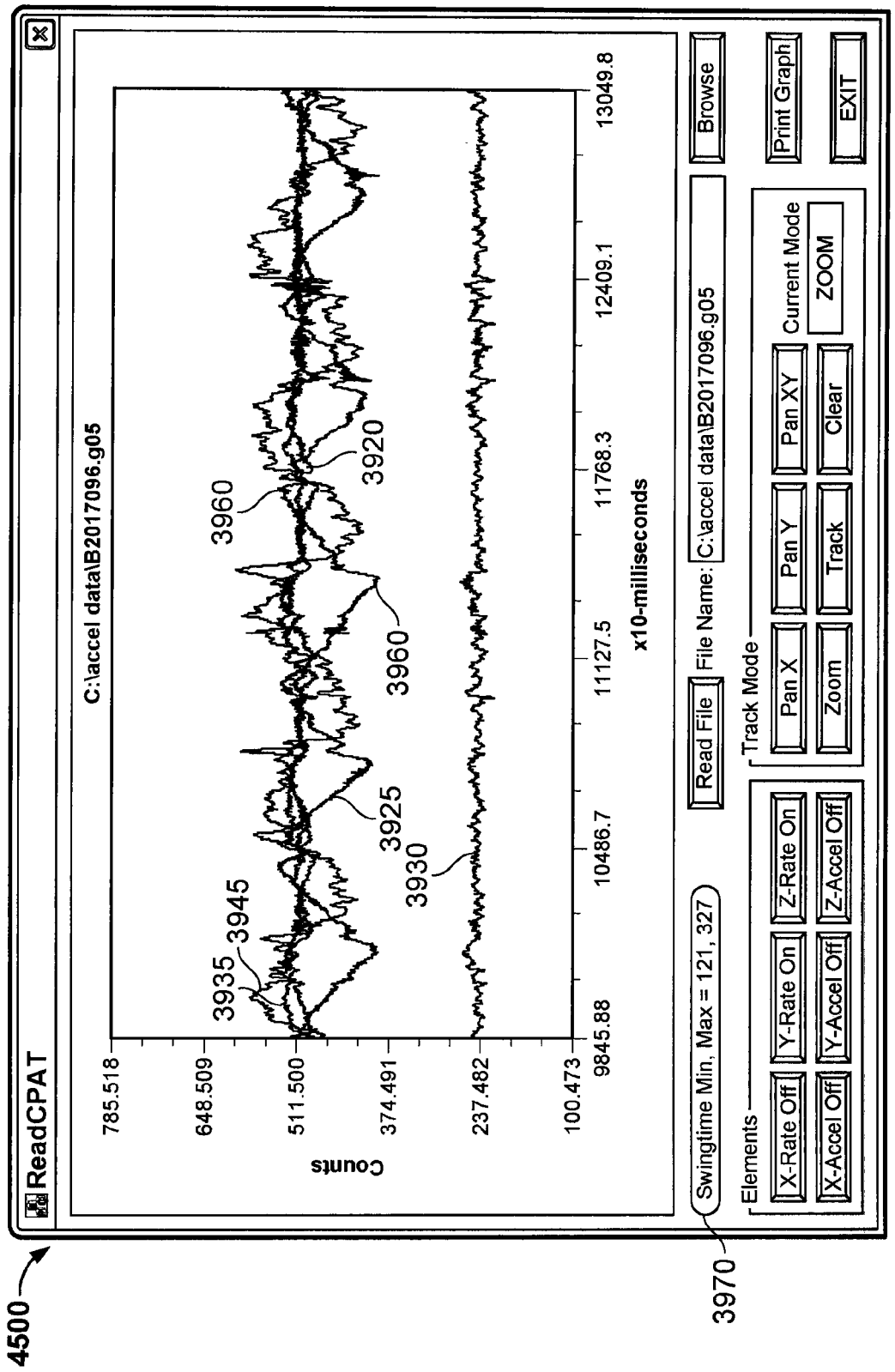
Figure 46:
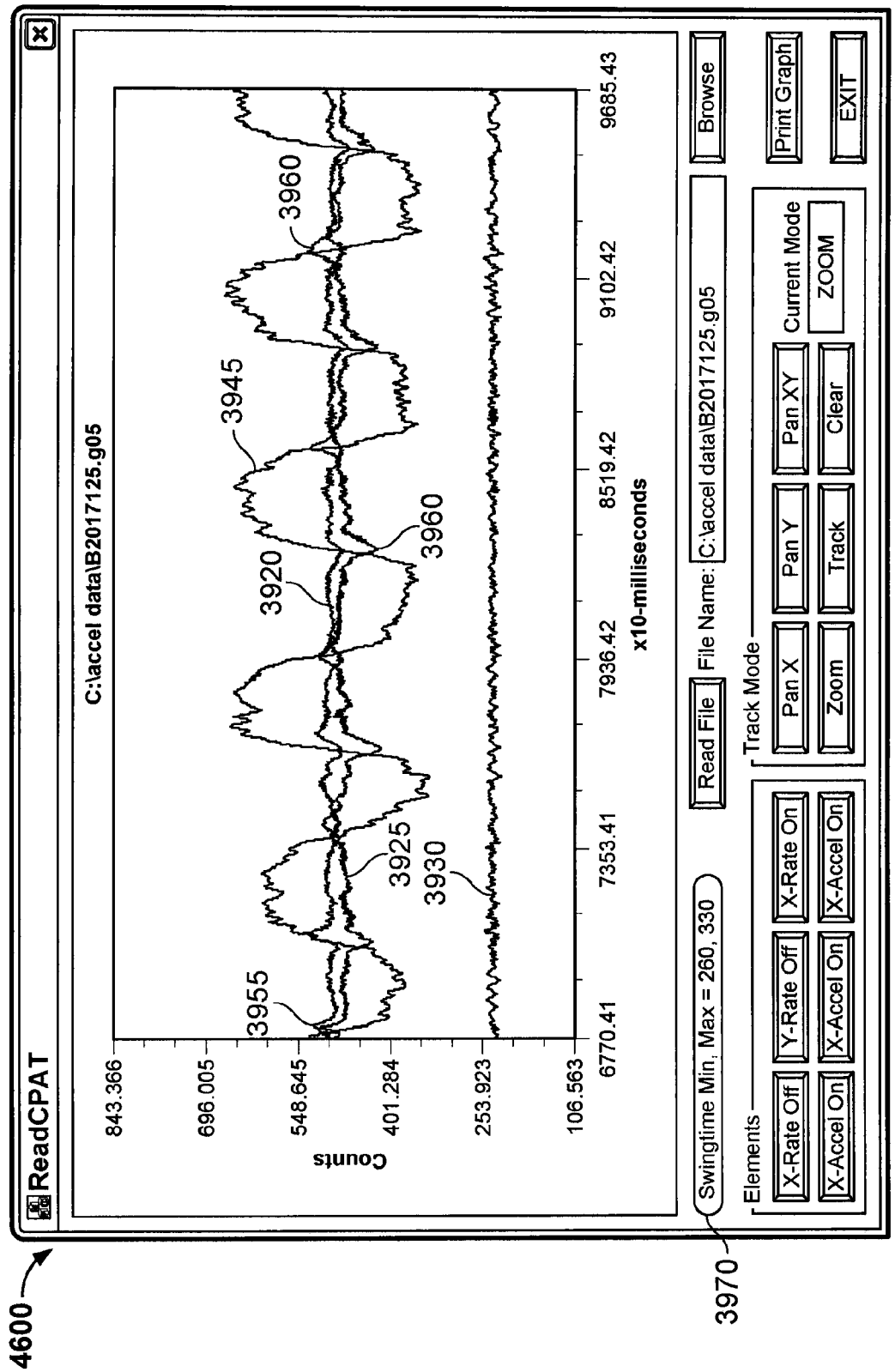
Figure 47:
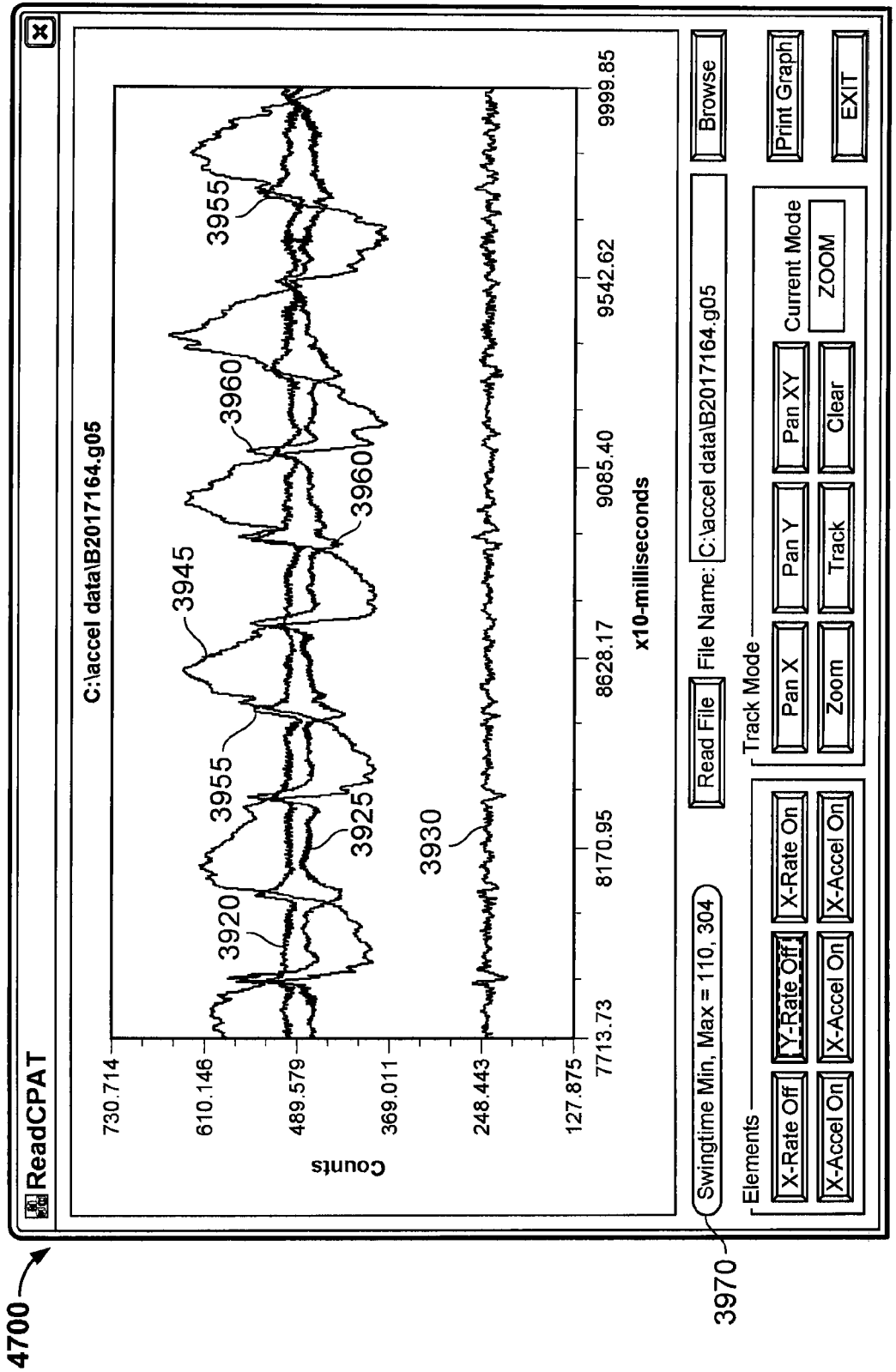

As such, each of the examples 3900-4700 illustrate a pattern of a swing that may be matched with operator-swing data. In particular, the example 3900 of FIG. 39 represents a reference swing, such as an ideal or model swing. The examples 4000-4700 of FIGS. 40-47 each represent a swing pattern that corresponds to a type of swing error. More particularly, example 4000 of FIG. 40 represents a cupping swing, example 4100 of FIG. 41 represents a dome-effect swing, example 4200 of FIG. 42 represents a too-fast swing, example 4300 of FIG. 43 represents a too-slow swing, example 4400 of FIG. 44 represents an inconsistent swing, example 4400 of FIG. 44 represents a sensor-head-tilt swing, example 4500 of FIG. 45 represents a sensor-head-tilt swing, and example 4600 of FIG. 46 represents an excessive-arc swing.

Figure 48:
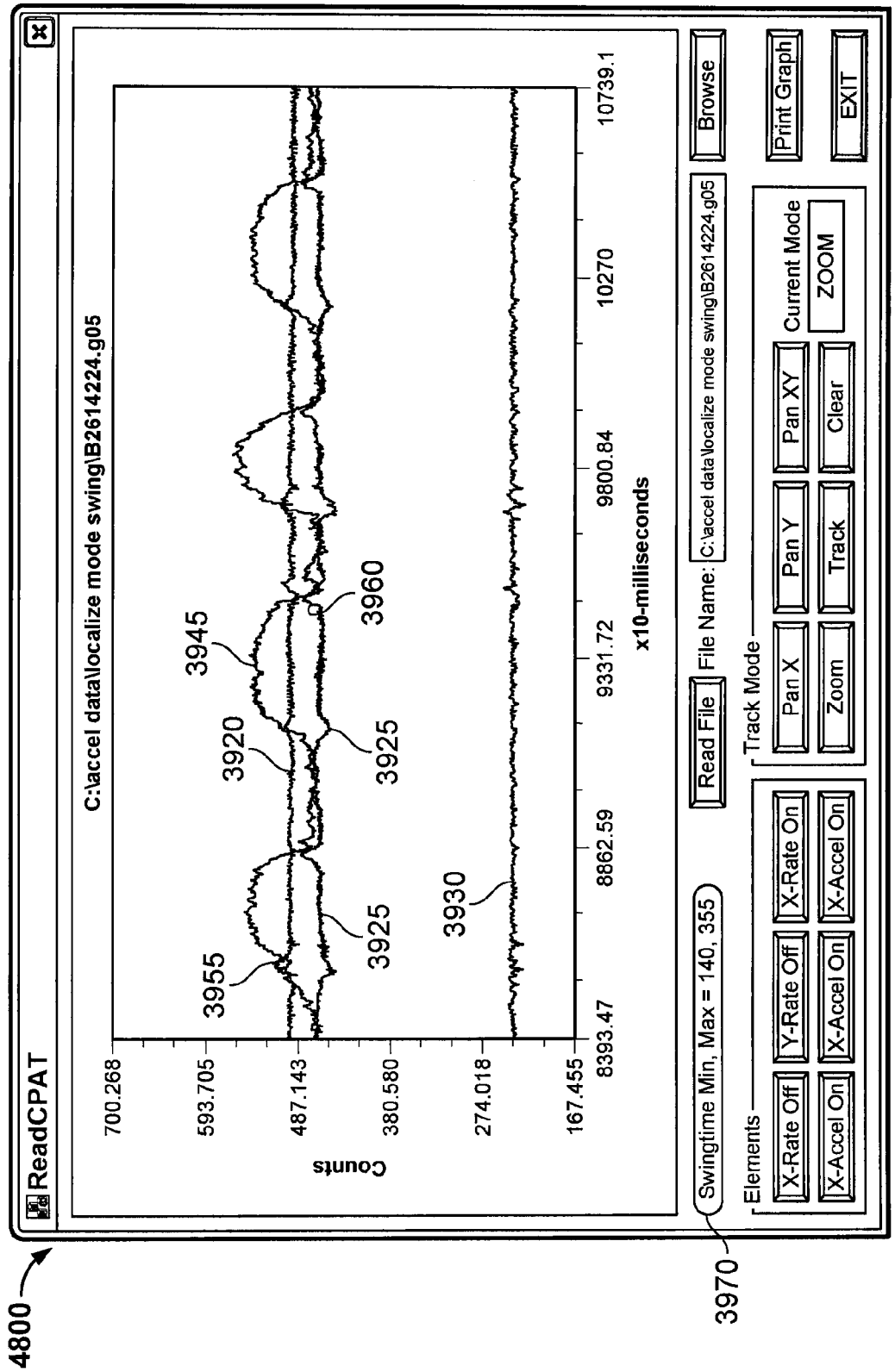
FIG. 48 illustrates operator swing data that may be provided to an electronics unit of a buried object detector.

FIG. 48 illustrates operator-swing data 4800 that may be provided to an electronics unit having a buried object detector. Like the examples 3900-4700, the operator-swing data 4800 includes measurement data 3920, 3925, 3930 and 3945 and identifies a point 3955 of acceleration of the sensor head through the x-axis, and a point 3960 of acceleration of the sensor head through the y-axis. A point 3955 also represents an end point of a swing.

The techniques and concepts of training an operator to use a buried object detection system have been generally described using an operable buried object detection system, though this need not necessarily be so. In one example, a facsimile of a buried object detection system that does not include operational electronic circuitry may be used. In another example, a training device shaped similarly to a buried object detection system and, perhaps, made of less expensive material may be fitted with a motion and position sensor, a processor/communicator device (such as a PDA described above), and an interface cable between the sensor and the processor/communicator device. For example, a training device may be fashioned from wood and/or plastic.

The techniques and concepts of using position and motion measurement in a buried object detection system have been generally described using a measurements from accelerometers and gyroscopes. However, other techniques are contemplated including using an accelerometer without using a gyroscope and using an accelerometer, gyroscope and a magnetometer.

The techniques and concepts of analyzing an operator's swing of a buried object detection system also have been generally described with respect to using pattern matching techniques to compare operator-swing data with reference-swing data and/or error-swing data characteristic of a type of error. Reference-swing data also may be referred to as a template, as may error-swing data characteristic of a type of error. Using pattern matching may enable the use of less precise measurement from measurement sensors. For instance, the ability to determine relative position of the sensor head may be sufficient such that absolute accuracy may not be required from measurement sensors.

Other techniques are contemplated, such as using Kalman filter techniques to analyze a swing. Kalman filter techniques may be used to analyze measurement data to determine an orientation and location in space.

Other implementations are within the scope of the following claims.

What is claimed is:

1. A buried object detection system comprising:
   a sensor head having a sensor configured to detect electromagnetic signals;
   a sensor head status sensor configured to generate status data related to the sensor head; and
   one or more processors configured to detect a buried object based on the electromagnetic signals and to determine a position or a motion of the sensor head based on the status data, the position or motion of the sensor head resulting from movement of the detection system by an operator, wherein at least one of the one or more processors is configured to process the status data to determine whether the sensor head is being moved correctly by an operator of the buried object detection system.

2. The system of claim 1 wherein the at least one processor is configured to:
   process the status data to identify an operator-swing, and
   compare the operator-swing to a swing template to determine whether the sensor head is being moved correctly by an operator of the buried object detection system.

3. The system of claim 2 wherein the swing template represents a reference swing.

4. The system of claim 2 wherein the swing template represents a type of swing error.

5. The system of claim 1 wherein the sensor head status sensor comprises a six degree-of-freedom inertial measuring unit having three accelerometers and three gyroscopes.

6. The system of claim 1 further comprising a communicator device configured to provide a communication to the operator regarding the operation of the buried object detection system.

7. The system of claim 6 wherein the communication is at least one of an audible message, an audible tone, a textual message, or a graphical representation.

8. The system of claim 6 wherein:
at least one of the one or more processors is configured to:
process the status data to identify an operator-swing,
compare the operator-swing to a reference swing, and
when the operator-swing does not correspond to the reference swing, compare the operator-swing to one or more swing error patterns until a matching pattern is identified, and
the communicator device is configured to provide a communication to the operator when the operator-swing does not correspond to the reference swing.

9. The system of claim 6 wherein a personal digital assistant comprises at least one of the one or more processors.

10. The system of claim 1 wherein the sensor head status sensor is configured to be removable from, and re-attachable to, the buried object detection system.

11. The system of claim 1 wherein a parameter used to detect a buried object is adjusted based on a determined position or motion of the sensor head.

12. The system of claim 1 wherein the one or more processors comprise:
a detector processor configured to detect the buried object based on the electromagnetic signals, and
a motion and position processor configured to determine a position or a motion of the sensor head based on the status data.

13. The system of claim 12 wherein the motion and position processor is configured to be removable from, and re-attachable to, the buried object detection system.

14. A method comprising:
generating, at one or more processors, status data related to a sensor head of a buried object detector,
processing, at the one or more processors, the status data to determine a position or a motion of the sensor head, the position or motion of the sensor head resulting from movement of the buried object detector by an operator, and
processing, at the one or more processors, the status data to determine whether the sensor head is being moved correctly by an operator of the buried object detector.

15. The method of claim 14 wherein processing the status data to determine whether the sensor head is being moved correctly comprises:
processing the status data to identify an operator-swing, and
comparing the operator-swing to a swing template to determine whether the sensor head is being moved correctly.

16. The method of claim 15 wherein the swing template represents a reference swing.

17. The method of claim 15 wherein the swing template represents a type of swing error.

18. The method of claim 14 wherein the status data includes data generated by a six degree-of-freedom inertial measuring unit having three accelerometers and three gyroscopes.

19. The method of claim 14 further comprising providing, from the one or more processors, a communication to an operator of the buried object detector regarding operation of the buried object detector.

20. The method of claim 19 wherein the communication is at least one of an audible message, an audible tone, a textual message, or a graphical representation.

21. The method of claim 14 further comprising
processing, at the one or more processors, the status data to identify an operator-swing,
comparing, at the one or more processors, the operator-swing to a reference swing, and
when the operator-swing does not correspond to the reference swing, comparing the operator-swing to one or more swing error patterns until a matching pattern is identified, and
providing, from the one or more processors, a communication to the operator when the operator-swing does not correspond to the reference swing.

22. The method of claim 14 further comprising enabling adjustment of a parameter used to detect the buried object, the adjustment being based on the determined position or motion of the sensor head.

23. A kit comprising a personal digital assistant and a sensor head status sensor, wherein:
the sensor head status sensor is configured to be attached to a sensor head of a buried object detector and to generate status data related to the sensor head; and
the personal digital assistant is configured to:
receive and process the status data to determine a position or a motion of the sensor head, the motion or position of the sensor head resulting from movement of the buried object detector by an operator, and
process the status data to determine whether the sensor head is being moved correctly by an operator of the buried object detection system.

24. The kit of claim 23 further comprising hardware for attaching the personal digital assistant to the buried object detector.

25. The kit of claim 23 wherein the personal digital assistant is configured to:
process the status data to identify an operator-swing, and
compare the operator-swing to a swing template to determine whether the sensor head is being moved correctly by an operator of the buried object detection system.

26. The kit of claim 25 wherein the swing template represents a reference swing.

27. The kit of claim 25 wherein the swing template represents a type of swing error.

28. The kit of claim 23 wherein the sensor head status sensor comprises a six degree-of-freedom inertial measuring unit having three accelerometers and three gyroscopes.

29. The kit of claim 23 wherein the personal digital assistant is configured to provide a communication to the operator regarding the operation of the buried object detection system.

30. The kit of claim 29 wherein the communication is at least one of an audible message, an audible tone, a textual message, or a graphical representation.

31. The kit of claim 29 wherein:
the personal digital assistant is configured to:
process the status data to identify an operator-swing,
compare the operator-swing to a reference swing, and
when the operator-swing does not correspond to the reference swing, compare the operator-swing to one or more swing error patterns until a matching pattern is identified, and
provide a communication to the operator when the operator-swing does not correspond to the reference swing.

32. The kit of claim 23 wherein the personal digital assistant is configured to enable adjustment of a parameter used by a buried object detector to detect a buried object, the adjustment being based on a determined position or motion of the sensor head.

33. A buried object detection system comprising:
a sensor head having a sensor configured to detect electromagnetic signals;
a sensor head status sensor configured to generate status data related to the sensor head; and
one or more processors configured to:
 detect a buried object based on the electromagnetic signals and to determine a position or a motion of the sensor head based on the status data, and
 process the status data to determine whether the sensor head is being moved correctly by an operator of the buried object detection system.

* * * * *